US008560956B2

(12) United States Patent　　(10) Patent No.: US 8,560,956 B2
Curtis et al.　　　　　　　　　　(45) Date of Patent: Oct. 15, 2013

(54) PROCESSING MODEL OF AN APPLICATION WIKI

(75) Inventors: Bryce Allen Curtis, Round Rock, TX (US); Stewart Earle Nickolas, Austin, TX (US); Wayne Elmo Vicknair, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1665 days.

(21) Appl. No.: 11/482,472

(22) Filed: Jul. 7, 2006

(65) Prior Publication Data

US 2008/0010341 A1　　Jan. 10, 2008

(51) Int. Cl.
*G06F 17/00*　　(2006.01)
*G06F 17/20*　　(2006.01)
*G06F 17/21*　　(2006.01)
*G06F 17/24*　　(2006.01)
*G06F 17/25*　　(2006.01)
*G06F 17/26*　　(2006.01)
*G06F 17/27*　　(2006.01)
*G06F 17/28*　　(2006.01)
*G06F 3/048*　　(2013.01)
*G06F 9/44*　　(2006.01)

(52) U.S. Cl.
USPC ........... 715/763; 715/205; 715/206; 715/764; 715/765; 715/762; 717/106; 717/109; 717/110; 717/113

(58) Field of Classification Search
None
See application file for complete search history.

(56) References Cited

U.S. PATENT DOCUMENTS

| | | | |
|---|---|---|---|
| 4,853,843 A | 8/1989 | Ecklund | |
| 5,113,341 A | 5/1992 | Kozol et al. | |
| 5,475,805 A | 12/1995 | Murata | |
| 5,802,299 A | 9/1998 | Logan et al. | |
| 5,905,992 A | 5/1999 | Lucas et al. | |
| 5,983,227 A | 11/1999 | Nazem et al. | |
| 6,182,085 B1 | 1/2001 | Eichstaedt et al. | |
| 6,216,140 B1 | 4/2001 | Kramer | |
| 6,233,600 B1 | 5/2001 | Salas et al. | |
| 6,278,449 B1 | 8/2001 | Sugiarto et al. | |
| 6,327,628 B1 | 12/2001 | Anuff et al. | |
| 6,446,091 B1 | 9/2002 | Noren et al. | |
| 6,480,883 B1 | 11/2002 | Tsutsumitake | |
| 6,505,242 B2 | 1/2003 | Holland et al. | |
| 6,507,867 B1 | 1/2003 | Holland et al. | |
| 6,570,582 B1 | 5/2003 | Sciammarella et al. | |
| 6,601,057 B1 | 7/2003 | Underwood et al. | |
| 6,615,224 B1 | 9/2003 | Davis | |
| 6,763,388 B1 | 7/2004 | Tsimelzon | |
| 6,832,263 B2 | 12/2004 | Polizzi et al. | |

(Continued)

OTHER PUBLICATIONS

A. Crespo, "A Browser-Based Editor for Contructing Web Applications", 5th international worldwide conference, Paris, France 1996.*

(Continued)

*Primary Examiner* — Lewis A Bullock, Jr.
*Assistant Examiner* — Mark Gooray
(74) *Attorney, Agent, or Firm* — Yee & Associates, P.C.; Yeen Tham

(57) ABSTRACT

A computer implemented method for managing a collaborative web page. A set of tools is displayed to manipulate the collaborative web page. The set of tools includes a plurality of graphical representation of commands for modifying dynamic content of the collaborative web page. A property editor is presented to modify properties of one of the plurality of graphical representation of commands.

17 Claims, 42 Drawing Sheets

(56) References Cited

U.S. PATENT DOCUMENTS

| | | | |
|---|---|---|---|
| 6,973,483 B2 | 12/2005 | Hewett et al. | |
| 6,976,209 B1 | 12/2005 | Storisteanu et al. | |
| 7,007,232 B1 | 2/2006 | Ross et al. | |
| 7,099,870 B2 | 8/2006 | Hsu et al. | |
| 7,111,048 B2 | 9/2006 | Hewett et al. | |
| 7,152,104 B2 | 12/2006 | Musante et al. | |
| 7,167,903 B2 | 1/2007 | Percival | |
| 7,185,008 B2 | 2/2007 | Kawatani | |
| 7,240,826 B2 | 7/2007 | Abecassis et al. | |
| 7,269,590 B2 | 9/2007 | Hull et al. | |
| 7,289,982 B2 | 10/2007 | Saito et al. | |
| 7,305,475 B2 | 12/2007 | Tock | |
| 7,370,004 B1 | 5/2008 | Patel et al. | |
| 7,370,276 B2 | 5/2008 | Willis | |
| 7,444,358 B2 | 10/2008 | Paczkowski et al. | |
| 7,461,062 B2 | 12/2008 | Stewart et al. | |
| 7,523,126 B2 | 4/2009 | Rivette et al. | |
| 7,546,530 B1* | 6/2009 | Shuster et al. | 715/272 |
| 7,587,669 B2 | 9/2009 | Rana | |
| 7,627,663 B2 | 12/2009 | Salesky et al. | |
| 7,685,198 B2 | 3/2010 | Xu et al. | |
| 7,698,327 B2 | 4/2010 | Kapur | |
| 7,747,599 B1 | 6/2010 | Depelteau et al. | |
| 7,954,052 B2 | 5/2011 | Curtis et al. | |
| 2001/0004746 A1 | 6/2001 | Wright | |
| 2001/0051907 A1 | 12/2001 | Kumar et al. | |
| 2002/0052954 A1 | 5/2002 | Polizzi et al. | |
| 2002/0059399 A1 | 5/2002 | Learmonth | |
| 2002/0078057 A1 | 6/2002 | Wang et al. | |
| 2002/0083132 A1 | 6/2002 | Holland et al. | |
| 2002/0092004 A1 | 7/2002 | Lee et al. | |
| 2002/0095399 A1 | 7/2002 | Devine et al. | |
| 2002/0103856 A1 | 8/2002 | Hewett et al. | |
| 2002/0103867 A1 | 8/2002 | Schilter | |
| 2002/0129106 A1* | 9/2002 | Gutfreund | 709/205 |
| 2002/0138331 A1 | 9/2002 | Hosea et al. | |
| 2002/0147611 A1 | 10/2002 | Greene et al. | |
| 2002/0188632 A1 | 12/2002 | Su | |
| 2003/0013492 A1 | 1/2003 | Bokhari et al. | |
| 2003/0018596 A1 | 1/2003 | Chang | |
| 2003/0046307 A1 | 3/2003 | Rivette et al. | |
| 2003/0046639 A1 | 3/2003 | Fai et al. | |
| 2003/0074446 A1 | 4/2003 | Musante et al. | |
| 2003/0117437 A1 | 6/2003 | Cook et al. | |
| 2003/0140309 A1 | 7/2003 | Saito et al. | |
| 2003/0167267 A1 | 9/2003 | Kawatani | |
| 2003/0167315 A1 | 9/2003 | Chowdhry et al. | |
| 2003/0195896 A1 | 10/2003 | Suda et al. | |
| 2003/0220972 A1 | 11/2003 | Montet et al. | |
| 2004/0003096 A1 | 1/2004 | Willis | |
| 2004/0003097 A1 | 1/2004 | Willis et al. | |
| 2004/0003351 A1 | 1/2004 | Sommerer et al. | |
| 2004/0039795 A1 | 2/2004 | Percival | |
| 2004/0064570 A1 | 4/2004 | Tock | |
| 2004/0070605 A1 | 4/2004 | Huang et al. | |
| 2004/0104931 A1 | 6/2004 | Schmitt | |
| 2004/0107249 A1 | 6/2004 | Moser et al. | |
| 2004/0139208 A1 | 7/2004 | Tuli | |
| 2004/0205558 A1 | 10/2004 | Holloway et al. | |
| 2004/0249801 A1 | 12/2004 | Kapur | |
| 2004/0260730 A1 | 12/2004 | Iwama | |
| 2005/0027823 A1 | 2/2005 | Rana | |
| 2005/0071752 A1 | 3/2005 | Marlatt | |
| 2005/0081111 A1 | 4/2005 | Morgan et al. | |
| 2005/0108266 A1 | 5/2005 | Cao et al. | |
| 2005/0120288 A1 | 6/2005 | Boehme et al. | |
| 2005/0144563 A1 | 6/2005 | Hough et al. | |
| 2005/0193347 A1 | 9/2005 | Van Dam | |
| 2005/0216421 A1 | 9/2005 | Barry et al. | |
| 2005/0218236 A1 | 10/2005 | Silverbrook et al. | |
| 2005/0261891 A1 | 11/2005 | Chan et al. | |
| 2006/0015818 A1 | 1/2006 | Chaudhri et al. | |
| 2006/0064471 A1 | 3/2006 | Hewett et al. | |
| 2006/0075019 A1 | 4/2006 | Donovan et al. | |
| 2006/0095835 A1 | 5/2006 | Kennedy et al. | |
| 2006/0117005 A1 | 6/2006 | Stewart et al. | |
| 2006/0123334 A1 | 6/2006 | Balasubramanyan et al. | |
| 2006/0206462 A1 | 9/2006 | Barber | |
| 2006/0235984 A1* | 10/2006 | Kraus et al. | 709/228 |
| 2007/0011155 A1 | 1/2007 | Sarkar | |
| 2007/0043837 A1 | 2/2007 | Kruse et al. | |
| 2007/0050446 A1 | 3/2007 | Moore | |
| 2007/0100803 A1 | 5/2007 | Cava | |
| 2007/0113187 A1 | 5/2007 | McMullen et al. | |
| 2007/0118794 A1 | 5/2007 | Hollander et al. | |
| 2007/0136201 A1* | 6/2007 | Sah et al. | 705/51 |
| 2007/0174247 A1 | 7/2007 | Xu et al. | |
| 2007/0226077 A1 | 9/2007 | Frank et al. | |
| 2007/0260612 A1 | 11/2007 | Papakonstantinou et al. | |
| 2007/0271274 A1 | 11/2007 | Purang et al. | |
| 2007/0288514 A1 | 12/2007 | Reitter et al. | |
| 2007/0294233 A1 | 12/2007 | Sheu et al. | |
| 2008/0010249 A1 | 1/2008 | Curtis et al. | |
| 2008/0010338 A1 | 1/2008 | Curtis et al. | |
| 2008/0010345 A1 | 1/2008 | Curtis et al. | |
| 2008/0010386 A1 | 1/2008 | Curtis et al. | |
| 2008/0010387 A1 | 1/2008 | Curtis et al. | |
| 2008/0010388 A1 | 1/2008 | Curtis et al. | |
| 2008/0010590 A1 | 1/2008 | Curtis et al. | |
| 2008/0010609 A1 | 1/2008 | Curtis et al. | |
| 2008/0010615 A1 | 1/2008 | Curtis et al. | |
| 2008/0040661 A1 | 2/2008 | Curtis et al. | |
| 2008/0065769 A1 | 3/2008 | Curtis et al. | |
| 2008/0126944 A1 | 5/2008 | Curtis et al. | |
| 2008/0195595 A1 | 8/2008 | Masuyama et al. | |

OTHER PUBLICATIONS

Chen et al., "Component-based Web page management environment", Information Sciences, Amsterdam NL, vol. 176, No. 6, Mar. 22, 2006, pp. 628-639.
Lamping et al., "A Focus+Context Technique Based Hyperbolic Geometry for Visualizing Large Hierarchies", CHI '95, Proceedings Papers, Xerox Palo Alto Research Center, 1995, pp. 1-8.
USPTO OA for U.S. Appl. No. 11/482,207 dated Feb. 5, 2010.
USPTO Final OA for U.S. Appl. No. 11/482,388 dated Apr. 19, 2010.
USPTO Final OA for U.S. Appl. No. 11/483,347 dated Mar. 9, 2010.
U.S. Appl. No. 11/482,353, filed Jul. 7, 2006, Curtis et al.
U.S. Appl. No. 11/482,376, filed Jul. 7, 2006, Curtis et al.
U.S. Appl. No. 11/482,496, filed Jul. 7, 2006, Curtis et al.
U.S. Appl. No. 11/482,388, filed Jul. 7, 2006, Curtis et al.
U.S. Appl. No. 11/482,377, filed Jul. 7, 2006, Curtis et al.
U.S. Appl. No. 11/482,999, filed Jul. 7, 2006, Curtis et al.
U.S. Appl. No. 11/482,207, filed Jul. 7, 2006, Curtis et al.
U.S. Appl. No. 11/482,628, filed Jul. 7, 2006, Curtis et al.
U.S. Appl. No. 11/482,352, filed Jul. 7, 2006, Curtis et al.
U.S. Appl. No. 11/483,347, filed Jul. 7, 2006, Curtis et al.
U.S. Appl. No. 11/482,426, filed Jul. 7, 2006, Curtis et al.
U.S. Appl. No. 11/482,450, filed Jul. 7, 2006, Curtis et al.
USPTO office action for U.S. Appl. No. 11/482,388 dated Dec. 10, 2010.
Lamming et al., "Satchel: Providing Access to Any Document, Any Time, Anywhere", Transactions on Computer-Human Interaction (TOCHI), vol. 7, Issue 3, Sep. 2000, pp. 322-352.
Nuckchady, "A Framework for Building Collaborative Applications", Unviersity of Tampere Dept of Computer Sciences, MSc thesis, Nov. 2004, pp. 1-81.
USPTO office action for U.S. Appl. No. 11/482,377 dated Nov. 29, 2010.
USPTO office action for U.S. Appl. No. 11/482,628 dated Oct. 13, 2010.
USPTO office action for U.S. Appl. No. 11/482,999 dated Oct. 13, 2010.
USPTO final office action for U.S. Appl. No. 11/482,207 dated Jul. 23, 2010.
USPTO Appeal Brief regarding U.S. Appl. No. 11/482,207, dated Jan. 20, 2010.
USPTO Examiner's Answer regarding U.S. Appl. No. 11/482,207, dated Apr. 14, 2011.

(56) References Cited

OTHER PUBLICATIONS

USPTO Reply Brief regarding U.S. Appl. No. 11/482,207, dated Jun. 13, 2011.
USPTO Office Action regarding U.S. Appl. No. 11/482,352, dated May 13, 2009.
USPTO Office Action regarding U.S. Appl. No. 11/482,353, dated Jul. 15, 2009.
USPTO Office Action regarding U.S. Appl. No. 11/482,376, dated Apr. 9, 2009.
USPTO Office Action regarding U.S. Appl. No. 11/482,377, dated Aug. 25, 2009.
USPTO Final Office Action regarding U.S. Appl. No. 11/482,377, dated Apr. 2, 2010.
USPTO Office Action regarding U.S. Appl. No. 11/482,388, dated Aug. 20, 2009.
USPTO Office Action regarding U.S. Appl. No. 11/482,388, dated Dec. 10, 2010.
USPTO Appeal Brief regarding U.S. Appl. No. 11/482,388, dated Sep. 16, 2010.
USPTO Notice of Allowance regarding U.S. Appl. No. 11/482,388, dated Oct. 7, 2011.
USPTO Office Action regarding U.S. Appl. No. 11/482,426, dated Jul. 15, 2009.
USPTO Office Action regarding U.S. Appl. No. 11/482,450, dated Jul. 14, 2009.
USPTO Office Action regarding U.S. Appl. No. 11/482,496, dated Jan. 21, 2009.
USPTO Office Action regarding U.S. Appl. No. 11/482,628, dated Aug. 19, 2009.
USPTO Final Office Action regarding U.S. Appl. No. 11/482,628, dated Mar. 30, 2010.
USPTO Appeal Brief regarding U.S. Appl. No. 11/482,628, dated Aug. 30, 2010.
USPTO Notice of Allowance regarding U.S. Appl. No. 11/482,628, dated Sep. 16, 2011.
USPTO Notice of Allowance regarding U.S. Appl. No. 11/482,999, dated Jan. 25, 2011.
USPTO Office Action regarding U.S. Appl. No. 11/483,347, dated Aug. 4, 2009.
USPTO Appeal Brief regarding U.S. Appl. No. 11/483,347, dated Aug. 4, 2010.
USPTO Examiner's Answer regarding U.S. Appl. No. 11/483,347, dated Nov. 1, 2010.
"Ajax (programming)," Jan. 13, 2009, 4 pages.
"Ajax Training," Jan. 13, 2009.
Volkel et al., "Semantic Wikipedia", IW3C2, pp. 585-594, May 2006.
Appeal Brief, dated Jan. 20, 2011, regarding U.S. Appl. No. 11/482,207, 45 pages.
Notice of Allowance, dated Feb. 29, 2012, regarding U.S. Appl. No. 11/482,388, 13 pages.
Final Office Action, dated Jul. 22, 2009, regarding U.S. Appl. No. 11/482,496, 24 pages.
Office Action, dated Nov. 12, 2010, regarding U.S. Appl. No. 11/482,628, 11 pages.
Notice of Allowance, dated Feb. 1, 2012, regarding U.S. Appl. No. 11/482,628, 12 pages.
Cutrell et al., "Fast, Flexible Filtering with Phlat—Personal Search and Organizaion Made Easy", CHI '06 Proceedings of the SIGCHI conference on Human Factors in computing systems, Apr. 2006, pp. 261-270.
USPTO Final Office Action dated Apr. 28, 2011 in connection with U.S. Appl. No. 11/482,628.
USPTO Notice of Allowance dated May 27, 2011 in connection with U.S. Appl. No. 11/482,388.
CN office action dated Oct. 19, 2012 regarding application 200710128663.1, 6 pages.

* cited by examiner

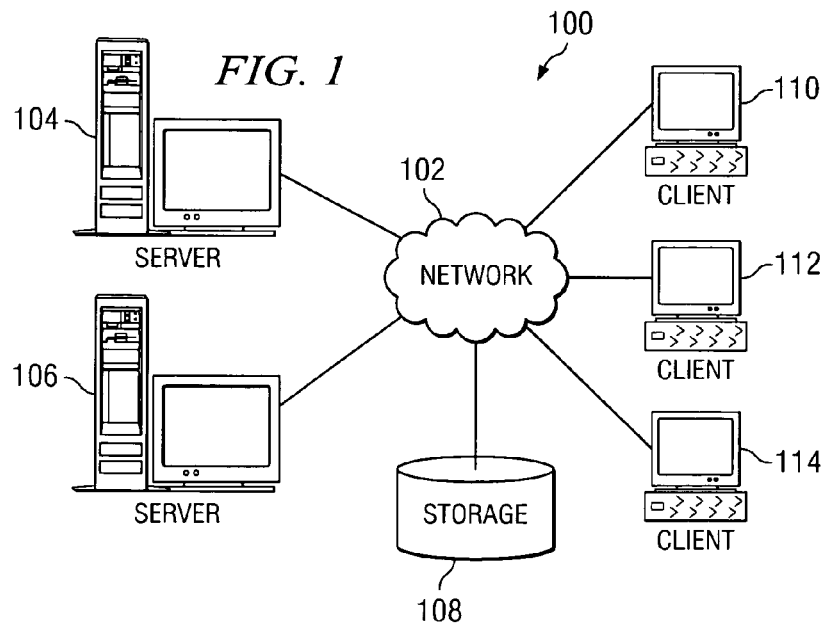

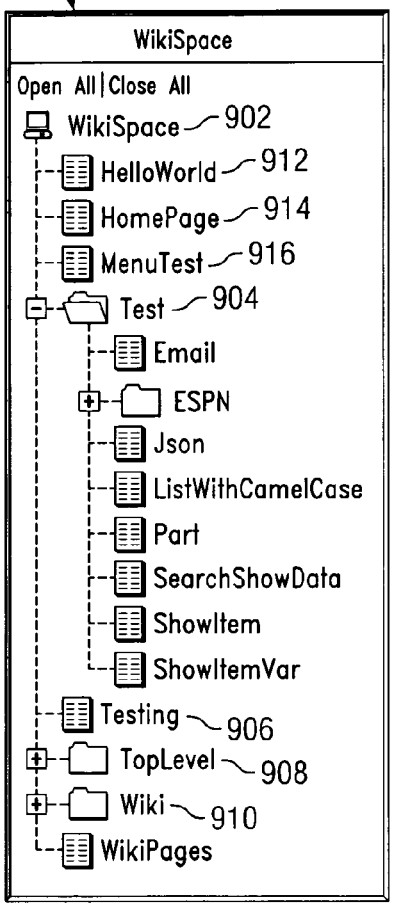
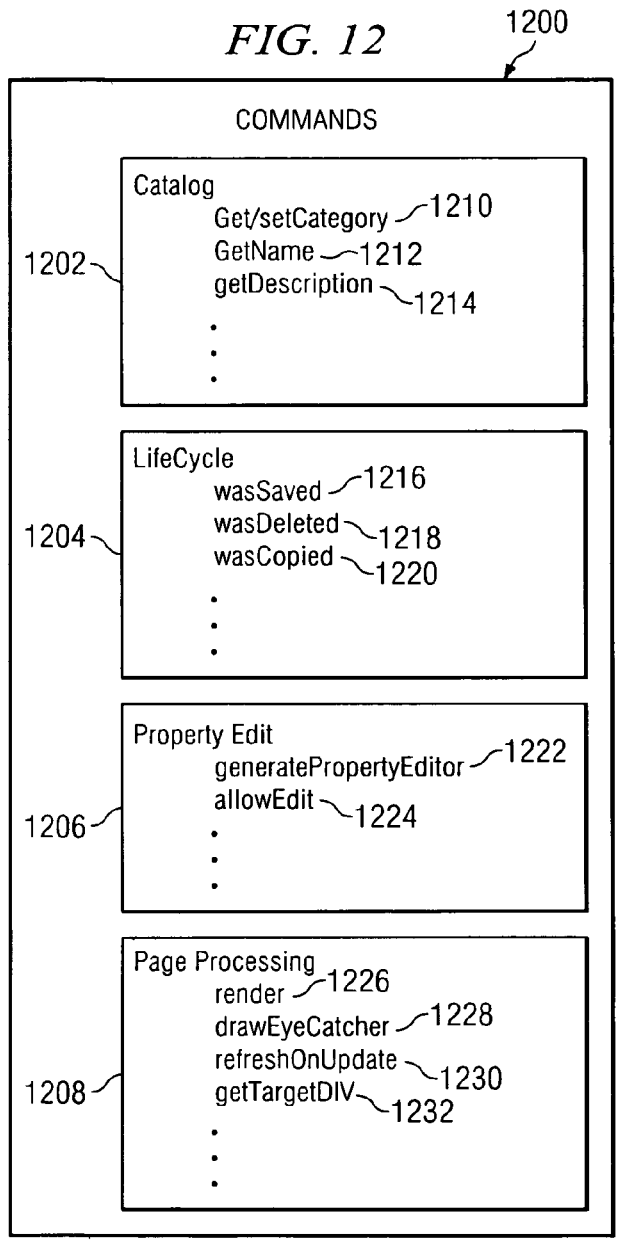

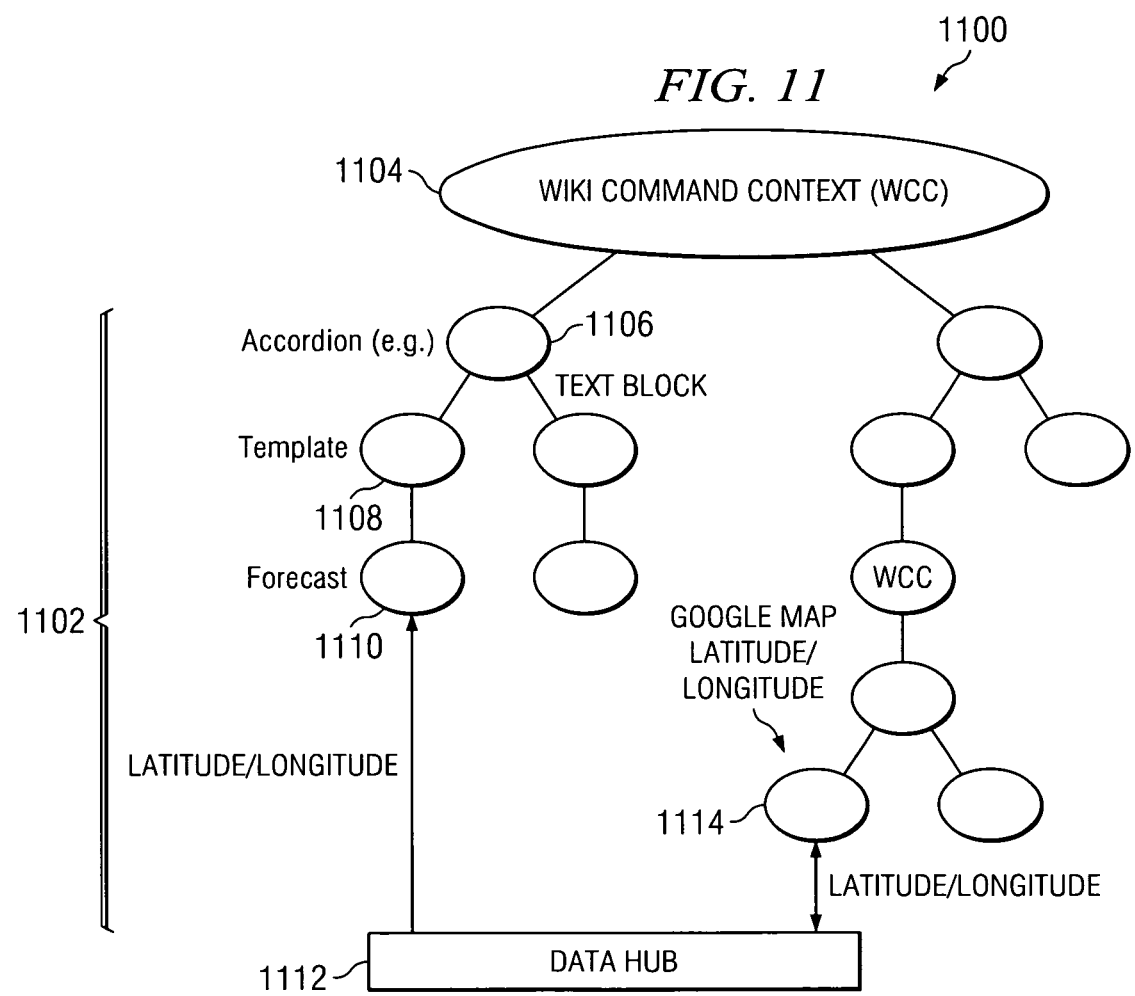

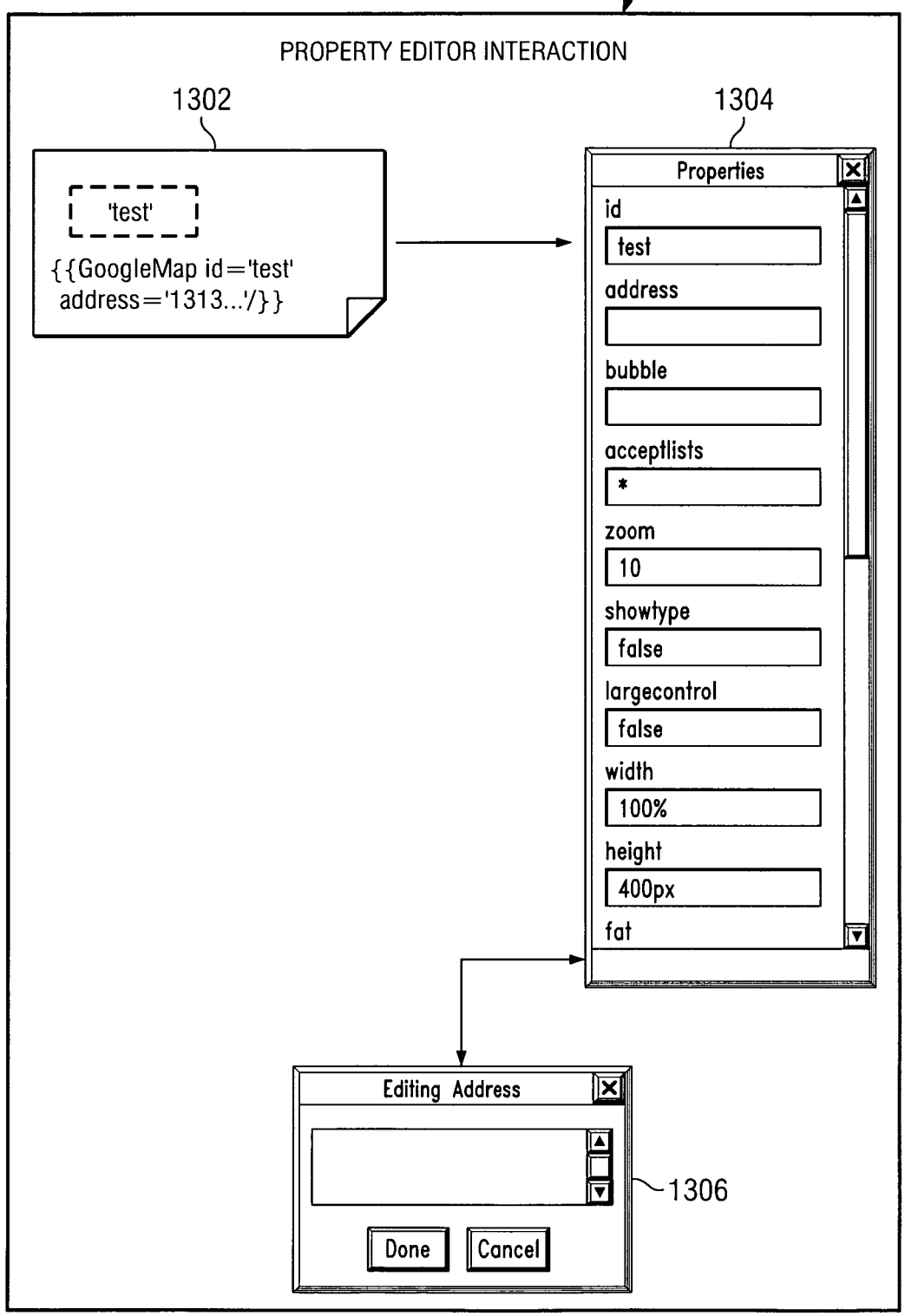

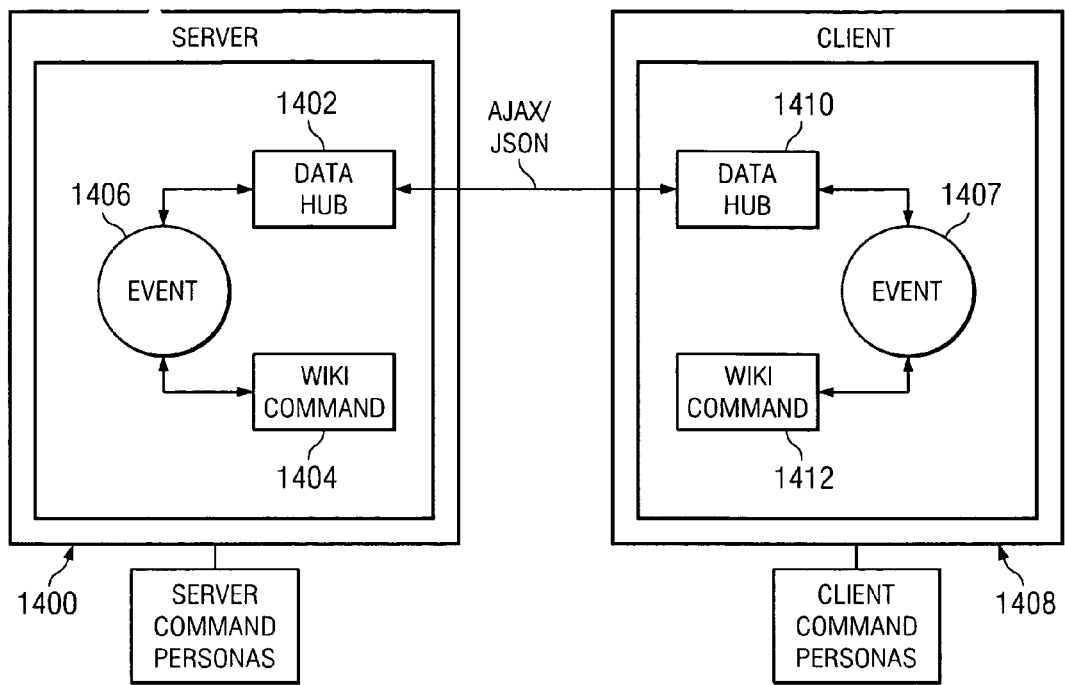

2402 VISIBILITY SETTINGS

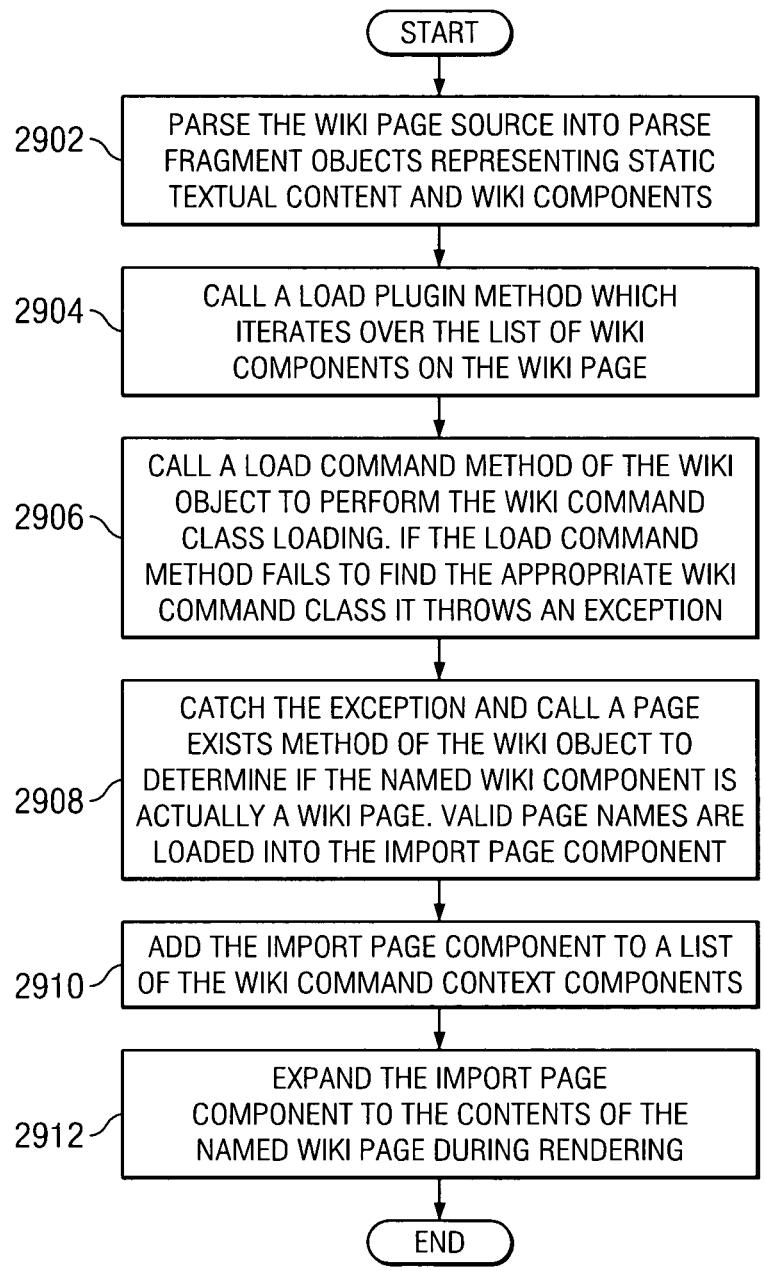

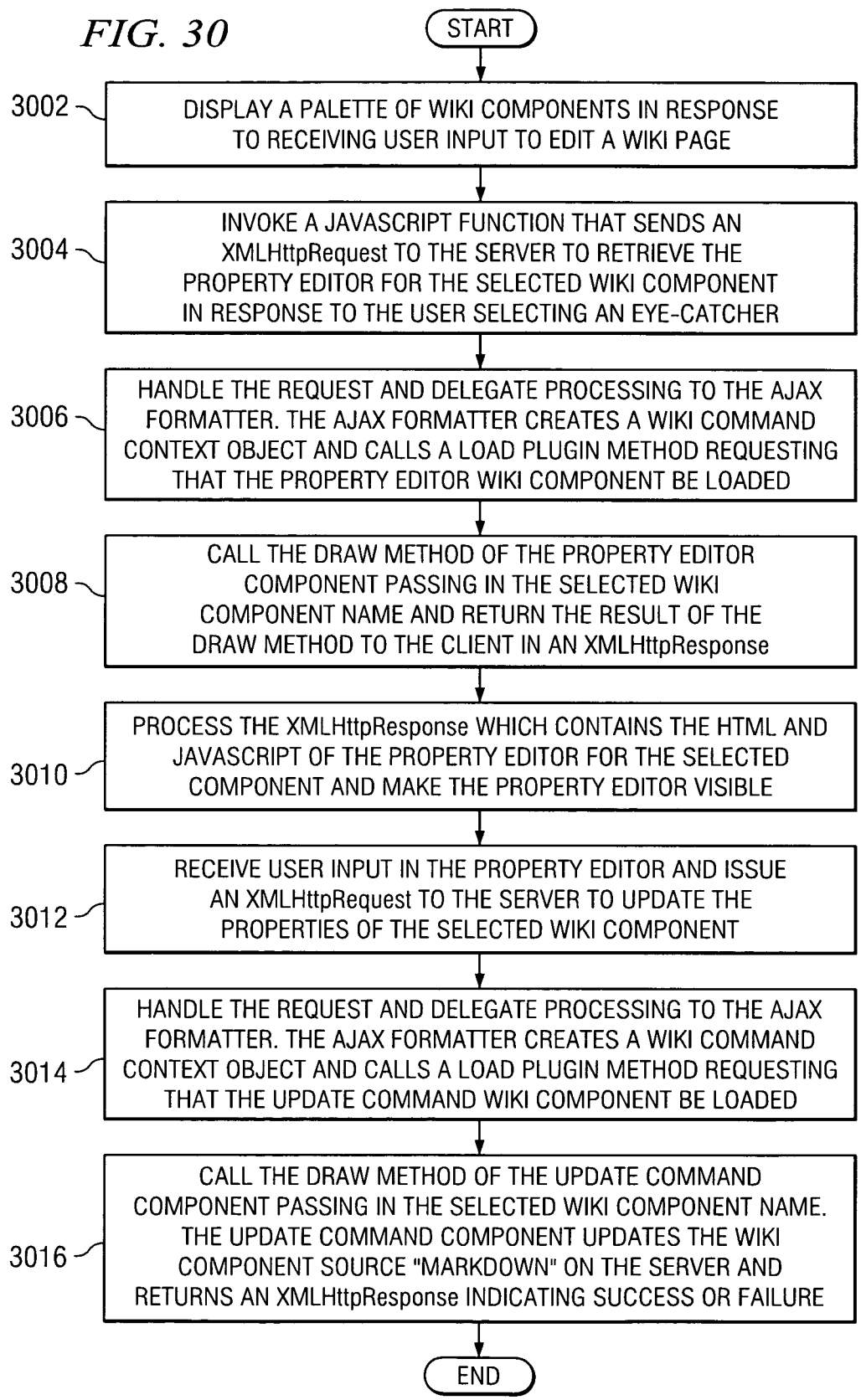

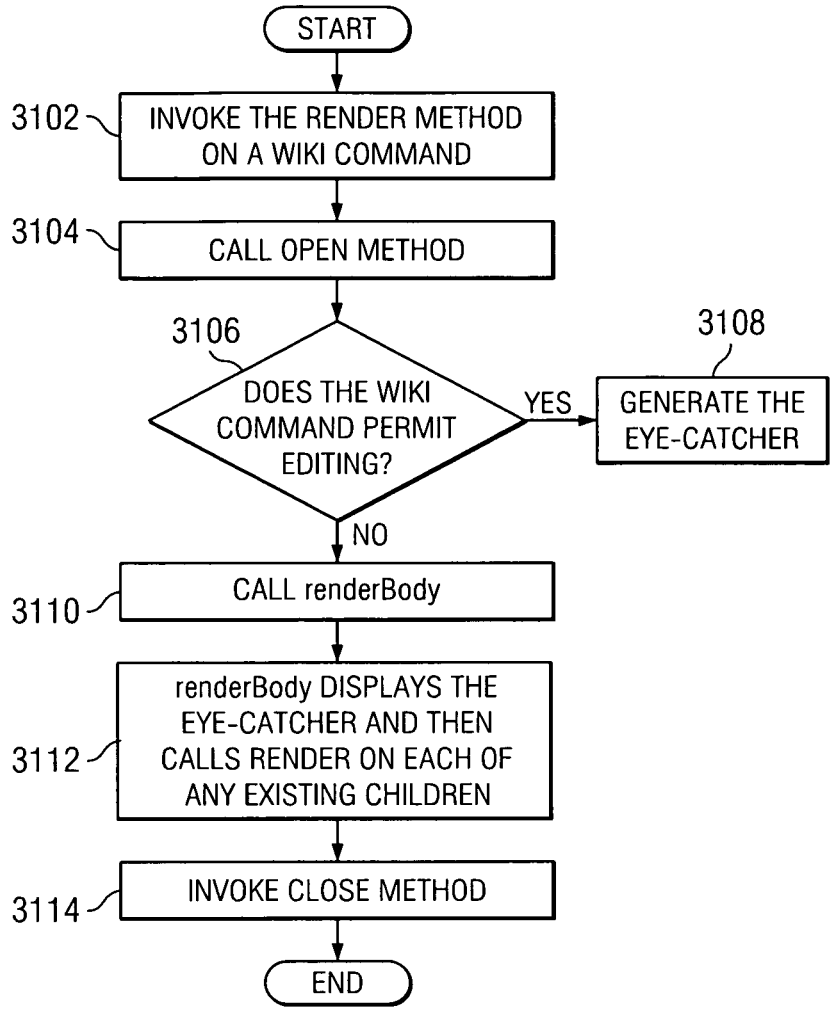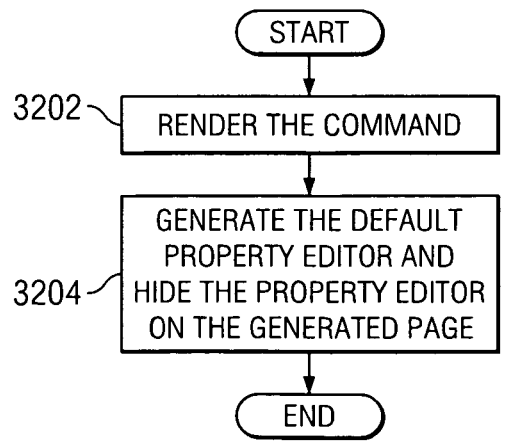

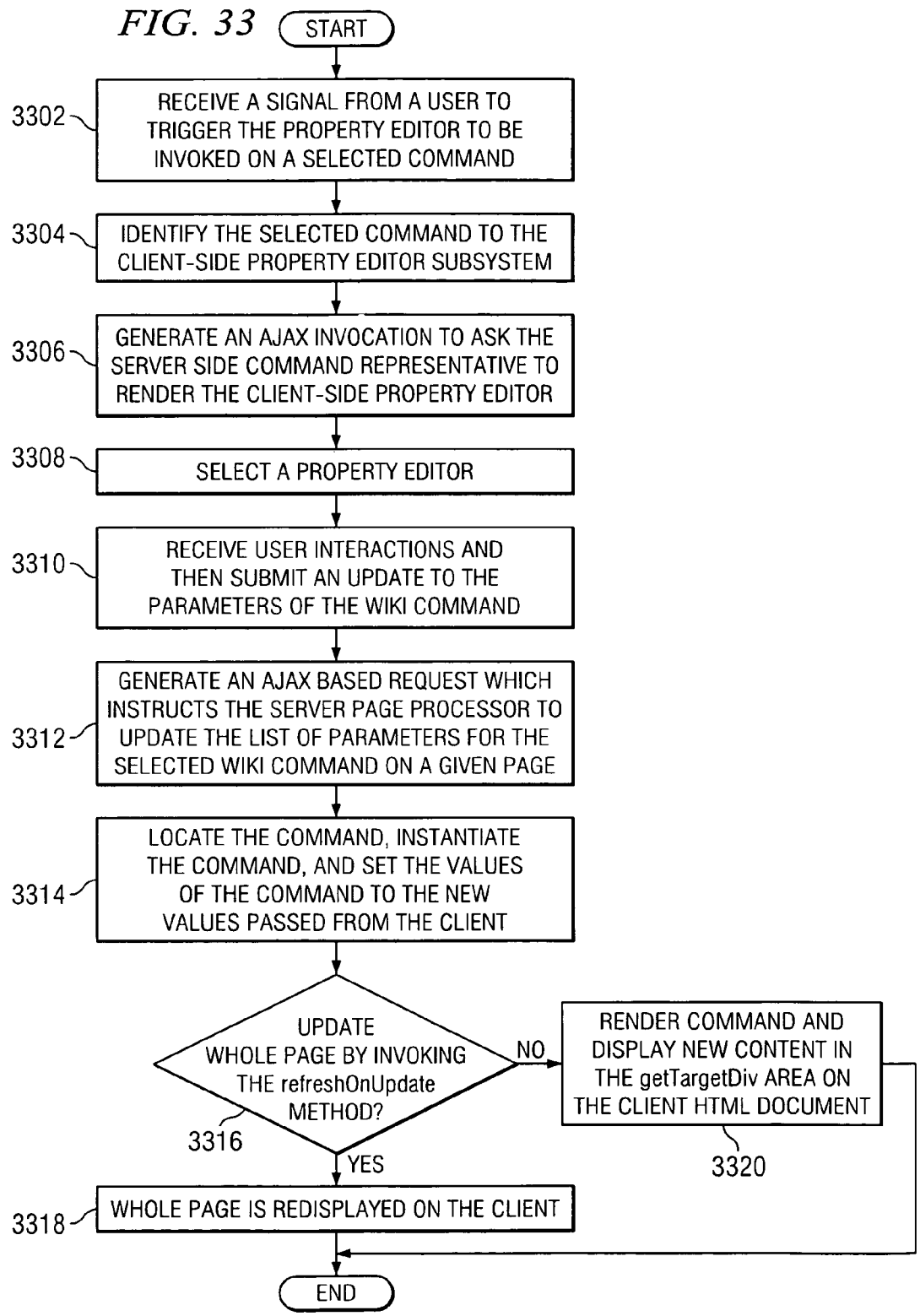

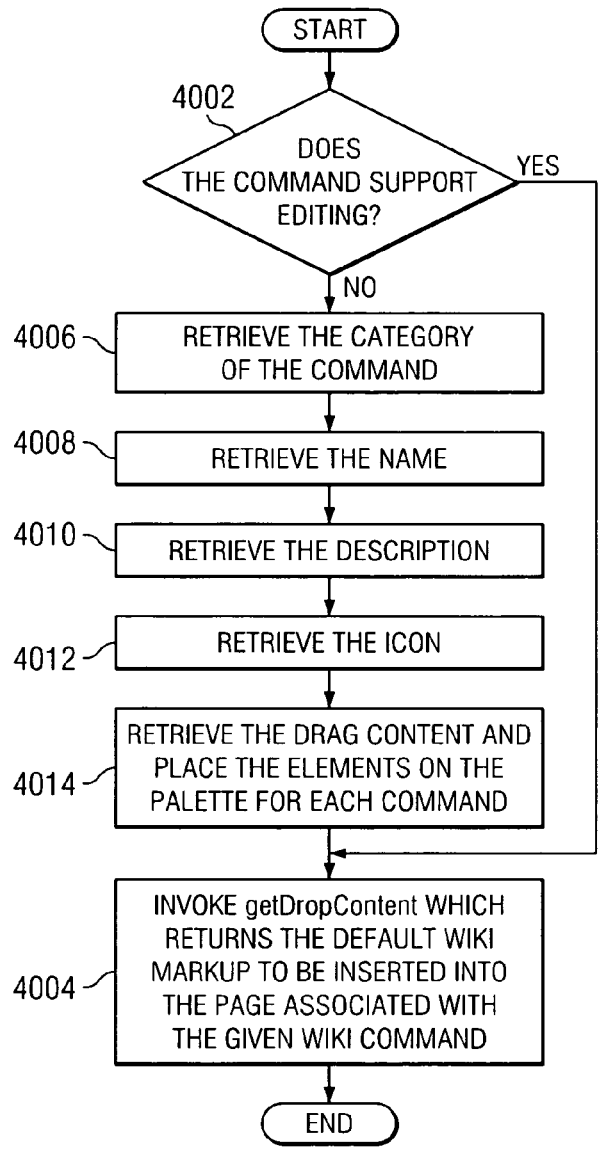
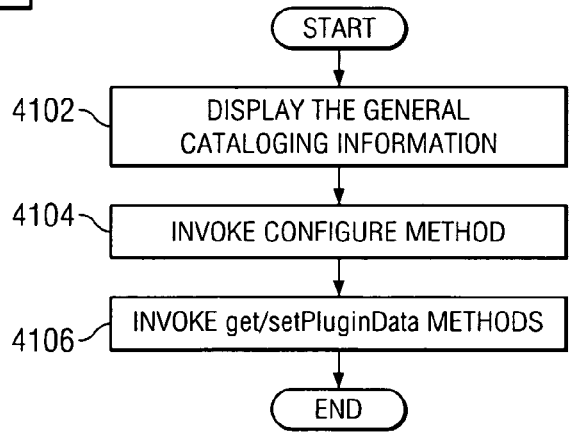

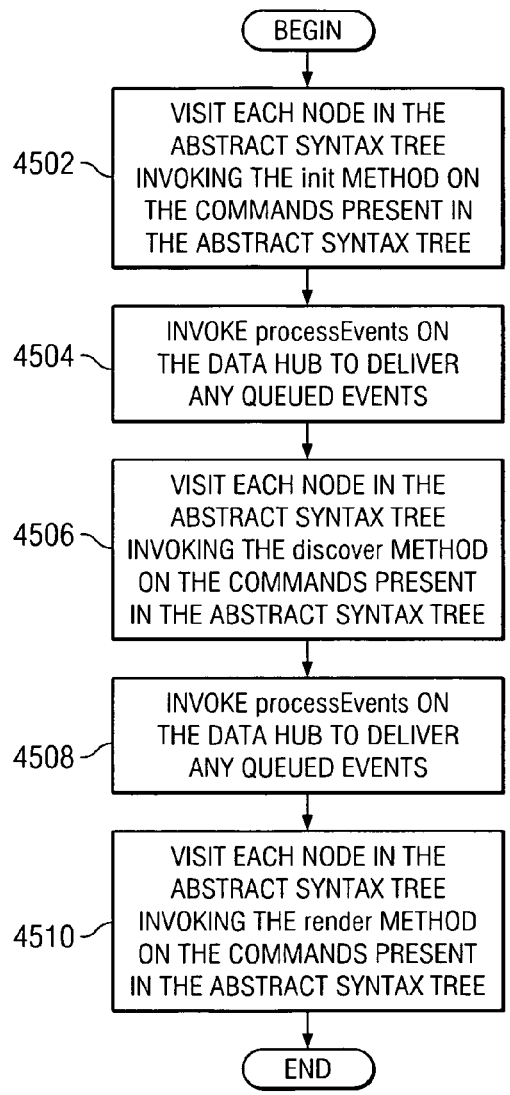
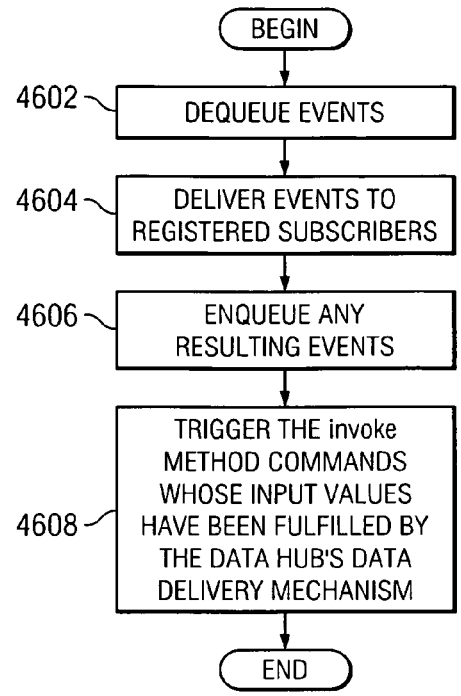
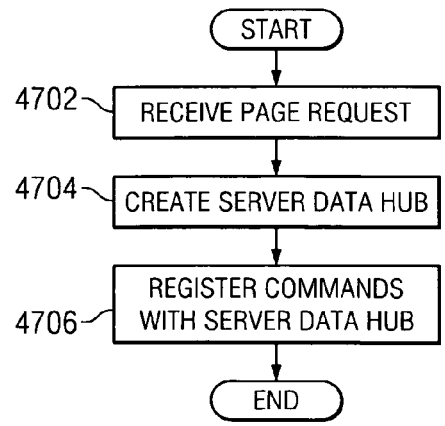

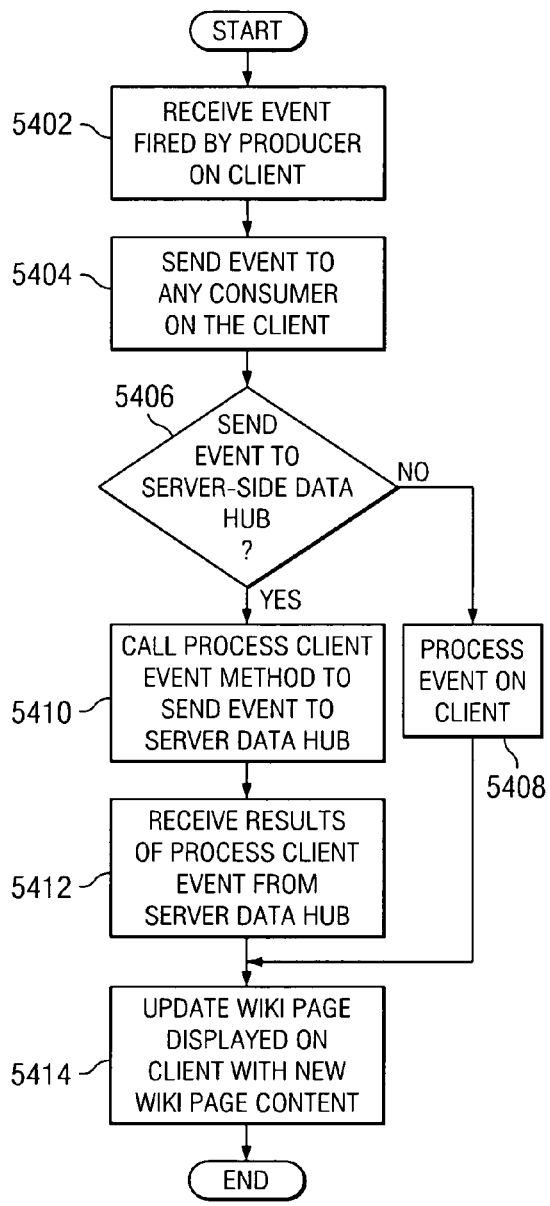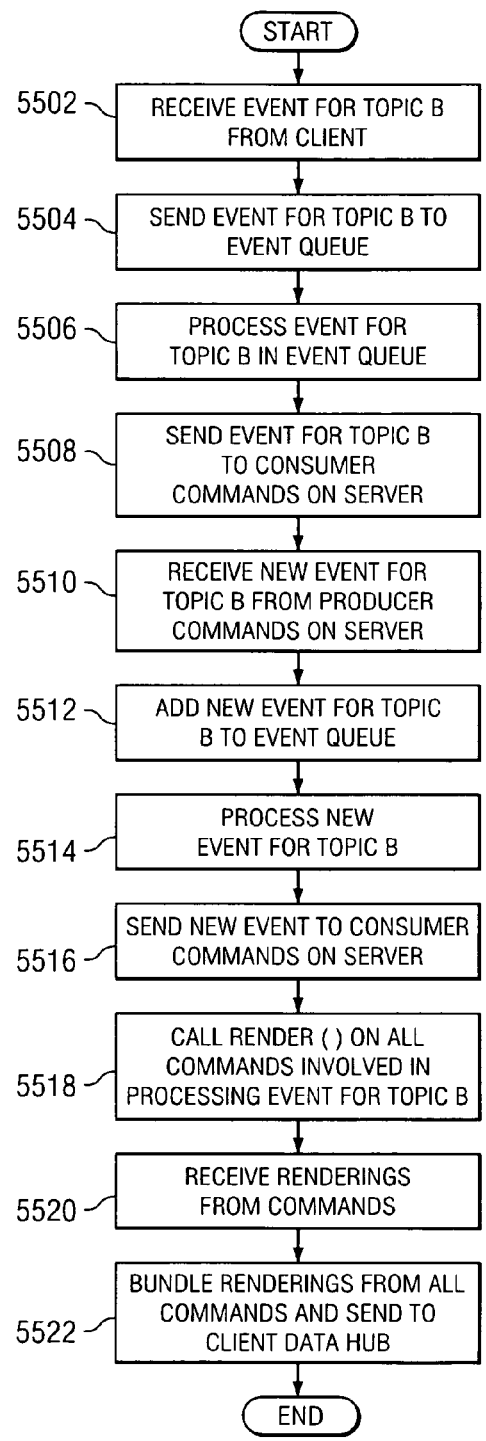

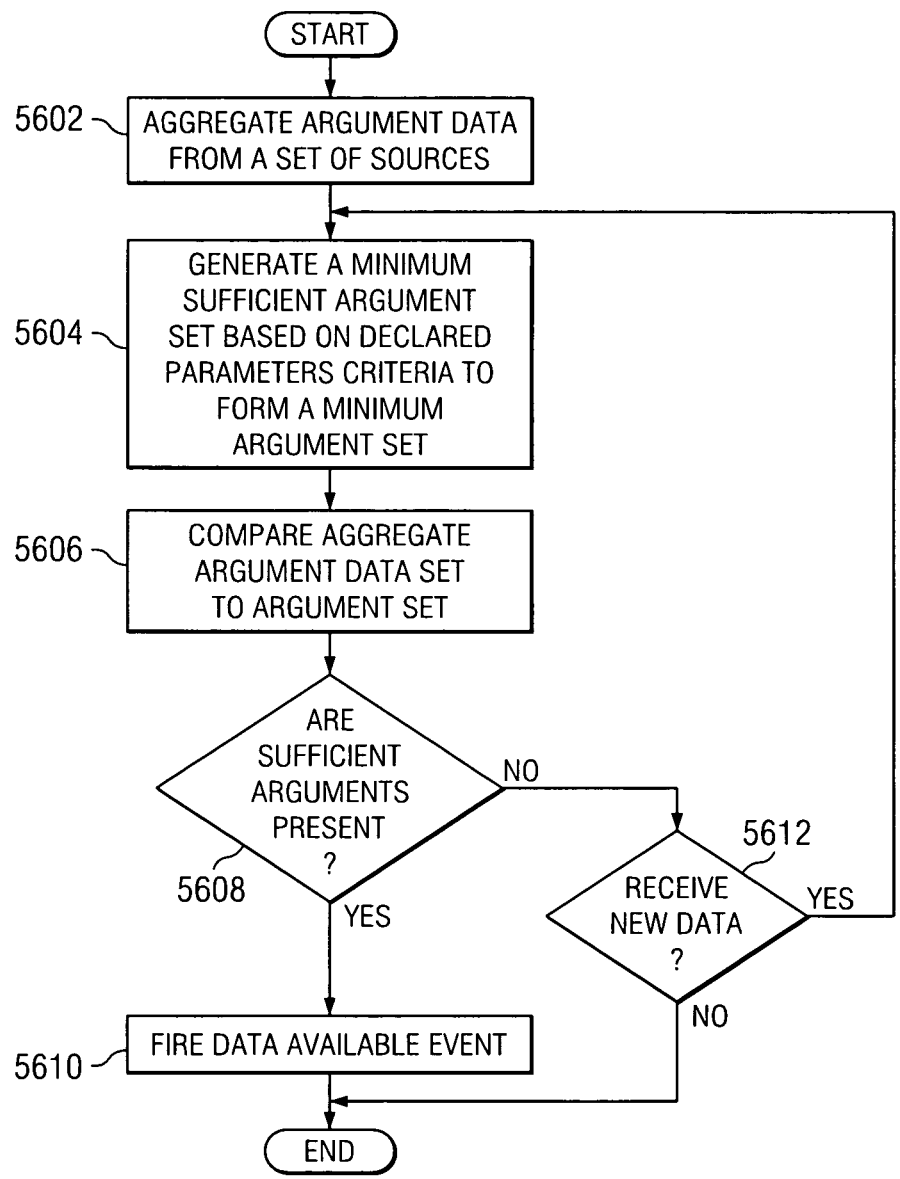

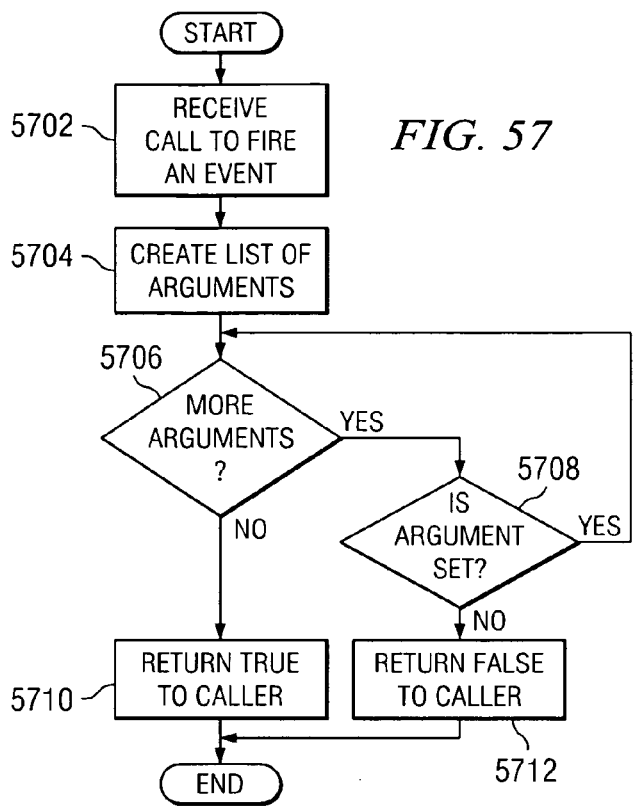
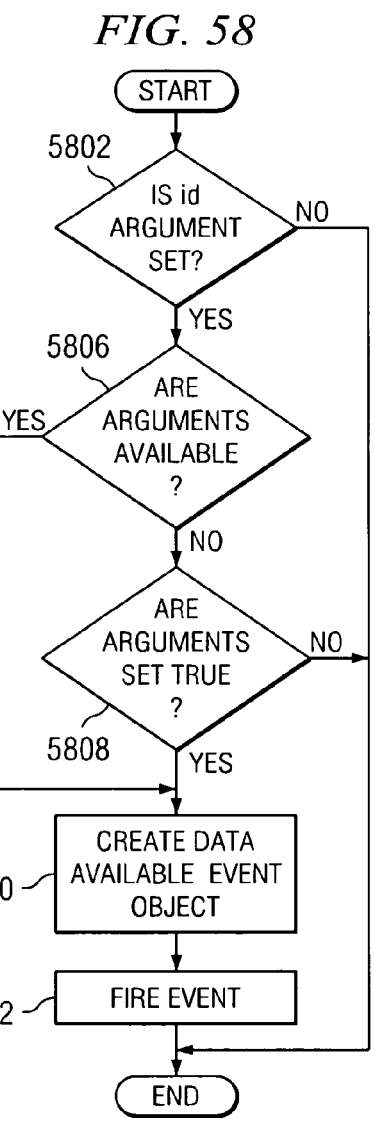
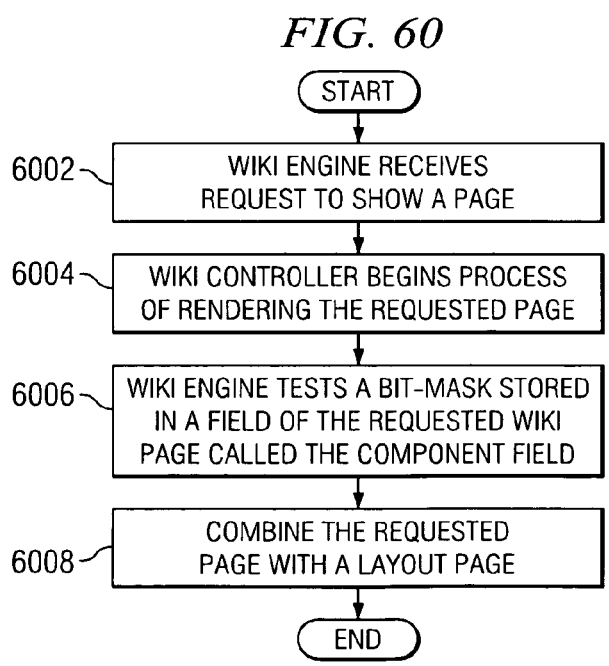

FIG. 61

```
class WikiDataHub {
    public $pageInstance = null; // Page instance
    commands = array();   // Array of wiki command objects    6104
    consumers = array();  // Array of consumer ids    6106
    producers = array();  // Array of producer ids
    topics = array();
    events = array();                        6108
    clientHandlers = array();
```

6200
- 6202: public static function init($pageInstance)
  // Restore WikiDataHub object from file system.
- 6204: public function save()
  // Cache serialized WikiDataHub object to file system.

FIG. 64

6400
- 6402: public function fireEvent(DataHubEvent $event)
  //Fire an event
- 6404: public function processEvents()
  //Process events on the server.
- 6406: public function processClientEvent($events)
  //Process a client events destined for the server.
  Multiple events can be sent as a batch.

FIG. 63A

```
public function addCommand(WikiCommand $command)                        ─ 6302
public function getCommands()                                           ─ 6304
public function getCommand($commandId)                                  ─ 6306
public function addProducer(WikiCommand $producer,                      ─ 6308
   $type=self::DEFAULT_PRODUCER)
public function addEditableProducer(WikiCommand $producer)              ─ 6310
public function removeProducer($producerID)                             ─ 6312
public function getProducers()                                          ─ 6314
public function addConsumer($consumerId, $topic,                        ─ 6316
   $callback, $arg=null, $client=false, $server=false)
public function removeConsumer($consumerId, $topic)                     ─ 6318
public function getConsumers($topic='')                                 ─ 6320
public function addClientConsumer($consumerID, $topic, $callback,       ─ 6322
   $arg='', $client=true, $server=false)
public function addClientHandler($consumerId, $method, $code)           ─ 6324
public function getClientHandlers()
       //Get client handlers.
public function removeProducer($producerId)
       //Remove producer (regular or editable producer)
public function getProducers()
       //Get list of all producers
public function addConsumer($consumerId, $topic,
   $callback, $arg=null, $client=false, $server=false)
       //Add consumer as a listener for a particular topic
public function removeConsumer($consumerId, $topic)                     ─ 6326
public function get Consumers($topic='')                                ─ 6328
public function addClientConsumer($consumerId, $topic, $callback,       ─ 6330
   $arg='', $client=true, $server=false)
public function addClientHandler($consumerId, $method, $code)
       //Add client javascript handler.
public function getClientHandlers()
       //Get client handlers.
public function generate client()                                       ─ 6332
```

```
public function addTopic($topic)                                        ─ 6342
       //Add event topic this command produces.
public function removeTopic($topic)                                     ─ 6344
       //Remove event topic.
public function getTopics($mask='*/*/*')
       //Get the event topics produced.
```

6500 {
- 6502 {
  ```
  public function setArguments($cmdId, $args)
      //Set arguments for command. This changes the
  arguments in the source if $update=T.
  ```
  ```
  public function updateCommand($cmdId, $args)
      //Update arguments for command. This changes the
  arguments in the source if $update=T.
  ```
- 6504 {
  ```
  public function deleteCommand($cmdId)
      //Delete command from page source.
  ```
  ```
  public function renderCommandSample($cmdId)
      //Render sample for command and return result.
  public function renderCodeSample($code)
      //Render sample wiki markup code and return result.
  public function addNewCommand($cmdId, $target, $position)
      //Add new command to wiki page.
  public function addNewCode($code, $target, $position)
      //Add new wiki markup to wiki page.
  public function moveCommand($cmdId, $target, $position)
      //Move command on the page.
  ```

FIG. 66

6600 {
```
Class DataHub {
    this.consumers = [ ];        // 6602
    this.topics = [ ];           // 6604
    this.draggable = [ ];
    this.data = [ ];
    this.events = [ ];           // 6606
    this.commands = [ ];
    this.pageName = null;
    this.pageId = null;
```

FIG. 67

6700 {
- 6702 {
  ```
  // Add consumer
  addConsumer: function(consumerId, topic, callback, arg, client, server)
  ```
- 6704 {
  ```
  // Remove consumer
  removeConsumer: function(consumerId, topic)
  ```

FIG. 68

6800 {
- 6802 { // Add topic that is available for other consumers
  addTopic: function(topic)
- 6804 { // Get list of available topics
  getTopics: function()

FIG. 70

7000 {
```
// Add wiki command
addCommand: function(cmd)   ~7002

// Get wiki command
getCommand: function(cmd)

// Refresh content of div
refreshContent: function(divToUpdate, value)

setServerArguments: function(cmd, args)

updateCommand: function(cmd, args)

deleteCommand: function(cmd)   ~ 7004 renderCommandSample: function(cmd)

renderCodeSample: function(fragment)

addNewCommand: function(cmd, target, position)

addNewCode: function(cmd, target, position)

moveCommand: function(cmd, target, position)

// Set argument
setArgument: function(cmd, name, value)

// Get argument
getArgument: function(cmd, name)
```

FIG. 69

6900 {
  6902 { // Fire all queued up events (done onLoad)
         processEvents: function()

6904 { // Fire an event
         fireEvent: function(event)

6906 { // Send an event to the server to be executed
         fireServerEvent: function(event)
}

FIG. 71 class DataHubTopic {

7100 {
  const DEFAULT_TOPIC = 'string';
  const URL = 'url';
  public $topic;
  public $name;
  public $action;
  public $item;
  public $type;
} public function isEqual(DataHubTopic $topic)
... getter and setter methods for each object variable
}
Topics are specified as name/action/item where
- name is the name of the topic. This is usually the name of the producer, but can be any string.
- action represents the topic action verb, such as available, clicked, updated, etc.
- item further qualifies the name of the topic and is optional. It usually identifies the column or element that the data in the event represents.

As an example, consider a table display component with id "list":

list/selected/address indicates that the address column of the selected row was clicked on.

FIG. 73

```
class WikiArgument {  public $name;        // parameter name
       public $value;        // current value
       public $initValue;    // initial value
       public $rawValue;     // raw current value
7300   public $modified;     // modified
       public $valid;        // is valid  ──7302
       public $avail;        // bound argument has been set and is available ──7304
       public $parameter;    // Parameter object ...getter/setter methods for all properties...
}
```

FIG. 72

```
class DataHubEvent {
       public $topic;  ──7202
       public $producer;
7200   public $value;  ──7204
       public $index;
       public $arg;

... getter and setter methods for each object variable
}
```

FIG. 74

```
       function areArgumentsSet()
              foreach argument
                     if argument.avail is null
7400  7404  7402           return false
                     end if
              end foreach
              return true
       end function function setCheckArguments
              id = getArgument('id')
              if id is not null then
                     if argsAvail is not null OR argumentsAreSet(arguments available)
7406  7408           is true then
                            event = new DataHubEvent()
                            datahub.fireEvent(event)
                     end if
              end if
       end function
```

PROCESSING MODEL OF AN APPLICATION WIKI

The present invention is related to the following applications entitled Method and
Apparatus for Data Hub Objects, Curtis et al., Ser. No. 11/482,353; Method for Defining a Wiki Page Layout using a Wiki Page, Curtis et al., Ser. No. 11/482,376; Method for Extending the Capabilities of a Wiki Environment, Curtis et al., Ser. No. 11/482,496; Method for Programmatically Hiding and Displaying Wiki Page Layout Sections, Curtis et al., Ser. No. 11/482,388; Method for Inheriting a Wiki Page Layout for a Wiki Page, Curtis et al., Ser. No. 11/482,377; Method for Processing a Web Page for Display in a Wiki Environment, Curtis et al., Ser. No. 11/482,999; Generic Frequency Weighted Visualization Component, Curtis et al., Ser. No. 11/482,207; Relevant Term Extraction and Classification for Wiki Content, Curtis et al., Ser. No. 11/482,628; Method and Apparatus for Client Wiring Model, Curtis et al., Ser. No. 11/482,352; Method and Apparatus for Server Wiring Model, Curtis et al., Ser. No. 11/483,347; Method and Apparatus for Client and Server Interaction, Curtis et al., Ser. No. 11/482,426; and Method and Apparatus for Argument Detection for Event Firing, Curtis et al., Ser. No. 11/482,450; all filed even date hereof, all assigned to a common assignee, and all of which are incorporated herein by reference.

BACKGROUND

1. Technical Field

The present invention relates generally to an improved data processing system and in particular to a method and apparatus for a programming model. Still more particularly, the present invention relates to a computer implemented method, apparatus, and computer usable program code for manipulating content using a browser.

2. Description of the Related Art

The Internet is a global network of computers and networks joined together by gateways that handle data transfer in the conversion of messages from a protocol of the sending network to a protocol of the receiving network. On the Internet, any computer may communicate with any other computer in which information travels over the Internet through a variety of languages referred to as protocols. The set of protocols most commonly used on the Internet is called transmission control protocol/Internet protocol (TCP/IP).

The Internet has revolutionized communications and commerce as well as being a source of both information and entertainment. One type of software that has become more frequently used is Wiki software. Wiki software is a type of collaborative software that runs a Wiki environment. This software is provided in a shared environment that may be accessed through an interface by a group of users. A Wiki application is a type of website that allows users to manipulate content. Users may add, remove, or otherwise edit and change content very quickly and easily. Wiki applications are often used as an effective tool for collaborative writing. The current use of Wiki applications is directed towards collaborative content creation, such as online encyclopedias or other knowledge bases. Users typically can create content in a shared environment. In this environment, revisions of pages are saved to allow previous versions to be restored. Further, mark-up shortcuts are provided for creating inter-page links. Further, a "what you see is what you get" (WYSIWYG) editing mode/editor is often utilized.

BRIEF SUMMARY

The illustrative embodiments described herein provide a computer implemented method for managing a collaborative web page. A set of tools is displayed to manipulate the collaborative web page. The set of tools includes a plurality of graphical representation of commands for modifying dynamic content of the collaborative web page. A property editor is presented to modify properties of one of the plurality of graphical representation of commands.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a network of data processing systems in which illustrative embodiments of the present invention may be implemented;

FIG. 2 is a block diagram of a data processing system in which illustrative embodiments of the present invention may be implemented;

FIG. 9 is a page tree view in accordance with an illustrative embodiment of the present invention;

FIG. 11 is a block diagram of an abstract syntax tree in accordance with an illustrative embodiment of the present invention;

FIG. 12 is a block diagram of commands in accordance with an illustrative embodiment of the present invention;

FIG. 13 is a diagram showing property editing components in accordance with an illustrative embodiment of the present invention;

FIG. 14 is a diagram illustrating a data flow between commands on a client and server for a Wiki application in accordance with an illustrative embodiment of the present invention;

FIG. 16 is a diagram illustrating a Wiki page generated in response to a page request from a user in accordance with an illustrative embodiment of the present invention;

FIG. 29 is a flowchart of a process for combining content of Wiki pages in accordance with an illustrative embodiment of the present invention;

FIG. 30 is a flowchart of a process for editing a command in accordance with an illustrative embodiment of the present invention;

FIG. 31 is a flowchart of a process for rendering a Wiki command in accordance with an illustrative embodiment of the present invention;

FIG. 32 is a flowchart of a preliminary process for property editing in accordance with an illustrative embodiment of the present invention;

FIG. 33 is a flowchart of a process for property editing in accordance with an illustrative embodiment of the present invention;

FIG. 40 is a flowchart of a process for palette construction in accordance with an illustrative embodiment of the present invention;

FIG. 41 is a flowchart of a process for configuration in accordance with an illustrative embodiment of the present invention;

FIG. 45 is a process for processing a web page for display in a Wiki in accordance with an illustrative embodiment of the present invention;

FIG. 46 is a flowchart of processing events in accordance with an illustrative embodiment of the present invention FIG. 47 is a flowchart of an operation occurring when a server-side data hub object is instantiated in accordance with an illustrative embodiment of the present invention;

FIG. 54 is a flowchart of an operation occurring when a client-side data hub determines whether to send an event to a server for processing in accordance with an illustrative embodiment of the present invention;

FIG. 55 is a flowchart of an operation occurring when a server-side data hub receives an event from a client-side data hub as a result of a processClientEvent method call in accordance with an illustrative embodiment of the present invention;

FIG. 56 is a flowchart of an operation occurring when a Wiki argument object performs a minimum sufficient argument process in accordance with an illustrative embodiment of the present invention;

FIG. 57 is a flowchart illustrating an operation ocurring when a Wiki argument object determines if the minimum required arguments of a command are set in accordance with an illustrative embodiment of the present invention;

FIG. 58 is a flowchart illustrating a setCheckArguments method for detecting if an argument/available event should be fired in accordance with an illustrative embodiment of the present invention;

FIG. 60 is a flowchart of the operation of rendering a Wiki page in accordance with an illustrative embodiment of the present invention;

FIG. 61 is an illustration of class definition for a server-side data hub object class in accordance with an illustrative embodiment of the present invention;

FIG. 62 is an illustration of a set of method interfaces for a class of data hub management methods in accordance with an illustrative embodiment of the present invention;

FIG. 63A is an illustration of a set of method interfaces for a class of producer and consumer methods in accordance with an illustrative embodiment of the present invention;

FIG. 63B is an illustration of a set of method interfaces for a class of topic methods in accordance with an illustrative embodiment of the present invention;

FIG. 64 is an illustration of a set of method interfaces for a class of event processing methods in accordance with an illustrative embodiment of the present invention;

FIG. 65 is an illustration of a set of method interfaces for a class of command management methods in accordance with an illustrative embodiment of the present invention;

FIG. 66 is an illustration of a class definition for a client-side data hub object class in accordance with an illustrative embodiment of the present invention;

FIG. 67 is an illustration of a set of method interfaces for a class of producer and consumer methods in accordance with an illustrative embodiment of the present invention;

FIG. 68 is an illustration of a set of method interfaces for topic methods in accordance with an illustrative embodiment of the present invention;

FIG. 69 is an illustration of a set of method interfaces for event processing methods in accordance with an illustrative embodiment of the present invention;

FIG. 70 is an illustration of a set of method interfaces for command management methods in accordance with an illustrative embodiment of the present invention;

FIG. 71 is an illustration of a class definition and method interfaces for a class of data hub topic objects in accordance with an illustrative embodiment of the present invention;

FIG. 72 is an illustration of a class definition and method interfaces for a class of data hub event objects in accordance with an illustrative embodiment of the present invention;

FIG. 73 is an illustration of a class definition for a Wiki argument object class in accordance with an illustrative embodiment of the present invention; and FIG. 74 is an illustration of pseudocode of an algorithm to detect whether to fire an argument/available event in accordance with an illustrative embodiment of the present invention.

DETAILED DESCRIPTION OF AN ILLUSTRATIVE EMBODIMENT

Figure 3:
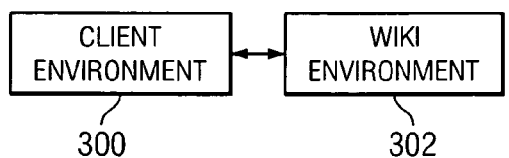
FIG. 3 is a diagram illustrating components for use in generating and using Wiki applications in accordance with an illustrative embodiment of the present invention.

With reference now to the figures and in particular with reference to FIGS. 1-2, a description of corresponding diagrams of data processing environments is provided in which illustrative embodiments of the present invention may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments of the present invention may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments of the present invention may be implemented. Data processing system 200 is an example of a computer, such as server 104 or client 110 in FIG. 1, in which computer usable code or instructions implementing processes of the various illustrative embodiments of the present invention may be located.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204, audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may also be coupled to south bridge and I/O controller hub 204 through bus 238 as shown.

In the illustrative embodiment of FIG. 2, an operating system runs on processor 206 and coordinates and provides control of various components within data processing system 200. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer-executable instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system, such as bus 238 and 240, may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

In the illustrative examples, server 104 may host a Wiki application. The environment at server 104 allows clients, such as clients 110, 112, and 114 to collaborate and develop applications in accordance with an illustrative embodiment. These applications may include, for example, weather related applications, registrations and rosters for schools, e-mail applications, and other types of business oriented applications. The different embodiments may include processes at the server side, client side, or both in providing a collaborative environment to develop Wiki applications in accordance with an illustrative embodiment.

The illustrative embodiments recognize that current Wiki applications are not suited for collaborative development of applications beyond collaboration of text and files as a knowledgebase or document.

Turning now to FIG. 3, a diagram illustrating components for use in generating and using Wiki applications is depicted in accordance with an illustrative embodiment of the present invention. In this example, a user may interact with client environment 300 to generate and use applications supported by Wiki environment 302. Client environment 300 is a software application or environment executing on a client, such as client 110 in FIG. 1. Wiki environment 302 executes on a data processing system, such as server 104 in FIG. 1.

In these examples, a user at client environment 300 may send a request to Wiki environment 302 for a page. The user makes the request through a browser within client environment 300 in these examples. Wiki environment 302 returns the page to the user. In these illustrative examples, the page includes JavaScript that enables the user to manipulate and select content for a page to be generated. In the illustrative embodiments, these pages are collaborative Web pages that provide user access to applications. These applications are collaborative applications that may be used and modified by users at client computers.

In particular, the different illustrative embodiments provide a method and apparatus for a user to generate an application with functionality beyond that of a collaborative writing tool.

Many of the features in these examples are provided through PHP: Hypertext Preprocessor (PHP). PHP is a programming language for creating web applications that execute on Wiki environment 302. PHP is an open source, hypertext markup language embedded scripting language designed as a high-level tool for generating dynamic web content.

Depending on the particular implementation, the different features provided in the illustrative embodiments may be facilitated through the use of a virtual machine, such as a Java virtual machine (JVM). Also, other scripting languages other that JavaScript may be used to implement these processes, depending on the particular embodiment.

Figure 4:
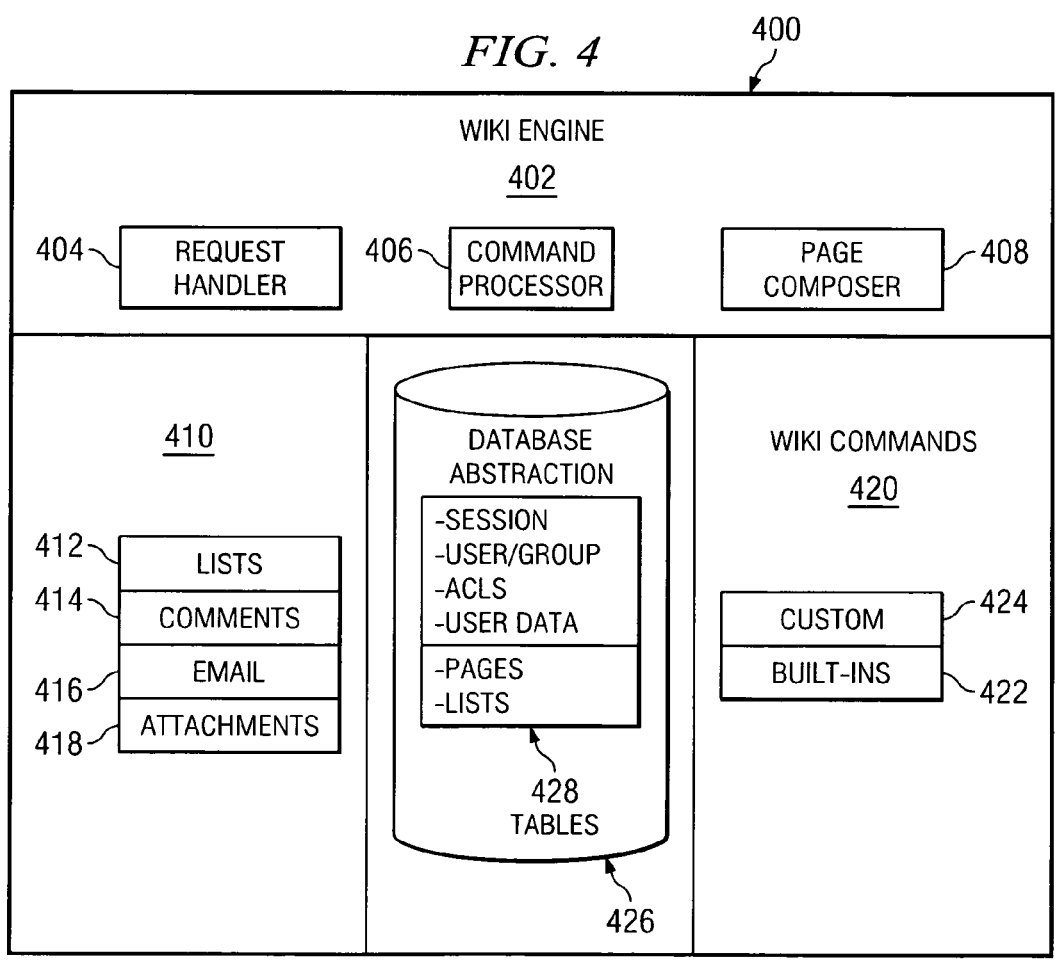
FIG. 4 is a diagram illustrating a Wiki architecture in accordance with an illustrative embodiment of the present invention.

Turning now to FIG. 4, a diagram illustrating a Wiki architecture is depicted in accordance with an illustrative embodiment of the present invention. In these particular examples, this architecture is a quite easily done (QED) Wiki architecture. As illustrated, Wiki environment 400 contains Wiki engine 402. This engine includes request handler 404, command processor 406, and page composer 408. Request handler 404 receives requests from clients.

For example, a user may send a universal resource identifier (URI) in the form of a universal resource locator (URL) to Wiki environment 400. This request is received by request handler 404 for processing. In these examples, one page is generated for each request handled by request handler 404. Request handler 404 also generates "page fragments" for handling AJAX based interactions which are hypertext markup language source fragments rather than complete hypertext markup pages.

Command processor 406 processes different commands to build a page or page fragment in response to a request received by request handler 404. Additionally, command processor 406 renders a page when processing of commands and text fragments has completed. Page composer 408 is also involved in generating the page request by the user. In these examples, page composer 408 is employed in layouts, page body content, and script collection for a page.

Wiki environment 400 also includes ancillary functions 410. In this example, ancillary functions 410 include lists 412, comments 414, email 416, and attachments 418. With lists 412, a user may generate lists for other users to see. Further, using comments 414, the user may add commentary or other text to different pages. Attachments 418 allows a user to attach files to a particular page. Email 416 allows for users to be notified when pages have been updated or modified, or for a user to send an email to a page as an attachment. Email 416 also allows one or more users to receive messages regarding changes to a specified page. Users may subscribe to a rich site summary (RSS) feed of the Wiki to determine when pages of the Wiki change.

Additionally, Wiki environment 400 contains Wiki commands 420. Wiki commands 420 within the illustrated embodiment contain two types of commands, built-in commands 422 and custom commands 424. Built-in commands 422 are commands or services that are present within Wiki environment 400. Custom commands 424 reference commands that are provided through external sources. Basically, these commands allow a user to include and process data for a page.

In one ore more embodiments, Wiki commands 420 involve the use of a service oriented architecture (SOA). Such SOA commands allow a user to include services with a page. In these examples, commands may reference services with well defined interfaces that are independent of the applications and the competing platforms in which they run.

In the depicted examples, services are software modules. These types of services are typically based on a standard-compliant interface, such as web service description language (WSDL). Of course, the services referenced by Wiki commands 420 may involve any type of interface. These commands may take various forms. For example, the commands may be for financial, weather, mapping, news and events, searching, government, or international information.

Database 426, contains information, such as the pages requested and created by users. Further, revisions of pages, attachments, comments, and other information are stored within database 426. Information is typically stored in the form of tables 428 within database 426 in the illustrative embodiments.

Figure 5:
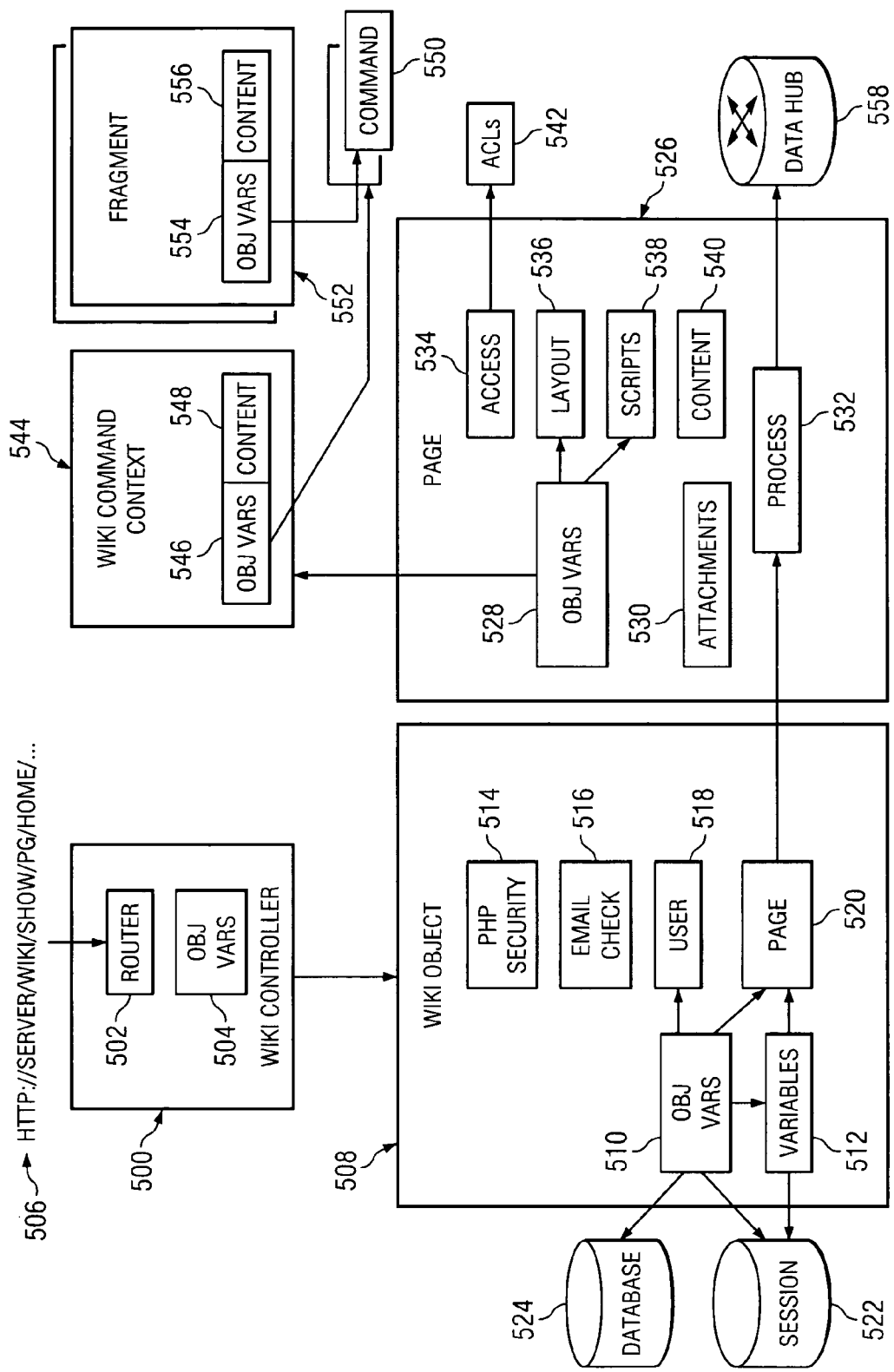
FIG. 5 is a diagram illustrating dataflow in rendering a page in accordance with an illustrative embodiment of the present invention.

Turning now to FIG. 5, a diagram illustrating dataflow in rendering a page is depicted in accordance with an illustrative embodiment of the present invention. In these examples, a page is rendered on a server when processing of the page is completed and the page is ready for transmission to a client. The different components illustrated in FIG. 5 are manipulated through a Wiki engine, such as Wiki engine 402 in FIG. 4.

The programming architecture and model illustrated in these illustrative embodiments allow for visual assembly of Wiki content using a browser on a client. Everything requested by the client is conceptually a page. For example, a variable is referenced using a universal resource identifier model, such as a page and variable name. Further, pages are used as data structures in these examples. Variables are stored for later use. These variables include session variables, request variables, and persistent variables.

In the illustrative examples, users create structured data though lists. These lists may be queried, searched, and/or combined. In manipulating lists, the users employ a create, retrieve, update, and delete (CRUD) process.

Wiki controller 500 receives universal resource identifier 506 from a user. Wiki controller 500 contains router 502 and object variables 504. Router 502 delegates request processing to the appropriate request handler. Object variables 504 provide interconnection between the processing components. For example, Wiki controller 500 has object variables 504 "Wiki" which is a pointer to Wiki object 508. Each object in FIG. 5 has object variables that are references to other resources required for object interaction. Wiki controller 500 is handled by a request handler, such as request handler 404 in FIG. 4.

In response to receiving universal resource identifier 506, Wiki controller 500 instantiates an instance of Wiki object 508. As illustrated, Wiki object 508 contains object variables 510, variables 512, PHP security 514, email check 516, user 518 and page 520. Wiki object 508 is an instance that is instantiated whenever a request is received and which acts as a repository for all of the objects used to generate content for page 520.

In these examples, object variables 510 contains the information needed to process page 520. Variables 512 contain session information stored in session 522. This session information is information used during user interaction with a page or during the generation of a page in these examples. More persistent data in object variables 510 are stored in database 524. Database 524 stores any information that may be used to generate the page or to store changes made by a user in the depicted examples.

PHP security 514 is a function used to determine whether code identified by a client may be run as well as to initiate execution of the code. PHP is an open source programming language that is mainly employed on server side applications. In these illustrative examples, PHP code may be executed by different objects within a Wiki environment. In these examples, a user may run PHP code from the client-side, as well as the server-side. Email check 516 is provided in Wiki object 508 to check for email messages that may be displayed on page 520 when page 520 is rendered and sent to a user. User 518 contains information about the user, such as user privilege levels, identifiers, and session logs.

Page 526 is a more detailed example of page 520 contained within Wiki object 508. In this example, page 526 contains object variables 528, attachments 530, process 532, access 534, layout 536, scripts 538 and content 540.

In these examples, object variables 528 contain an instance of variables for page data structures. For example, a section array may be present to provide for layout information. A context pointer may reference a root Wiki command. An instance ID may be present in object variables 528 to reference an internal page ID. These different variables contain information needed to render a page, such as page 526, to be sent to a user.

Attachments 530 are identifications of attachments that may be presented on a page. If a user selects an attachment, the attachment can then be downloaded to the user at that time. Process 532 contains the code used to generate a page to be delivered to the user. In these illustrative examples, a process is a method, for example, to identify content for the page, identify any attachments and identify any scripts that may be included in the page to be sent to the user.

Access 534 is used to determine what access privileges the user has with respect to content to be placed on the page. Such access privileges are identified in one embodiment utilizing access control lists (ACLs) 542. Content to be included may vary for page 526 depending on the access that a particular user, requesting the page, has. This user is the user requesting page 526. In generating content for page 526, object variables 528 references Wiki command context 544. This command context contains object variables 546 and content 548. Object variables 546 represent an in-memory version of a page's contents. These variables include a list of the commands and a list of text fragments that comprise the current page. Content 548 represents the object methods used to manipulate the page content.

In executing process 532 in page 526, a set of commands from commands 550 are identified through Wiki command context 544. Wiki command context 544 generates a set of command instances from commands 550. Wiki command context 544 parses content 540 and loads the commands to create a tree structure of fragments, such as fragment 552. Fragment 552 also contains object variables 554 and content 556. Fragment 552 is a portion of page 526 in un-rendered form. In this example, Wiki command context 544 contains fragments that represent the structure of the commands that are to be included in the page. These are commands that may be user-manipulated. When process 532 is complete, page 526 is sent down to a requesting user. Data hub 558 is saved for later use in the interaction. Also, in this example, data hub 558 is restored when a user interacts with a component within page 526 and contians processes and a data structure. The processes within data hub 558 are used to identify what commands for a page within fragment 552 are consumers of any data or commands that may be received by data hub 558. Additionally, data hub 558 will return results to the client. These results are sent to a data hub located on the client.

Figure 6:
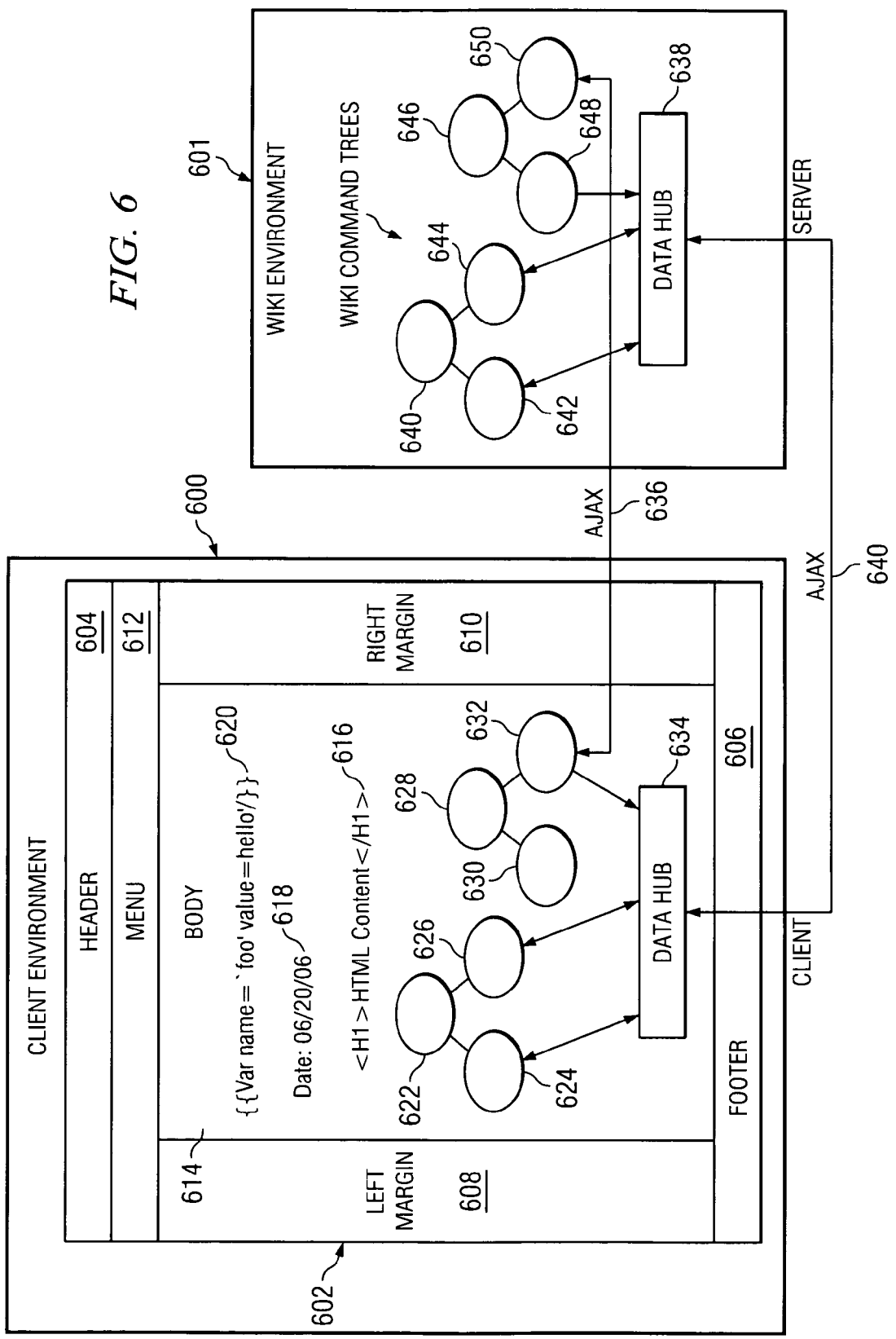
FIG. 6 is a diagram illustrating components on a client and server for a Wiki application in accordance with an illustrative embodiment of the present invention.

Turning now to FIG. 6, a diagram illustrating components on a client and server for a Wiki application is depicted in accordance with an illustrative embodiment of the present invention. In this example, client environment 600 is a more detailed illustration of client environment 300 in FIG. 3. Client environment 600 in these illustrative embodiments may take the form of a client web browser or some other application that has connectivity to a network, such as the Internet. Wiki environment 601 executes on a data processing system, such as server 104 in FIG. 1.

In this example, client environment 600 receives page 602. Page 602 includes a plurality of components, such as header 604, footer 606, left margin 608, right margin 610, menu 612, and body 614. Header 604, footer, 606, left margin 608, and right margin 610 are page components for laying out pages. These components include various content, such as hypertext markup language (HTML) content.

Menu 612 provides access to actions or functions that a user can perform on page 602 or in conjunction with page 602. For example, menu 612 can include a menu item to send a request to the server that, when granted, would permit the user to edit page content in a WYSIWYG editor.

In this example, different types of content are found within body 614. In this example, body 614 contains HTML content 616, date information 618, and variable 620. Body 614 also contains commands 622, 624, 626, 628, 630, and 632. Commands 622, 624, 626, 628, 630, and 632 are Wiki commands, such as Wiki commands 420 in FIG. 4. These commands are commands for a Wiki application presented though page 602. Commands 622, 624, 626, 628, 630, and 632 along with data hub 634 provide for dynamic content within page 602.

Data hub 634 is a data hub object in a Wiki environment, similar to data hub 558 in FIG. 5. However, data hub 634 is a client-side data hub. Data hub 634 includes attributes and a set of methods for sending and receiving event objects between the commands in page 602 and those in Wiki environment 601. Data hub 634 includes attributes and a set of methods for sending and receiving events and/or data between the commands in page 602 and those within Wiki environment 601.

An event object is a data object that defines an event that is transmitted between commands associated with a Wiki page, such as page 602. An event object can include, but is not required to include, event data. In these examples, an event is a message indicating that something has happened, such as an occurrence or happening of significance to a task, program, or command. For example, an event can include receiving user input, gathering a minimum required set of arguments, completion of a command operation, a given time occurring, or any other activity, receipt of input or data, occurrence, happening, or activity.

The illustration of the different types of content within page 602 is presented for purposes of depicting the manner in which a Wiki application may be presented to a user. This illustration, however, is not meant to imply limitations as to the type and scope of content that may be used in a Wiki application. For example, page 602 may include other additional content, commands, and/or components not illustrated in FIG. 6 without departing from the scope of the illustrative embodiments of the present invention.

A user may manipulate content within page 602 to use the Wiki application and/or change the manner in which the Wiki application performs. In other words, the user may add content or remove content, such as commands, from page 602 though manipulating a graphical representation of these commands to generate or modify content and/or functionality for page 602.

In this example, Wiki environment 601 is a Wiki environment, such as Wiki environment 302 in FIG. 3 and Wiki environment 400 in FIG. 4. Wiki environment 601 includes commands 640-650 in the form of command trees or abstract syntax trees. Commands 640-650 are updated in the Wiki environment. Commands 640-650 and commands 624-632 differ in implementation but refer to similar command. For example, command 632 is associated with a client environment and is updated in client environment 600 by a user. Corresponding command 650 is updated in Wiki environment 601 by means of asynchronous JavaScript and extensible markup language using AJAX 636 over a network connection.

AJAX 636 is a web development technique for creating interactive web applications, such as Wiki pages. AJAX 636 exchanges small amounts of data with an associated host server behind the scenes so that an entire page is not reloaded each time a user makes a change to a requested page. AJAX 636 is meant to increase the interactivity, speed, responsiveness, and usability of a page, such as page 602. Although the illustrative embodiments depict exchanging data via AJAX or JSON, any communication protocol agreed upon between a given set of components may be used to exchange data in accordance with the illustrative embodiments of the present invention.

Commands 640, 642, 644, 646, 648, and 650 in Wiki environment 601 interact with data hub 638. Data hub 638 is a server-side data hub, such as data hub 558 in FIG. 5. In this illustrative example, data hub 634 of client environment 600 and data hub 638 exchange events and/or data via AJAX 640. AJAX 636 and 640 may communicate using extensible markup language (XML) as the format for transferring data between client environment 600 and Wiki environment 601, although any format will work, including preformatted hypertext mark-up language (HTML), plain text, and JavaScript object notation (JSON). JavaScript object notation is a lightweight computer data interchange format. JSON is a subset of the object literal notation of JavaScript but its use does not require JavaScript.

The illustrative embodiments provide a computer implemented method, apparatus, and computer usable program code for an application Wiki. A Wiki application is a collaborative web environment that allows single or multiple users to efficiently integrate static and interactive content. A Wiki page is a page within the Wiki application. The illustrative embodiments of the present invention allow a user to easily create and manage Wiki pages. The user may edit a Wiki page by dragging and dropping live content. Live content is dynamic content that is being updated based on changing information. For example, live content may include a weather graphic for a specified geographic location that is updated by a server linked to a weather radar station.

Wiki pages are saved in a page tree view. The page tree view is a content hierarchy that includes pages and sub-pages. The page tree view may be referred to as a Wikispace, page space, tree, or other content hierarchy. Each page within the present description may be both a content provider and container for other sub-pages as required. The page tree view differs from other file structures because all of the pages may include content and simultaneously be viewed as containers. The pages in the page tree view are distinguished by the name assigned to each page. The pages include nodes and leaf nodes. Nodes may display content and function as folders or containers for other Wiki pages. Leaf nodes strictly provide content.

Figure 7:
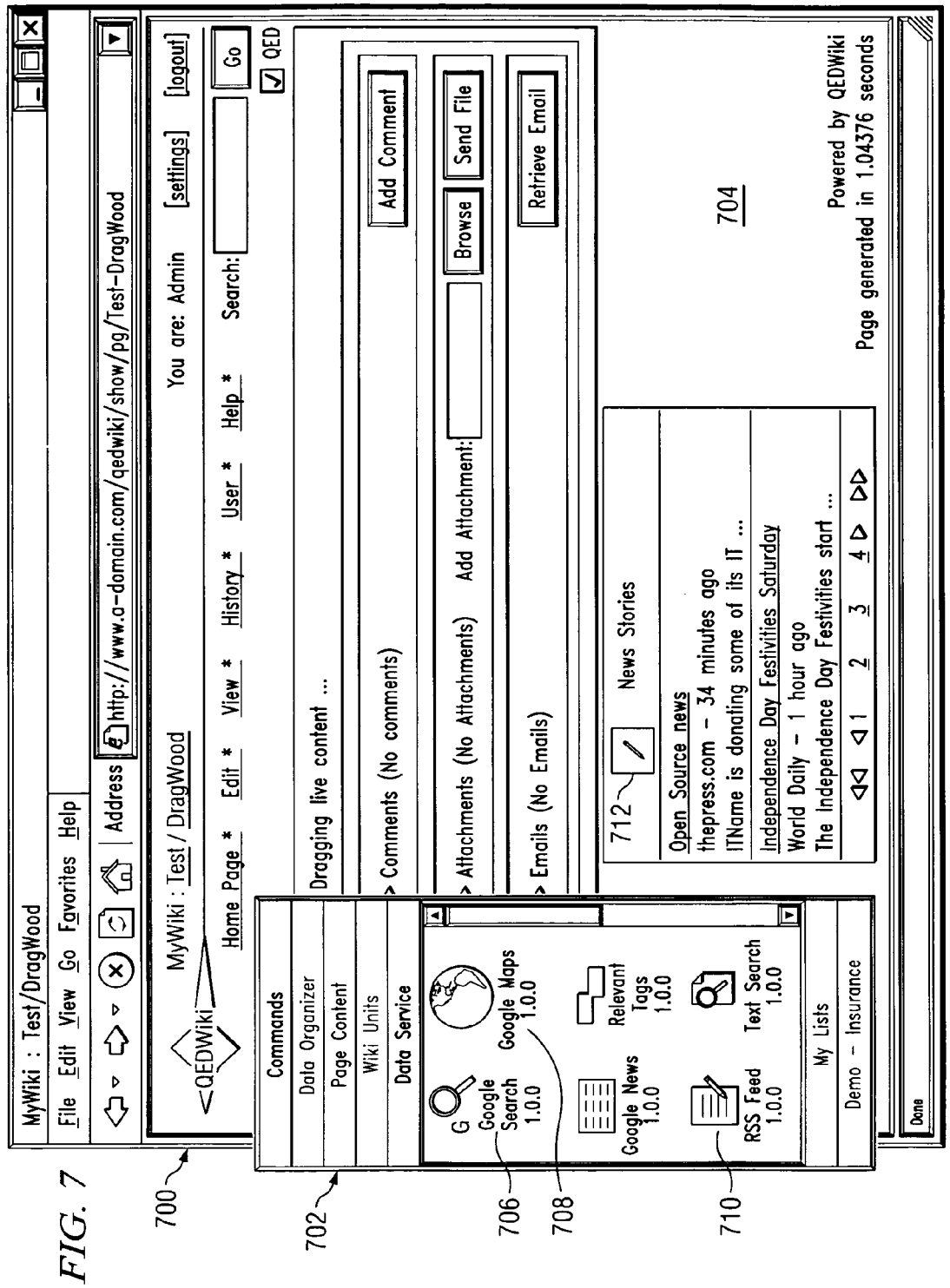
FIG. 7 is an exemplary screen of display for dragging live content in accordance with an illustrative embodiment of the present invention.

Turning now to FIG. 7, an exemplary screen of display for dragging live content is depicted in accordance with an illustrative embodiment of the present invention. Wiki page 700 is a page, such as page 602 in FIG. 6. Wiki page 700 may be specifically edited in a design mode. For example, a user may check a quite easily done (QED) check box indicating that the Wiki page is being edited. In design mode, Wiki page 700 may display palette 702. Palette 702 is a toolbar or a set of tools used to collaboratively manipulate a web page. For example, the user may use palette 702 to select live content for display in body 704 of Wiki page 700. Body 704 is the portion of Wiki page 700 that may be customized and edited to display user-specified content.

Palette 702 may include any number of icons 706, 708, and 710. Each icon is a graphical representation of an available command. Palette 702 may be used to display content which may include commands, data, page content, Wiki utilities, data services, customized lists, and any number of other features.

Icon 706 may be, for example, a live link to a Google™ search tool in the form of an icon. Icon 708 may be a live link to Google™ maps (Google, Google Search, and Google Maps are trademarks of Google Corporation in the United States, other countries, or both). Icon 710 may be a rich site summary or really simple syndication (RSS) feed. Rich site summary is a protocol and application of extensible markup language (XML) that provides an open method of syndicating and aggregating web content. Using rich site summary, a user may create a data feed that supplies headlines, links, and article summaries from a web site. Users may have constantly updated content from web sites delivered to Wiki page 700 via a news aggregator in body 704. A news aggregator is a piece of software specifically tailored to receive these types of feeds.

In one example, a user may display a Google® map in body 704 by dragging icon 708 from palette 702 onto body 704. The user may further customize the content displayed by a Wiki command using a property editor as will be described in FIG. 8. Existing Wiki commands in the page content display eye-catchers, such as eyecatcher 712, that indicate properties of the existing Wiki command may be edited.

Figure 8:
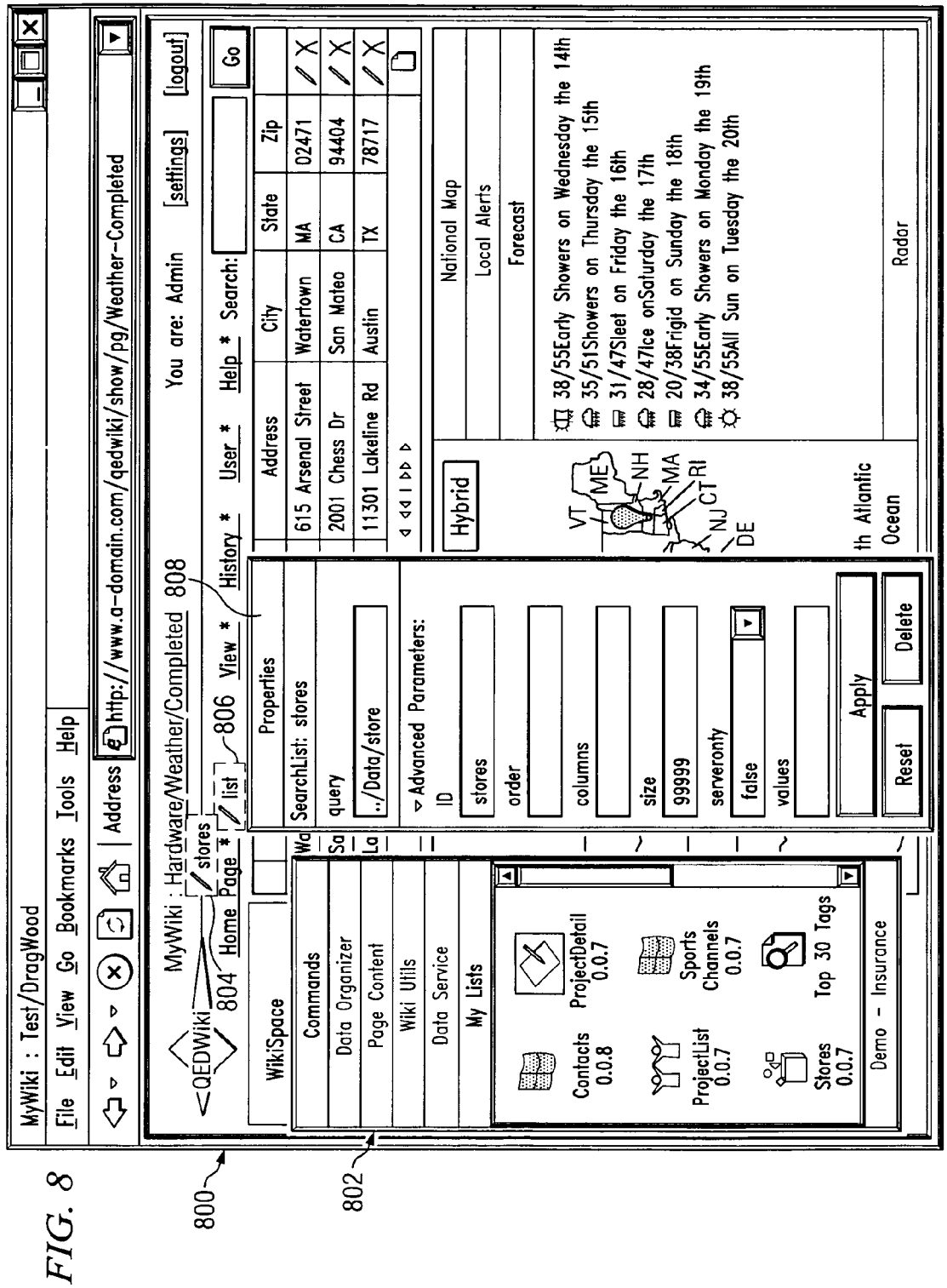
FIG. 8 is a screen of display for editing properties of a command in accordance with an illustrative embodiment of the present invention.

Turning now to FIG. 8, a screen of display for editing properties of a command is shown in accordance with an illustrative embodiment of the present invention. A modern application Wiki needs a visual means of editing Wiki "markdown" command attributes that does not require the user to edit the page, allowing the user to modify command settings without a jarring page refresh and conceptual context switch.

An application Wiki reduces the burden of a user having to know or learn hypertext markup language markup. In these examples, an application Wiki introduces shorthand syntax for creating lists and tables and other hypertext markup language constructs which uses a combination of short character sequences, line position, and white space. For example, a list item is defined by a single asterisk (*) in the first column of a line, followed by a single space versus the <OL><LI></LI></OL> tags required in hypertext markup language. The shorthand syntax introduced by the application Wiki is called "markdown" to emphasize the difference between creating content with hypertext markup language and in a Wiki environment. Wiki command classes support the generation of a visual property editor for editing "markdown" commands.

Wiki page 800 is a partial view of a Wiki page, such as Wiki page 700 in FIG. 7. Palette 802 is similar to palette 702 in FIG. 7. Wiki page 800 contains Wiki commands which display eye-catchers 804 and 806, named stores and list.

Properties of Wiki commands displaying eye-catchers 804 and 806 may be edited using property editor 808. Properties are the attributes, data, fields and other information used by the command represented by the eye-catcher to display content on Wiki page 700 in FIG. 7. Property editor 808 allows a user to customize the information displayed by the live content. Property editor 808 is comprised of hypertext markup language and JavaScript which is downloaded, along with Wiki page content to the browser client. For example, a user may specify a specific address for displaying a Google® map. Similarly, the user may make queries and limit the information displayed in Wiki page 800.

The user may use property editor 808 to enter width and height values for Wiki commands that allow their visual representation to be sized. Additionally, property editor 808 may be used to enter scaling factors, names of data sources, and maximum and minimum values are some other examples. Property editor 808 is used to surface points of variability of a Wiki command to the user.

For example, process 532 in FIG. 5 may generate a default property editor for each command as necessary. Each Wiki command may contribute a custom property editor to surface the unique points of variability for the Wiki command. Selecting eye-catchers 804 or 806 for a command causes the property editor for the associated command to be displayed.

Turning now to FIG. 9, a page tree view is depicted in accordance with an illustrative embodiment of the present invention. Page tree view 900 is a visual storage structure for visually displaying the organization of Wiki pages to a user. Page tree view 900 shows the names or tags of Wiki pages within the Wiki application. Tags are user-assigned labels that are used to categorize content of a Wiki. Each page in these examples is a node or leaf node.

Wikispace 902 is the base page of page tree view 900 and may also be used to refer to the content of page tree view 900. Page tree view 900 is different from other file systems and data structures because Wikispace 902 and the other base pages or nodes including test 904, testing 906, toplevel 908, and Wiki 910 may both display content and function as folders or containers for other Wiki pages. A graphical indicator, such as a "+" sign, may indicate a Wiki page is a node. Wikispace 902 uses a flat hierarchy where each page represented by a node may be a container and content provider. For example, Wikispace 902 includes content but may also be used to link to Wiki sub-pages or leaf nodes including heloworld 912, homepage 914, and menutest 916. The base pages in page tree view 900 may be displayed as both content providers and page containers in these examples.

The user may use page tree view 900 to navigate the Wiki pages. For example, by clicking on a Wiki page, the contents and/or sub-pages of the Wiki page are displayed. As a result, the user may easily navigate the Wiki by selecting the page name.

Figure 10:
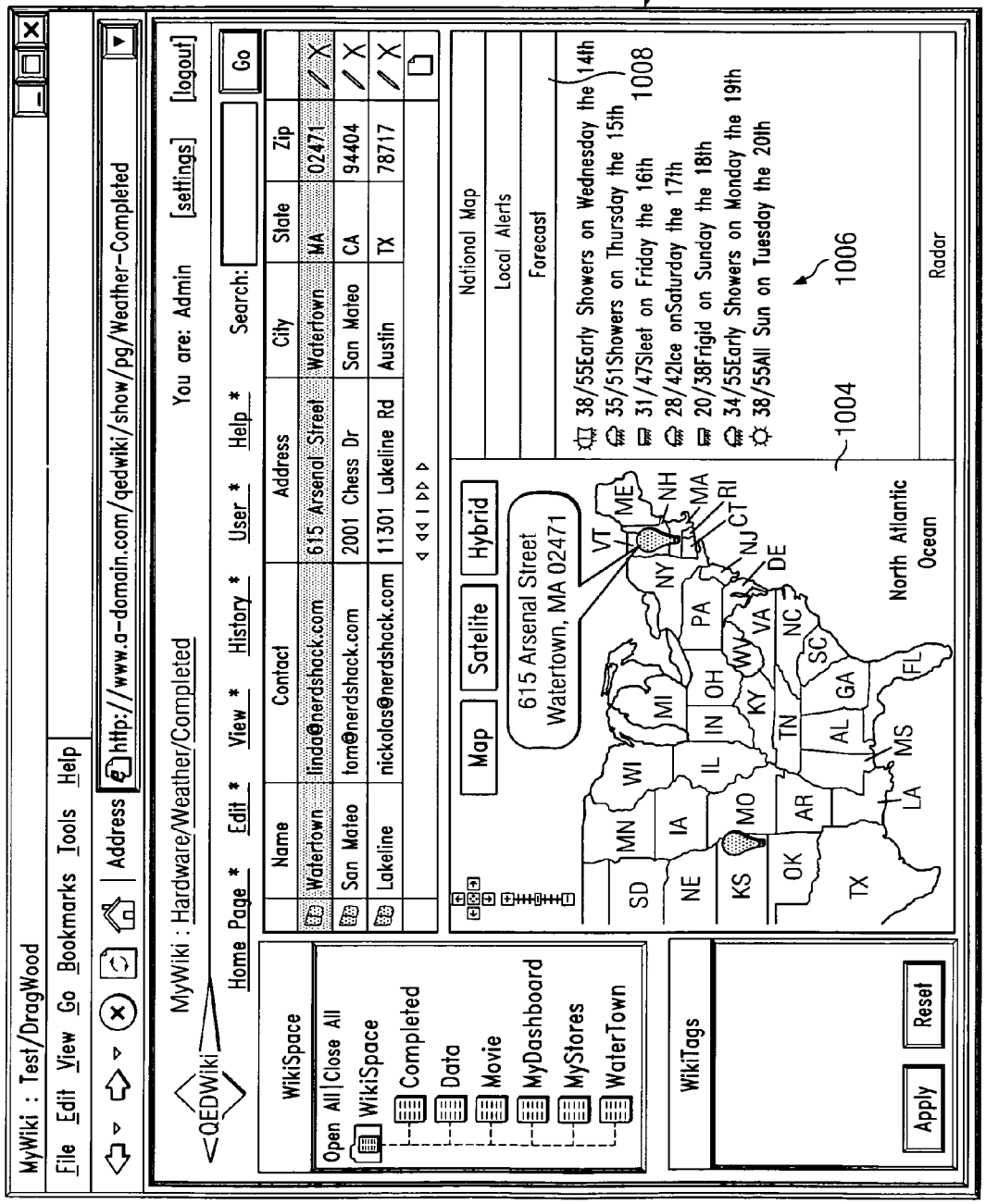
FIG. 10 is a screen of display for a Wiki page in accordance with an illustrative embodiment of the present invention.

Turning now to FIG. 10, a screen of display for a Wiki page is shown in accordance with an illustrative embodiment of the present invention. Wiki page 1000 is a page, such as Wiki page 602 in FIG. 6. A user may have used an eye-catcher in a palette, such as eye-catcher 708 and palette 702 in FIG. 7 to drag live content into Wiki page 1000.

For example, a business traveler may have previously modified Wiki page 1000 to display list of destinations 1002 for an upcoming business trip. By clicking on each location within list of destinations 1002, the Wiki page displays national map 1004 for the address, weather forecast 1006, as well as local alerts 1008. The customized information allows the user to plan for weather and other circumstances of the business trip as well as visually picture the location of each meeting. Local alerts 1008 may include links to ongoing events and new stores for the specified geographic location, informing the user of local events that may be relevant to the business meeting.

The illustrative embodiments further provide a computer implemented method, apparatus, and computer usable program code for processing a web page for display in a Wiki environment. Added components are able to interact with other components before rendering the final views. Components are enabled to discover new attributes and parameter settings from the page serve context. A validation mechanism is used for components to validate inputs and report errors before rendering final views. Targeted events are processed within the lifecycle of the page serve sequence. Multiple versions of the same component are managed on a single server.

Turning now to FIG. 11, a block diagram of an abstract syntax tree is shown in accordance with an illustrative embodiment of the present invention. Abstract syntax tree environment 1100 includes various components used to form and process abstract syntax tree 1102.

Wiki command context (WCC) 1104 is an object that creates abstract syntax tree 1102 from the markup language of a Wiki page, such as page 602 in FIG. 6. Wiki command context 1104 is the parent of the abstract syntax tree of commands. Wiki command context 1104 is responsible for loading the commands for a page or source fragment. Abstract syntax tree 1102 is composed of commands, such as commands 640, 642, 644, 646, 648, and 650 in FIG. 6 for the Wiki source. A tree is a data structure including a source or base branching out to include leafs or nodes. The interconnecting nodes in the tree represent commands that are dependent on other interconnected nodes. Nodes, such as nodes 1106-1110, represent different commands in abstract syntax tree 1102.

For example, node 1106 is named Accordion and performs the step necessary to internalize the attributes and variables assigned by the user to the accordion and emit the hypertext markup language fragment for the accordion targeting the client browser environment. Node 1108 is named Template and is a child of node 1106, named Accordion. Node 1106 provides the name of a tab within the Accordion to display on the client browser environment. Node 1110 is named Forecast and is a command for inserting a weather forecast in the Wiki page.

Data hub 1112 is a data hub, such as data hub 638 in FIG. 6. Data hub 1112 processes abstract syntax tree 1102 by walking abstract syntax tree 1102 in a pre-order traversal and invoking the particular function at each node. For example, node 1114 has a function for providing a latitude and longitude. Node 1114 may be a Google® map command that provides the latitude and longitude for a specified address.

Depending upon the complexity of the page, abstract syntax tree 1102 represented by Wiki command context (WCC) 1104 may contain two types of child nodes: first, those previously described and second, other abstract syntax trees whose root is another Wiki command context. Another Wiki command context is used when processing uniform resource indicator requests that generate other Wiki source fragments that also need to be processed.

The illustrative embodiments of the present invention further provide a computer implemented method, apparatus, and computer usable program code for extending the capabilities of a Wiki environment. A Wiki is a collaborative web page that allows single or multiple users to efficiently integrate static and interactive content. An object-oriented framework is used to define how objects are extended for easily creating collaborative environments. Wiki environments need to support a fundamental mechanism to extend the core environment without requiring changes to the core runtime components.

The illustrative embodiments include client and server side elements that process the Wiki commands to manage a deployed environment including any number of Wiki commands. An abstract set of base classes and a core processing engine within the Wiki environment is used for processing concrete implementations of the Wiki command classes as further described. The core processing engine supports the processing and lifecycle management of the core runtime components for extending the capabilities of the Wiki environment. The core processing engine is an engine, such as Wiki engine 402 in FIG. 4.

Turning now to FIG. 12, a block diagram of commands is depicted in accordance with an illustrative embodiment of the present invention. Wiki commands are commands used to implement the functions and processes of the Wiki, such as Wiki environment 302 in FIG. 3. FIG. 12 describes a Wiki command metadata interface and associated commands 1200. Commands 1200 are commands, such as command 550 in FIG. 5.

Commands 1200 include various command categories which may include catalog 1202, lifecycle 1204, property edit 1206, and page processing 1208. Only a few examples are shown in commands 1200. For example, commands include Get/setCategory 1210, getName 1212, and getDescription 1214. Get/setCategory 1210 describes the category the Wiki command belongs to. getName 1212 is the simplified name of the component. getDescription 1214 is the textual description of the Wiki command intended to help the user understand the command.

Catalog 1202 may also include other commands such as:
getHelp is help text presented when the user hovers over the Wiki command in the page or palette,
getSample returns a sample Wiki command source used to insert the command,
getIcon returns the icons to be displayed for the Wiki command in the palette,
getDragContent returns the Wiki source fragment used during the initial drag off the palette for the Wiki command, and
getDropContent returns the Wiki source fragment inserted when the Wiki command is dropped on the initial placement.

LifeCycle 1204 may include commands, such as wasSaved 1216, wasDeleted 1218, and wasCopied 1220. wasSaved 1216 is called after the command was saved in the server environment. In these examples, wasDeleted 1218 is called when the command has been removed from the server page environment. wasDeleted 1218 provides a means for Wiki commands to clean up persistent resources associated with the Wiki command on the given page. wasCopied 1220 is called when a page containing a given Wiki command has been copied to another name. wasCopied 1220 provides a means for Wiki commands to apply any persistent changes necessary on the newly copied page.

Lifecycle 1204 may also include other commands such as:
getVersion returns the version of the Wiki command,
getParameters returns the list of parameters associated with the Wiki command,
aboutToSave is called when the command is about to be saved to the server environment, providing the command an opportunity to carry out any activities necessary to persist the command,
configure is called when the command needs to be configured,
get/setPluginData saves/gets data associated with the Wiki command during the configure command,
wasUndelete is called when the command has been placed back on a given page after previously being deleted from the page,
wasRenamed is called when the page containing the Wiki command has been renamed,
aboutToExport is called just before the Wiki command is exported to the saved format of the Wiki, and
wasImported is called just after the Wiki command is imported from the Wiki save format.

Property edit 1206 may include commands, such as generatePropertyEditor 1222 and allowEdit 1224. In the illustrative embodiment, generatePropertyEditor 1222 is called by the core engine to permit the command to generate a client side editing visual. If generatePropertyEditor 1222 is not implemented, a default property editor is generated for editing the Wiki command's parameters. A property editor is an interface that allows a user to enter parameters, values, text, variables, and other data for the Wiki command. allowEdit 1224 determines if the Wiki command is permitted to be edited.

Page processing 1208 may include commands, such as render 1226, drawEyeCatcher 1228, refreshOnUpdate 1230, and getTargetDIV 1232. render 1226 is called when the Wiki command needs to display itself in the output stream for hypertext markup language. drawEyeCatcher 1228 is called when the command is drawn on the page to provide the content which can be clicked to manipulate the Wiki command on the client, usually invoking the property editor on the selected command. The eye catchers are used to track a singleton editing capability. refreshOnUpdate 1230 is called to determine if the whole page should be refreshed after the command's arguments have been updated using the property editor. getTargetDIV 1232 returns the name of the hypertext markup language DIV to be updated. DIV represents a division/section in a hypertext markup language file. Each command is displayed within a DIV on the client browser. A DIV has an associated identification which the Wiki engine will generate automatically or the command may provide one by implementing the getTargetDIV protocol.

Page processing 1208 may also include other commands such as:
getDestinationDiv returns the name identification of the hypertext markup language/DIV to be updated when the command is re-rendered on the page. Rendering a command is reproducing or displaying encoded data in a specified manner. For example, the eye-catcher is rendered by generating the hypertext markup language rendered in the Wiki page to display the eye-catcher.
getArguments returns the list of actual arguments passed to the command for processing. Arguments contain the 'real' values of the parameters returned by the getParameters call, which returns the formal argument list of the command.
refreshOnInsert is called to determine if the whole page should be refreshed after the command has been placed on the Wiki page.
areArgumentsSet returns a value specifying whether all the input arguments for the Wiki command have been satisfied so that the command may 'fire' its invoke method to performs model actions.
init is called to initialize the internal Wiki command.

The methods and commands described above are used to provide the processes in FIGS. 31-43.

Turning now to FIG. 13, a diagram showing property editing components is depicted in accordance with an illustrative embodiment of the present invention. Property editing system 1300 includes eye-catcher 1302, property editor 1304, and selector editor 1306.

Eye-catcher 1302 is a graphical representation of a selected command. For example, eye-catcher 1302 may represent a Google™ Map command for displaying a map of a specified address. Eye-catcher 1302 may be clicked on in an icon form to invoke property editor 1304 allowing a user to edit a selected command.

Property editor 1304 is used to establish attributes of the command. For example, the attributes may specify the type of information, properties, parameters, binding information for the attribute, and default and allowable values. For example, property editor 1304 may allow a user to specify an address for the Google™ Map to generate the requested map. Selector editor 1306 is a specialized property editor that allows a user to establish specific attribute metadata. For example, a user may be able to specify an editing address using selector editor 1306. While establishing attributes in property editor 1304 a specific attribute may automatically open selector editor 1306 to enter more specific information for an attribute or field in property editor 1304.

The illustrative embodiments of the present invention further provide a computer implemented method, apparatus, and computer usable program code for processing a request for a Wiki page received from a client-side data hub on a remote data processing system at a server-side data hub. A server-side data hub is a data hub object instance on the server that is instantiated when the page request is received by the server. The server-side data hub is associated with a particular page instance. Thus, each time the server receives a request from the client associated with the page, such as to modify or update the page, the instance of the server-side data hub associated with the particular page can be retrieved and loaded to process the request.

The server-side data hub includes attributes and a set of methods. This set of methods is one or more methods on the data hub, which are used to send events from a producer command on the server to a set of consumer commands associated with the instance of the collaborative application. The set of consumer commands may be located either on the server-side, on the client-side, or both in these examples.

A consumer command is a command that needs to receive or wants to receive an event and/or data for processing and/or performing a function of the command. A consumer command registers with the data hub to receive event objects associated with a given topic.

For example, a search component needs or wants to receive search input terms to perform the search-function of the search component. Therefore, the search component is a consumer of search input terms. The search command is therefore a consumer of events related to search terms and available topics.

A consumer command can also be referred to as a listener command because the consumer command is listening or waiting for events related to one or more specific topics. In the above example, the search component is listening for topics related to available search terms.

In these examples, a set of consumers includes a single consumer as well as two or more consumers.

The client-side data hub is created at the client when the requested page is received at the client. This client-side data hub is associated with an instance of a collaborative application, such as a Wiki application.

The utilization of server-side data hub and a corresponding client-side data hub enable the Wiki commands associated with the requested page to interact with greater ease during processing of the page request by routing events transmitted between commands through the server-side data hub and/or the client-side data hub.

In accordance with the illustrative embodiments of the present invention, a server-side data hub and/or a client-side data hub can be utilized to route events between commands in any application using an eventing mechanism. An eventing mechanism is a mechanism that permits modules in an application, such as Wiki commands, to communicate with other modules in the application. For example, a web browser uses an eventing mechanism. In addition, web applications, such as email components and newsreaders, also utilize an eventing mechanism.

Turning now to FIG. 14, a diagram illustrating a data flow between commands on a client and server for a Wiki application is depicted in accordance with an illustrative embodiment of the present invention. Server 1400 is a server, such as server 104 and 106 in FIG. 1. Server 1400 is part of a Wiki environment, such as Wiki environment 302 in FIG. 3, Wiki environment 400 in FIG. 4, and Wiki environment 601 in FIG. 6.

Data hub 1402 is a server-side data hub, such as data hub 558 in FIG. 5 and data hub 638 in FIG. 6. Data hub 1402 is created on server 1400 when a request for a page is received from client 1408. Thus, server-side data hub 1402 is instantiated upon receiving a request from a client-side data hub. Server-side data hub 1402 is an instance of a data hub object having attributes and methods to propagate or route events between commands in the Wiki environment. The set of methods on server-side data hub 1402 are used to process events and commands associated with the page request received from the user on client 1408.

Wiki command 1404 is a Wiki command object present within the Wiki system, such as commands 422 in FIG. 4, command 550 in FIG. 5, and commands 640-650 in FIG. 6. Wiki command 1404 allows a user to include data in a page and/or process data for a page, or any other functionality associated with the requested Wiki page. In this example, Wiki command 1404 is processed by a page process loop of a Wiki page object, such as Wiki page object 526 in FIG. 5.

Data hub 1402 determines if all the required data and/or input values required by the argument parameters of Wiki command 1404 are present. If all the required data and/or input values are present, data hub 1402 triggers an invoke method on Wiki command 1404. The invoke method triggers Wiki command 1404 to fire event 1406 to server-side data hub 1402. Event 1406 is an event object defining an event.

In this illustrative example, event 1406 is fired by Wiki command 1404 on server 1400. However, in accordance with the illustrative embodiments of the present invention, event 1406 can also include an event received by server-side data hub 1402 from client-side data hub 1410. In such a case, event 1406 would be an event fired by a command on the client, such as event 1407, which is an event object fired by client-side Wiki command 1412. In accordance with another illustrative example, event 1407 can include an event generated by client-side Wiki command 1412 and sent to client-side data hub 1410 for processing on the client or routing to server-side data hub for processing on server 1400.

Upon receiving event 1406 from Wiki command 1404, data hub 1402 sends event 1406 to an event queue for processing. An event queue is a buffer or data structure for storing event objects until the event object is processed.

During a process events phase, server-side data hub 1402 processes event 1406. During the processing of event 1406, server-side data hub 1402 determines if any commands, such as Wiki command 1404, are registered as consumer commands of event 1406. A consumer command is a command that requires an event associated with a given event topic. An event topic is a subject matter or theme associated with an event object. For example, an event object fired as a result of a user entering a search term would have a "search" or "search available" event topic.

The consumer command registers with a data hub as a consumer command for the given topic. Thus, when an event object for the given topic is received by the data hub, the data hub is able to send the event to the set of registered consumer commands for the given event topic.

A registered consumer command is a command that has registered as a consumer of events of a given topic. For example, a display command aggregates sets of data for a topic such as accident. This command reports to display on a map display, will register with the data hub as a consumer command for the topic accidents. When the data hub receives an event for accidents, the accidents event object will be sent to all consumer commands registered for the topic accidents, including the display command. Once the display command receives the accidents topic event, the display command will consume or use the data to generate a map display showing the accident data or update a previously displayed map to show the new accident data.

Data hub 1410 sends event 1406 to Wiki command 1412 for processing. Data hub 1410 determines if all of the required data and/or input values for a given argument/parameter required by Wiki command 1412 to fire are present in Wiki command 1412. If all of the required data and/or input values are present, data hub 1410 triggers an invoke method on Wiki command 1412. In response to data hub 1410 calling the invoke method on Wiki command 1412, Wiki command 1412 sends or fires event 1407 to data hub 1410 for processing. When event 1407 is completely processed, data hub 1410 will send event 1406 to a browser or client for display. An event is completely processed when the event is in a proper format for display at a browser, such as hypertext markup language code.

Thus, the illustrative embodiments provide a computer implemented method, apparatus, and computer usable program code to process a request for a page. A server-side data hub receives the request for the page from a client-side data hub on a remote data processing system. The client-side data hub is associated with an instance of a collaborative application. The server-side data hub processes the request during the initial page render process using a set of methods. The set of methods is used to send events from a producer command on a server to a set of consumer commands associated with the collaborative application.

Figure 15:
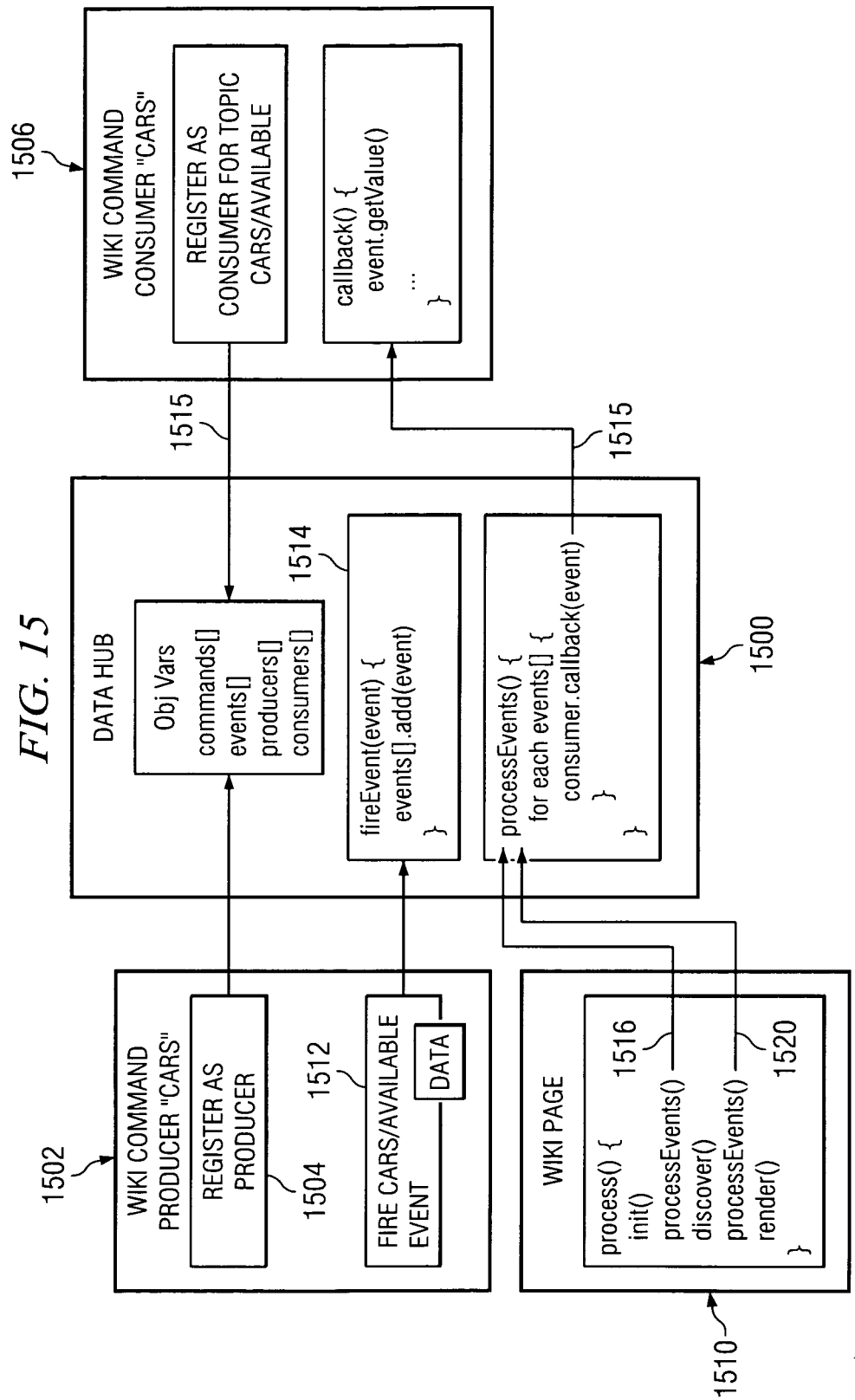
FIG. 15 is a diagram illustrating a data flow between commands on a server during an initial page render process in accordance with an illustrative embodiment of the present invention.

Turning now to FIG. 15, a diagram illustrating a data flow between commands on a server during an initial page render process is depicted in accordance with an illustrative embodiment of the present invention. Data hub 1500 is a server-side data hub, such as data hub 558 in FIG. 5 and data hub 638 in FIG. 6. In this illustrative example, data hub 1500 is implemented in PHP: Hypertext Preprocessor (PHP). Wiki command producer 1502 is a command associated with the server. A producer is a Wiki command component that provides data that can be used or consumed by another Wiki component. In this illustrative example, Wiki command producer 1502 registers as a producer of an event for the topic "cars". To register Wiki command producer 1502 as a producer of topic "cars," data hub 1500 adds an identifier for Wiki command producer 1502 to an object variable for producer identifiers associated with the topic "cars."

Wiki command consumer 1506 is a command associated with the server. Wiki command consumer 1506 registers as a consumer for topic "cars" 1508 with data hub 1500. To register Wiki command consumer 1506 as a consumer of topic "cars," data hub 1500 adds an identifier for Wiki command consumer 1506 to an array of consumer command identifiers in a consumer object variable on data hub 1500.

Wiki page 1510 is an object having a process loop associated with a given requested page being loaded in the Wiki environment. During the init phase, the server calls an init method to initialize all commands associated with the given requested page, such as Wiki command producer 1502. Upon initialization, the commands register with the data hub as producer commands, such as Wiki command producer 1504, or consumer commands, such as Wiki command consumer 1506.

Wiki command producer 1502 retrieves data and fires an event with the topic "cars/available" when WikiCommand producer 1502 has data and/or an event ready to fire. When Wiki command producer 1502 fires the event topic "cars/available" event 1512, the event is sent to data hub 1500. Data hub 1500 adds the topic "cars/available" event to an event queue 1514 in data hub 1500. After processing the topic "cars/available" event from the event queue, the topic "cars/available" event is sent to all consumers that registered for the event topic "cars."

The Wiki page process loop of the Wiki page object calls the first processEvents method. During this process events phase, the data hub processes events in the event queue on server-side data hub, including the "cars/available" event object fired by Wiki command producer 1502. Data hub 1500 retrieves event "cars/available" from the event queue. Data hub 1500 calls a callback method on each command registered as a consumer for the event topic "cars" 1518, including Wiki command consumer 1506. The event is passed to Wiki command-consumer 1506 as an argument/parameter to the callback method. The consumer callback method processes the event object by executing code inside the callback method.

If additional processing is present to be performed after initializing all components, but before rendering the requested page, each command has an opportunity to execute code by calling a discover method. The second processEvents phase 1520 is called to process any events that may have fired during the discover phase.

Finally, Wiki page object 1510 calls the render phase on all commands. During the render phase, all commands should have all of their data available so that the hypertext markup language code can be generated and sent to the client for rendering as the requested page at a client browser. If Wiki-Consumer 1506 is a table display of "cars" data generated by producer, the render phase could generate a table of cars as shown in FIG. 16.

Referring now to FIG. 16, a diagram illustrating Wiki page 1600 generated in response to a page request from a user is shown in accordance with an illustrative embodiment of the present invention. As discussed above, all commands associated with a page can register as producers and consumers with a data hub. As events are produced by the producers, the events are used by the consumers to render hypertext markup language or JavaScript for rendering an entire page or page fragments. The hypertext markup language or JavaScript is sent to the client browser for display.

Thus, all interactions ripple through the data hub during a Wiki page process loop. As a result of these interactions, all events are handled at render time. Therefore, the initial rendered page, such as page 1600, fully depicts the correct view of the Wiki page. In other words, the client does not have to fire events to modify the initial rendered page to make the page view correct because all events associated with loading a new page from the server are processed through the server-side data hub.

When an initial request for a page is processed at a server, the server generates hypertext markup language code and/or JavaScript for the requested page. When the hypertext markup language code and/or JavaScript is received at the client, the new page is loaded at the client for display in the client browser.

During the page load process, the hypertext markup language code and/or JavaScript code for the page creates a client-side data hub object. The client-side data hub object registers all commands on the client with the client-side data hub as producer commands and consumer commands, just as the commands on the server registered with the server-side data hub during the initial page process loop at the server.

If a command interaction occurring at the client after the initial page is loaded can be completely contained and processed on the client, the command interaction is not sent to the server in these examples. In other words, Wiki commands interact on the client to modify the displayed page to reflect additional input or events triggered by user actions or other occurrences at the client. If a component interaction can be completely processed on the client, the client generated event is not sent to the server. This event may be capable of processing entirely at the client. If this is the case, then the server does not have to be involved in the processing of the event in any way. In the depicted embodiments, the term modify includes updating a page or otherwise altering a page to reflect new data and/or new page content.

Thus, the illustrative embodiments of the present invention provide a computer implemented method, apparatus, and computer usable program code for a client-side data hub for processing events. The client-side data hub receives an event for a given topic. The event is generated by a producer command associated with the client. The client-side data hub processes the event to identify a set of consumer commands for the given topic. The client-side data hub sends the event to a set of consumers for the given topic. The client-side data hub receives new page content from one or more consumers in the set of consumers, wherein the displayed page is updated with the new page content to form an updated page.

Figure 17:
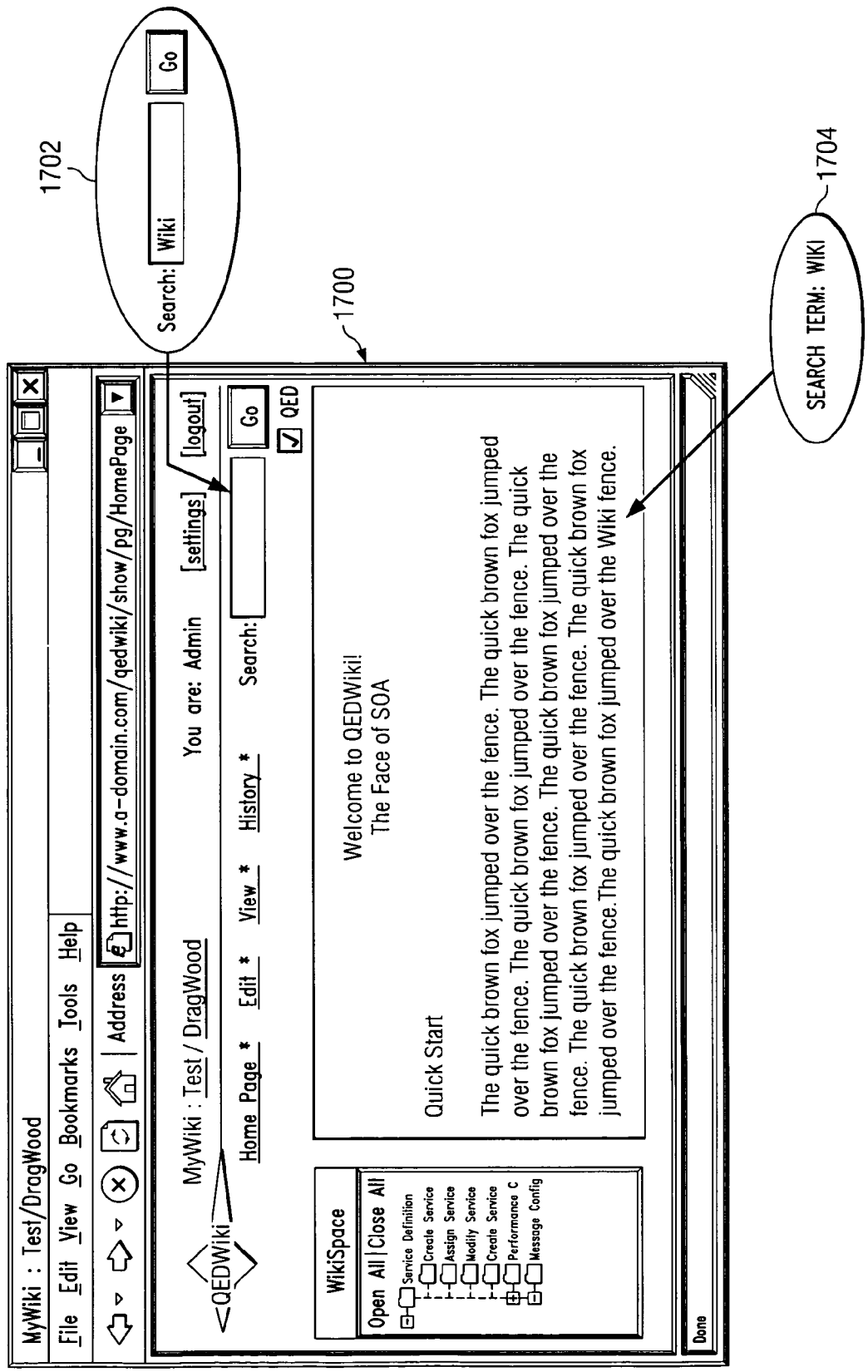
FIG. 17 is a diagram illustrating a rendered page displayed at a client browser in accordance with an illustrative embodiment of the present invention.

Turning now to FIG. 17, a diagram illustrating a rendered page displayed at a client browser is depicted in accordance with an illustrative embodiment of the present invention. On rendered page 1700, search input from component 1702 has registered as a producer of the event topic "search/available" with the client-side data hub. An echo consumer component 1704 has registered as a consumer of the topic event "search/available" with the client-side data hub. Consumer component 1704 functions to echo what a user types into search component 1702 when the search component fires a "search/available" event.

Figure 18:
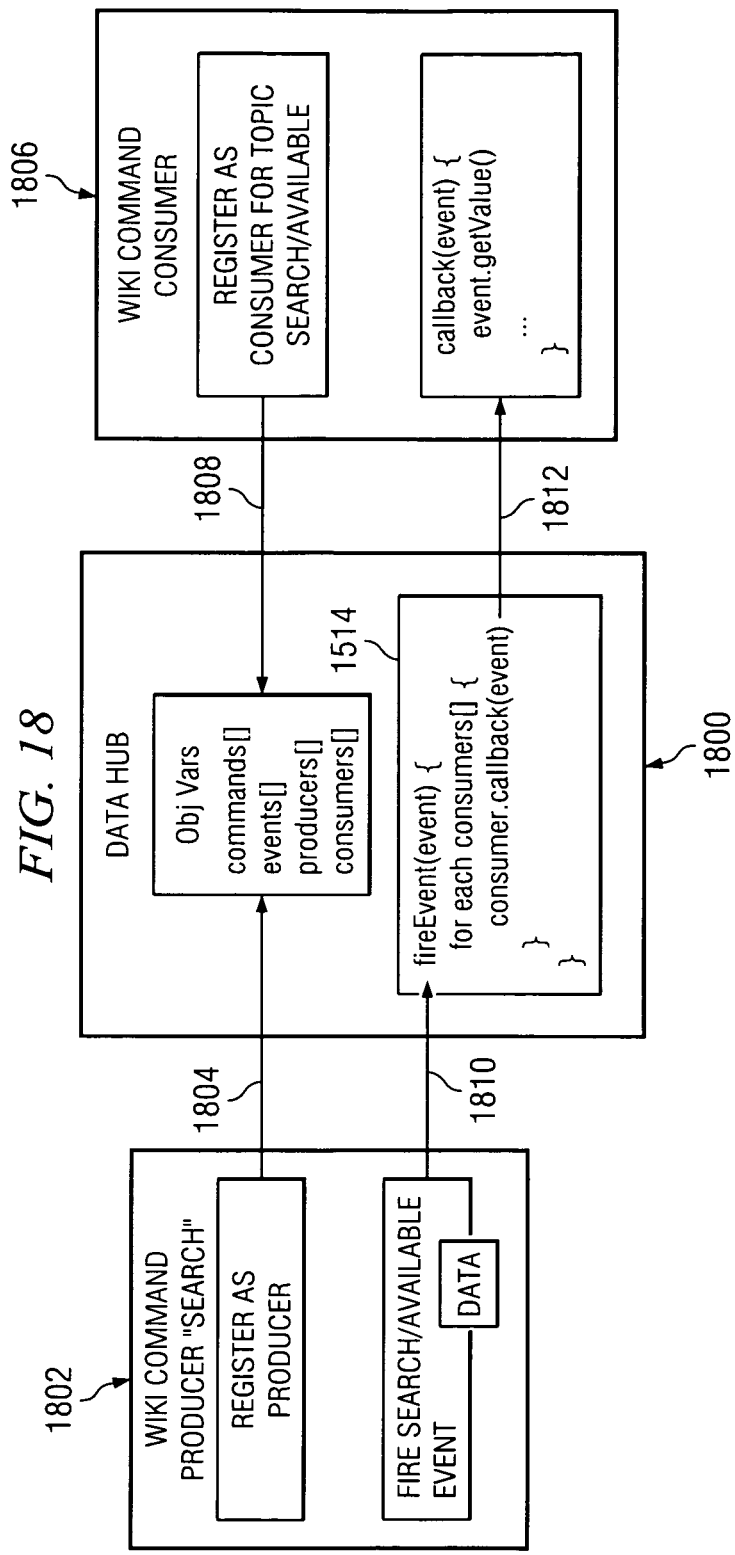
FIG. 18 is a diagram illustrating a data flow between components on a client-side data hub after a new page is loaded and displayed at a client browser in accordance with an illustrative embodiment of the present invention.

FIG. 18 is a diagram illustrating a data flow between components on a client-side data hub after a new page is loaded and displayed at a client browser in accordance with an illustrative embodiment of the present invention. Data hub 1800 is a client-side data hub, such as data hub 634 in FIG. 6, and data hub 1410 in FIG. 14. Data hub 1800 is created on the client during a page load. In this illustrative example, client-side data hub 1800 is implemented in JavaScript and hypertext markup language.

Wiki command producer 1802 is a command on the client that provides data that can be consumed by another Wiki command or wants to notify another component that a particular event has occurred. Wiki command producer 1802 registers 1804 with data hub 1800 as a producer for the topic "search/available." In this example, Wiki command producer 1802 is search component 1702 in FIG. 17.

Wiki command consumer 1806 is a command on the client that consumes an event object, consumes data, or wants to be notified of an event. Wiki command consumer 1806 registers as a consumer for the event topic "search/available" 1808 with client-side data hub 1800. In this example, Wiki command consumer 1806 is echo consumer component 1704 in FIG. 17. Wiki command consumer 1806 is a client version of a corresponding Wiki command object on the server. Wiki command consumer 1806 on the client includes all the data of the Wiki command object on the server, but it does not contain all of the methods found in the corresponding Wiki command on the server.

Wiki command producer 1802 fires the "search/available" event when a user presses the "go" button after entering a search term, such as "Wiki" search term shown in FIG. 17. Wiki command producer 1802 creates an event object, attaches data to the event object, then fires the event object by calling a fireEvent method 1810 on data hub 1800 to send the event to data hub 1800. Unlike the server-side data hub which queues events at the data hub and processes the events during a processEvents phase, client-side data hub 1800 does not send the event to an event queue. Instead, client-side data hub 1800 immediately processes the event and sends the event to a set of consumers registered for the event.

In this illustrative example, the echo component callback 1812 is called by data hub 1800. Wiki command consumer 1806 modifies the rendered page, such as page 1700 in FIG. 17, using JavaScript to insert the text "Search term: Wiki" into the displayed page. An exemplary illustration of JavaScript used to dynamically update the content of the rendered page by Wiki command consumer 1806 includes as follows:

```
var divId = document.getElementById('echoDivId');
divId.innerHTML = "Search term:
"+event.getValue( );
```

However, in accordance with an illustrative embodiment of the present invention, the rendered page can be modified by Wiki command consumer 1806 using any known or available method for modifying a page, including, but not limited to, document object model (DOM) manipulation.

However, if the interaction requires the server to be involved in the processing of the event, the event is sent to the server. It is likely that an event fired on the client will require the event to be sent to the server data hub, because the data either lives on the server or is retrieved by the server.

In other words, after a page is displayed at the client, a new event or new data is received from a user. This event may require processing in whole or in part at the server. If this is the case, then the client sends the event to the server prior to updating the displayed page.

Data hub objects on the client and server enable Wiki components and commands to interact on the client, interact on the server, and use topic based eventing mechanisms to effectively wire/connect the components. When the result of a user interaction requires the server to be accessed to perform some operation or process not possible on the client, the client-side data hub sends the event to the server-side data hub.

For example, if the server owns or has access to data required for a given user interaction, such as a database table, that the client does not own or have access to, the event is sent to the server. In addition, if the server is needed to retrieve data needed for a user interaction, such as a data feed, the event is sent to the server. In these cases, the event is sent to the server for handling/processing. Once handling/processing of the event on the server is complete, the server sends updated page content to the client for modifying the displayed page at the client.

For example, a search component is a component that accepts input from a user. Based upon the text entered by the user, the search text is sent to the server. The server performs the search. The server renders the results of the search using a table component. The rendered table generated by the table component on the server is returned to the client for display.

The illustrative embodiment of the present invention also provide a computer implemented method, apparatus, and computer usable program code for data hub processing of events. A client-side data hub receives an event for a given topic associated with a currently displayed page. The client-side data hub sends the event data to a server-side data hub for processing of the event on the server.

The server-side data hub adds an event for the given topic to an event queue on the server-side data hub in response to receiving an event associated with a page. The server-side data hub processes the event in the event queue. A set of consumer commands for a given topic associated with the event are identified. A consumer command is a command that receives events for a given topic. The server-side data hub sends the event to the set of consumer commands for the given topic. One or more consumers in the set of consumer commands process the event to render page content for the page. The server-side data hub then sends the results of processing the event back to the client-side data hub.

The client-side data hub receives the results of event processing from the server-side data hub. The result of processing the event includes new page content. The currently displayed page is updated with the new page content at the client browser to form an updated page.

Figure 19A:
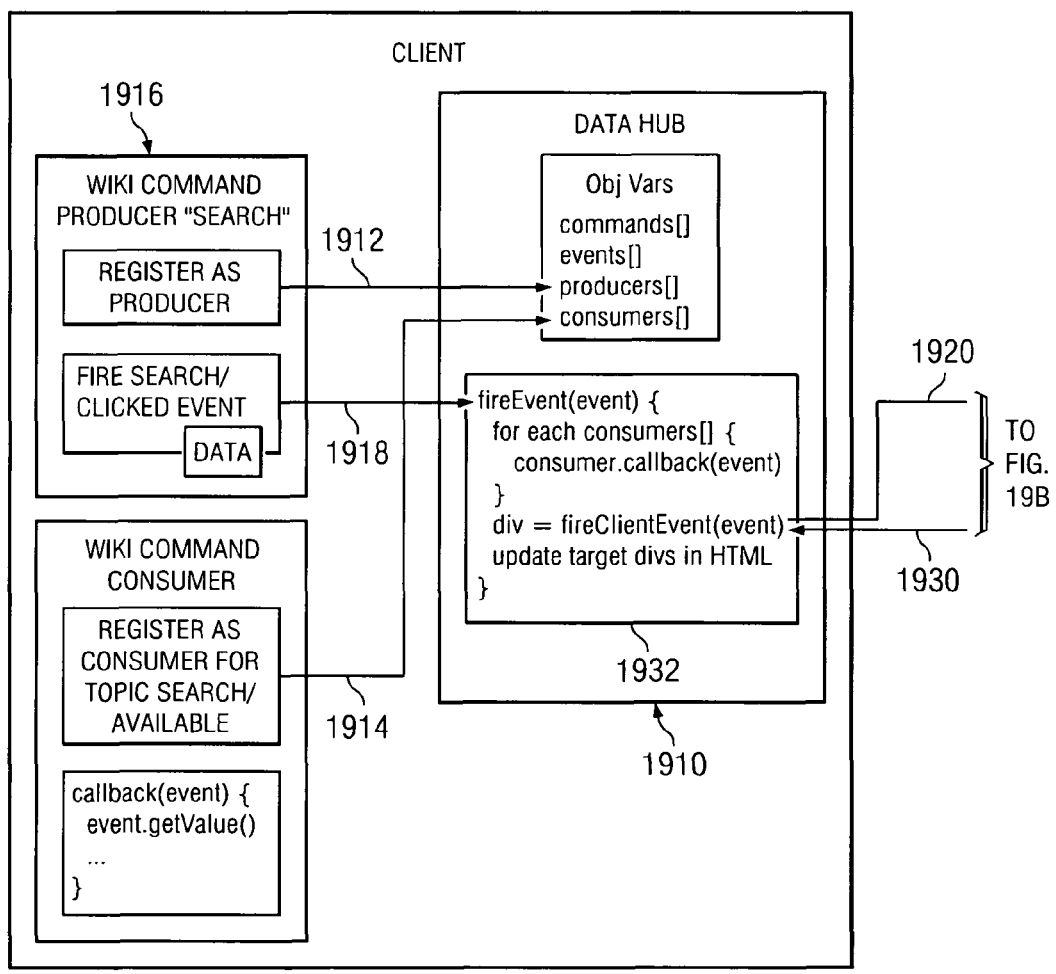
FIGS. 19A and 19B are diagrams illustrating a data flow between a client-side data hub and a server-side data hub during a page update in accordance with an illustrative embodiment of the present invention.
Figure 19B:
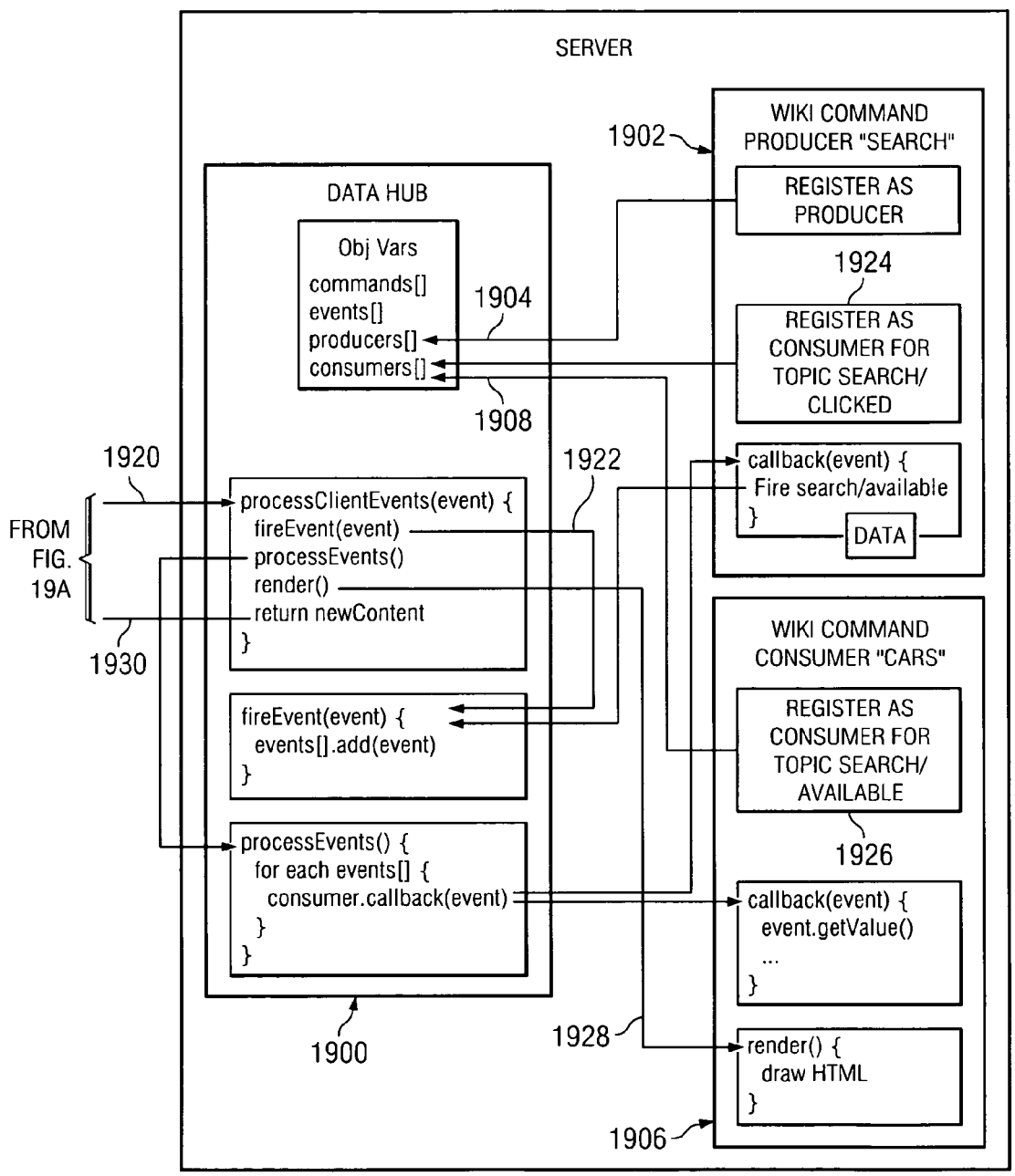

With reference next to FIGS. 19A and 19B, diagrams illustrating a data flow between a client-side data hub and a server-side data hub during a page update are shown in accordance with an illustrative embodiment of the present invention. When the Wiki page is first loaded, the server-side commands are processed to generate the initial page render that is sent to the client for display to the user, as shown in FIGS. 8-9. In this illustrative example, server-side data hub 1900 is created when the page is first loaded. Wiki command producer 1902 is a search component.

During the init phase, Wiki command producer 1902 initializes and registers 1904 with data hub 1900 as a producer of event topic "search/available" and "search/clicked." Wiki command producer 1902 search component also registers as a consumer for "search/clicked" event topic, which is generated by the client. In this manner, client representation of the Wiki component can communicate with the server-side component or call a method on the server-side component.

Wiki command consumer 1906 is a list component. Wiki command consumer 1906 initializes and registers 1908 with data hub 1900 as a consumer of the "search/available" event topic. The processEvents method is called on the server-side data hub during the first processEvents phase. Data hub 1900 calls the invoke method on Wiki command producer 1902. In response, Wiki command producer 1902 performs a search and generates data which is included in a "search/available" event object. Wiki command producer 1902 fires the event object "search/available" to indicate that the search data is ready.

Data hub 1900 calls a callback method on Wiki command consumer 1906 list component to send the "search/available" event object to Wiki command consumer 1906. The discover and secondary processEvents phase are then performed. Finally, during the render phase, data hub 1900 calls render on all commands associated with the requested page. Wiki command producer 1902 renders the hypertext markup language and JavaScript to display the search form. Wiki command consumer 1906 list component, which is now a producer component, renders the hypertext markup language and JavaScript to display the table. The results of the rendered components are combined with the rest of the hypertext markup language page and sent to the client for display. While the page is being loaded by the browser, the JavaScript code creates client-side data hub 1910 and registers all producers 1912 and all consumers 1914 with client-side data hub 1910. This is the initial page render.

Once the page has been initially displayed, a user interaction may cause changes to the rendering of one or more components. For example, when a user enters a search term and presses "go", a user interaction changing data occurs. The client-side search component Wiki command producer 1916 fires an event with topic "search/clicked" 1918. The search phrase is attached to the event object as data. Client-side data hub 1910 receives the event object and sends it to any listeners on the client registered as consumers for the event topic "search." Unlike in the server-side data hub, the client-side data hub does not queue events in an event queue.

Client-side data hub 1910 determines if the event should be sent to a consumer command on the server associated with the server-side data hub. If the event should be sent to a consumer command on the server, client-side data hub sends the event to the server by calling processClientEvent method 1920 via AJAX, JSON, or any other known or available remote method invocation methodology.

Server-side data hub 1900 adds the received event to an event queue 1922. Server-side data hub 1900 processes events in the event queue, one of which is the "search/clicked" event received from the client. Server-side data hub 1900 sends the "search/clicked" event to Wiki command producer 1902 search component which is registered as a consumer for the event topic "search/clicked" 1924. Wiki command producer 1902 search component performs the search and generates/produces search data. Wiki command producer 1902 creates an event object with topic "search/available" and attaches the generated search data to the event object.

Server-side data hub 1900 adds the "search/available" event object to the event queue. Because server-side data hub 1900 is still processing events in a processEvents phase, the "search/available" event object is immediately removed from the event queue and processed by server-side data hub 1900. Server-side data hub 1900 then sends the "search/available" event object to Wiki command consumer 1906 because Wiki command consumer 1906 is registered as a consumer for the "search/available" topic 1926.

Wiki command consumer 1906 saves off the new data from the "search/available" event object. Server-side data hub 1900 calls render method 1928 on all components that were involved in the processing of the original event "search/clicked" received from client-side data hub 1910. Wiki command consumer 1906 list component render method builds a new list using hypertext markup language and JavaScript. Wiki command consumer 1906 returns the new list content to server-side data hub 1900. Server-side data hub 1900 collects the new renderings from all components/commands involved, including Wiki command consumer 1906, and bundles the new renderings for return to client-side data hub 1910. Client-side data hub receives the results of processClientEvent method 1930 and updates command rendering on the client with new page content 1932.

Figure 20:
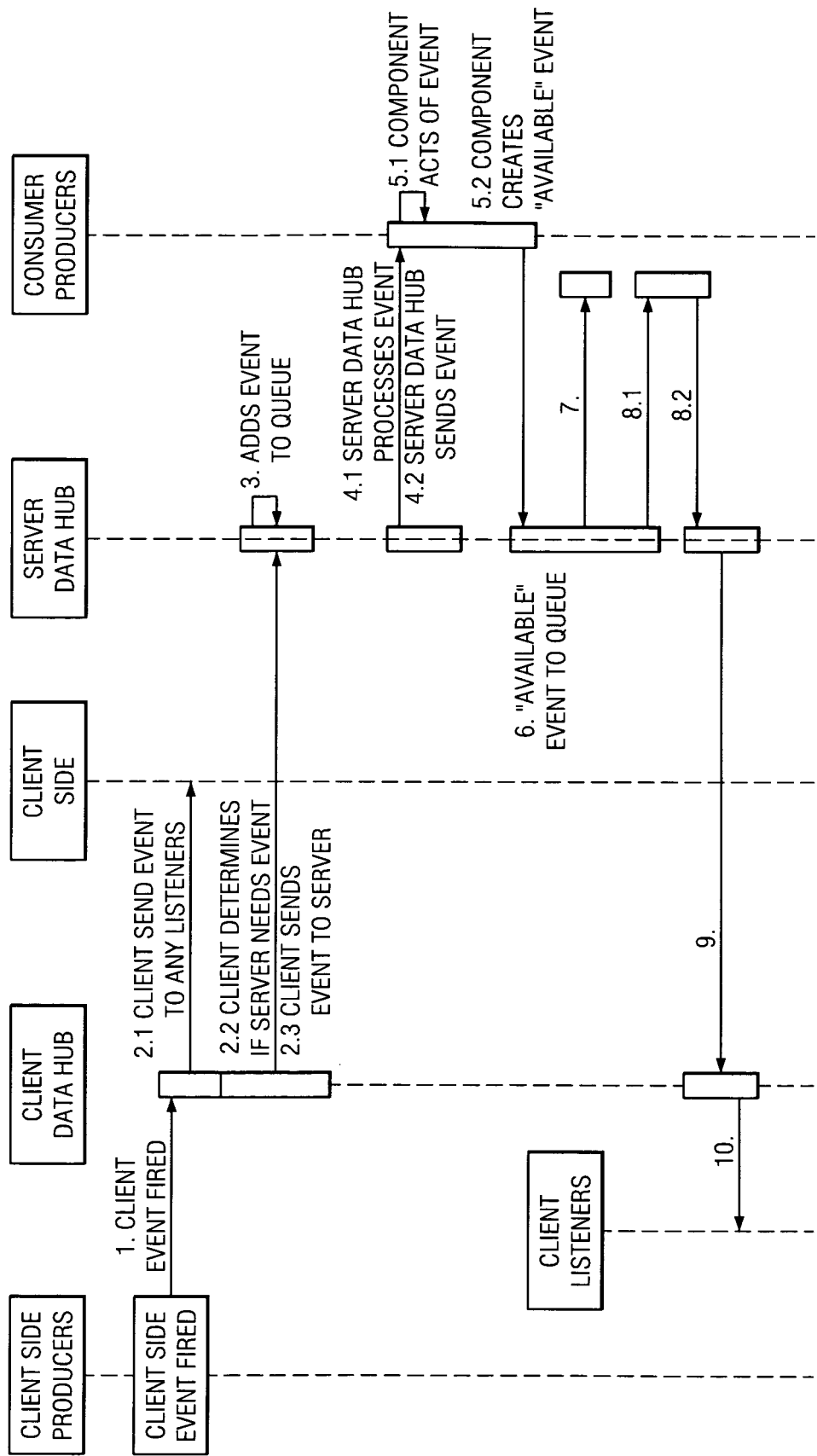
FIG. 20 is a diagram illustrating a message flow between a server-side data hub and a client-side data hub during a page update in accordance with an illustrative embodiment of the present invention.

Next, FIG. 20 is a diagram illustrating a message flow between a server-side data hub and a client-side data hub during a page update in accordance with an illustrative embodiment of the present invention. The message flow begins when a client-side producer component fires an event with topic "clicked" concatenated with the name of the event at (message 1). At message 2.1 the client side Data hub receives the event and sends it to any listeners on the client.

The client-side Data hub determines if the event should be sent to a listener on the server (message 2.2). In these illustrative examples, a listener is a command or component registered as a consumer for a given event topic. If the event should be sent to a listener on the server, the client-side data hub sends the event to the server by calling processClientEvent or by another remote method invocation methodology (message 2.3). The server-side data hub adds the received event to the event queue (message 3).

At message 4.1 the server-side data hub processes the events in the queue, one of which is the event from the client. The server-side data hub sends the "clicked" event to the corresponding consumers that are registered as listeners (message 4.2).

The component performs the action desired by the event (message 5.1). All events are treated the same by the server-side data hub, regardless of whether the event is received from the client or from the server. The component creates a new "available" event indicating that its results are available (message 5.2). The server data hub adds the "available" event to the queue (message 6).

The server-side data hub processes the "available" event and sends the event to a set of consumers on the server (message 7). The consumer component uses the data from the "available" event object. The server-side data hub calls a render method on all components (message 8.1). All components return new renderings in hypertext markup language and JavaScript to the server-side data hub (message 8.2). The server-side data hub returns the collected renderings from all involved components to client data hub (message 9). The client-side data hub receives the result of the server processing of the event. The client sends the results to listeners on the client (message 10) for rendering page updates on the client browser.

In an alternative embodiment, processing page requests and enabling interaction between commands can also be enabled in a system in which a server-side data hub operates in accordance with the illustrative embodiments of the present invention without ever receiving events from a client-side data hub. In other examples, processing page request may be implemented, in a system in which the client is a PDA, cell phone, GPS navigator, or any other client device that does not support JavaScript.

Figure 21:
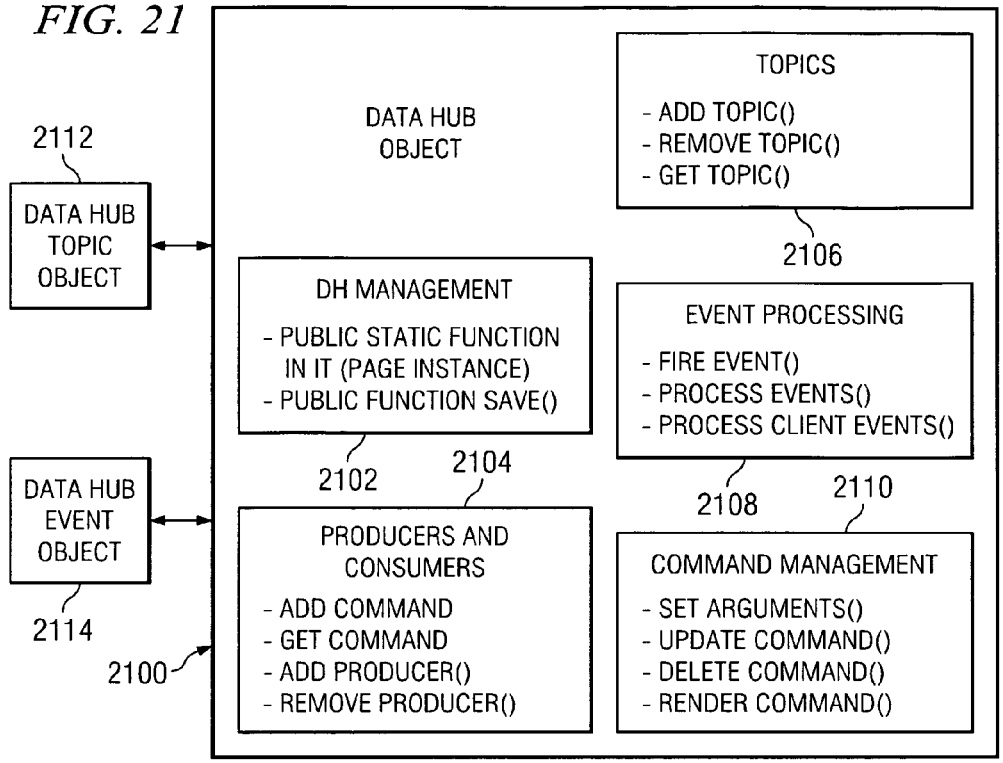
FIG. 21 is a diagram illustrating a server-side data hub object in accordance with an illustrative embodiment of the present invention.

FIG. 21 is a diagram illustrating a server-side data hub object in accordance with an illustrative embodiment of the present invention. In the depicted example, data hub 2100 is a data hub object, such as data hub 558 in FIG. 5, data hub 638 in FIG. 6, and data hub 702 in FIG. 7. In this illustrative example, data hub 2100 is a data hub object implemented in PHP.

A data hub, such as data hub 2100, is created for each instance of a Wiki page requested by a user. A page instance is used to reference a particular page view and the page's associated data hub instance. When a request or event on the client associated with a given page is sent to the server, the server loads the specified data hub instance associated with the given page.

In other words, an instance of a data hub is created on the server for each instance of a Wiki page requested by the client. After the page instance is loaded and displayed on the client, the data hub instance for that page on the client is no longer needed. The data hub instance is saved in a memory storage device, such as storage 108 in FIG. 1. When a user enters new input or requests an action with respect to the page, the Wiki environment for the particular page view is recreated on the server by reloading the previously serialized instance of the data hub associated with the particular page view. The saved and reloaded instance of the data hub reflects the current state of the particular page on the client browser. Data hub 2100 includes attributes/object variables and a set of methods.

The set of methods includes five categories or classifications of methods. The categories of methods are as follows; data hub management 2102, producers and consumers 2104, topics 2106, event processing 2108, and command management 2110. In these illustrative examples, a method is a procedure, function, or routine for performing an action or process associated with one or more objects, such as data hub 2100.

The set of methods for data hub 2100 include method interfaces for methods to perform various functions, such as, saving the data hub instance, retrieving/reloading the data hub instance, adding commands, adding producers, removing producers, etc. For example, data hub management 2102 set of method interfaces includes a method interface "public static function init (page instance)" for a method to retrieve a stored instance of a data hub from data storage, such as storage 108 in FIG. 1.

Data hub 2100 also calls methods on data hub topic object 2112 and data hub event object 2114 in order to enable transfer of events between commands in the Wiki environment and client environment. Data hub topic object 2112 is primarily a data object that defines a topic that a consumer command can subscribe to. In these illustrative examples, a consumer is a command, component, or object that requires and/or requests data, an event, or input from a user, another command, another component, and/or another object in order to carry out a particular function of the command/component. In these illustrative examples, a producer is a command, component, or object that provides data, an event, or output from a user, another command, another component, and/or another object.

Data hub event object 2114 is a data object that defines a data hub event that is created by a producer and sent to a consumer for the given event topic associated with the event object.

Figure 22:
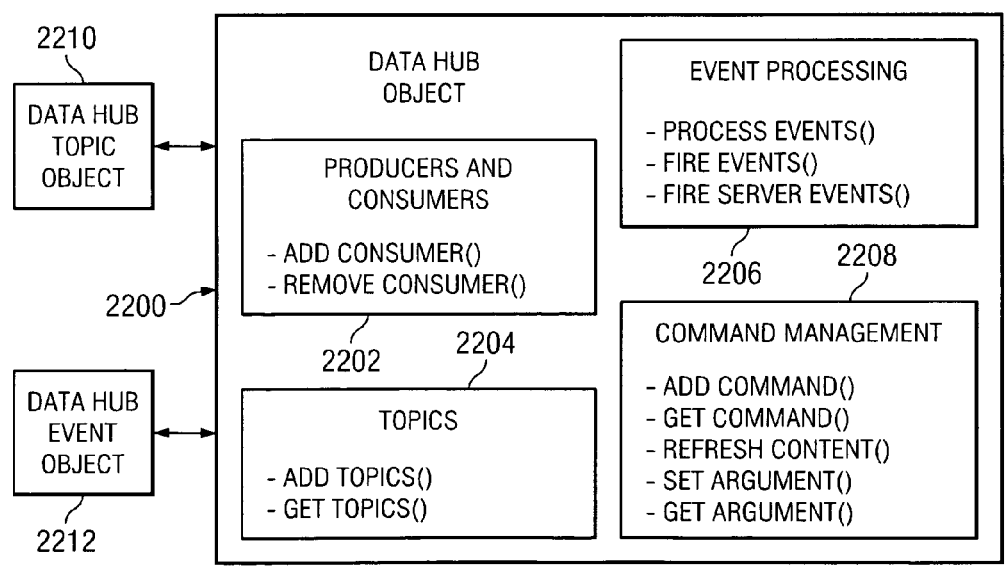
FIG. 22 is a diagram illustrating a client-side data hub object in accordance with an illustrative embodiment of the present invention.

FIG. 22 is a diagram illustrating a client-side data hub object depicted in accordance with an illustrative embodiment of the present invention. Data hub 2200 is a data hub object, such as data hub 634 in FIG. 6 and data hub 1410 in FIG. 14. In this illustrative example, data hub 2200 is a client-side data hub object implemented in JavaScript.

Data hub 2200 is a client data hub that enables Wiki components to interact with other Wiki components on the server and other Wiki components on the client. Data hub 2200 also enables Wiki components to send events generated on the client to the server for processing.

Data hub 2200 includes attributes and a set of methods. In this illustrative example, the set of methods includes four categories of methods. The categories of methods are as follows; producers and consumers 2202, topics 2204, event processing 2206, and command management 2208.

Client-side data hub 2200 also calls methods on client-side data hub topic object 2210 and client-side data hub event object 2212 in order to enable transfer of events between commands in the Wiki environment and client environment. Data hub topic object 2210 is a data hub topic object, such as data hub topic object 2112 in FIG. 21. Data hub event object 2212 is a data hub event object, such as data hub event object 2114 in FIG. 21.

Wiki page layouts are often static in one or more embodiments of the present invention. Furthermore, the static nature of Wiki page layouts and the requirement to have to individually alter the layout of each page of a set of pages makes it very time consuming to edit the layouts of a Wiki page or a set of Wiki sub-pages in order that they all share the same specific layout. A Wiki page layout is a page that shows the assembly of page components used to compose a complete Wiki page with all components in place. With reference back to FIG. 6, page 600 shows examples of page components, such as header 604, footer 606, left margin 608, right margin 610, menu 612, and body 614. A Wiki page is a page within a Wiki application. Therefore, it would be desirable to have the Wiki page layouts be dynamically configurable and defined in a Wiki page such that users can create new Wiki page layouts as simply as creating new Wiki pages. It would also be desirable to have collections of related Wiki pages share the same Wiki layout page.

Illustrative embodiments of the present invention provide for embedding Wiki page content into the body of a Wiki layout page. A Wiki layout page is a Wiki page that defines the page layout for a Wiki page. Additionally, a specific layout may be associated with a Wiki page. A user may create a new Wiki layout page by simply creating a new Wiki page and editing the content of the newly created Wiki page. The default content of each page component of the newly created Wiki page is provided by Wiki commands that are named after the page component for which the commands provide content. A Wiki command is a command used to implement a function and/or process of a Wiki application. For example, in an illustrative embodiment of the present invention, the Wiki commands are named header, footer, menu, left margin and right margin.

Users may include the content from these Wiki commands in any position on the Wiki page that a user wants by using HTML page flow. HTML page flow is how the browser positions the contents of a Web page in reaction to HTML tags that comprise the page source. For example, an HTML <TABLE> tag in the source of a Web page causes the browser to render a tabular display divided into rows and columns which flow vertically from top to bottom. Thus, users can employ the same approach to editing Wiki layout pages as is used for any other Wiki page. A user may include other static HTML content and other dynamic Wiki commands within the newly created Wiki page as the user sees fit. Thus, illustrative embodiments of the present invention allow users to create pages that share a common look and layout, such as what content appears in the header, for example, a company logo or image, and where the menu appears. Additionally, illustrative embodiments of the present invention allow users to create this common look in a simple way consistent with what the user is familiar with doing, namely creating and editing Wiki pages.

Whenever a user requests a Wiki page, by typing a universal resource locator, Wiki page tables are checked to determine whether a layout page name associated with the page, or set of sub-pages is present. If a layout page is associated with the requested Wiki page, the Wiki page is rendered with the layout information being added and wrapped around the requested Wiki page, forming a combined page.

In an illustrative embodiment of the present invention, a special template variable is included in the Wiki layout page. The special template variable is replaced by the content of the target Wiki page when the new Wiki layout page is used. In these examples, the template variable is a string variable. When naming this special template variable, the user wants to avoid as much collision with the other text on the newly requested page as possible. Therefore, the name of the special template variable is typically a pattern that is unlikely to occur naturally. In an illustrative embodiment of the present invention, the special template variable is called %_BODY_%. The special template variable is located in the body field of the Wiki layout page. A body field is an object variable of the Wiki layout page object, such as object variable 528 in FIG. 5. The body field contains the raw, un-rendered content of a Wiki page.

Illustrative embodiments of the present invention provide for a Wiki page to inherit the layout of the Wiki page from ancestor Wiki pages. Each Wiki page has a list of Wiki pages associated with the Wiki page that are ancestor Wiki pages for the Wiki page. Ancestor Wiki pages are those Wiki pages that occur at a higher level in the page naming hierarchy. For example, if a Wiki page is named "LevelOne/LevelTwo" and a Wiki page named "LevelOne" exists, the Wiki page named "LevelOne" is considered an ancestor of the Wiki page "LevelOne/LevelTwo". The list of the set of ancestor Wiki pages is stored in a field in a Wiki page object. A set of ancestor Wiki pages may comprise one or more ancestor Wiki pages. In an illustrative embodiment of the present invention, the field is called a path field. A query is used which finds the first Wiki page in a reverse hierarchical order in the list of ancestor Wiki pages that contains a Wiki page layout specifier. In an illustrative embodiment of the present invention, the list of ancestor pages is checked against a Wiki_pages table in a database, such as database 524 in FIG. 5. The Wiki_pages table contains a list of entries. Each entry comprises a Wiki page and any Wiki layout page associated with that specific Wiki page. Each Wiki page in the list of ancestor Wiki pages is compared to the entries in the Wiki_pages table. Once an entry matching a Wiki page in the list of ancestor Wiki pages is found that has an associated Wiki layout page, the specified layout page is then selected for the target Wiki page to inherit.

Figure 23:
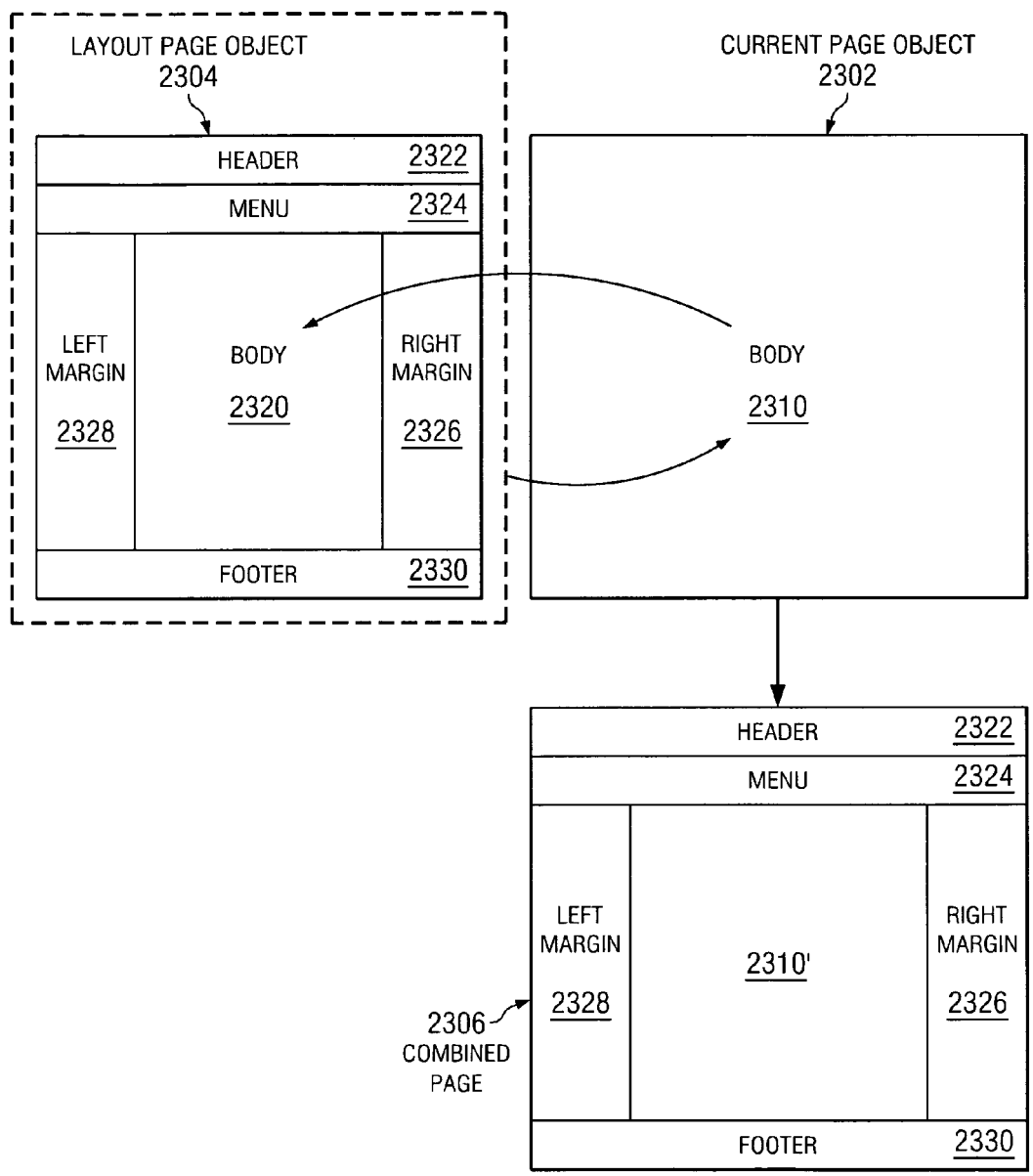
FIG. 23 is a block diagram illustrating the process of embedding Wiki page content into the body of a Wiki layout page in accordance with an illustrative embodiment of the present invention.

Next, FIG. 23 is a block diagram illustrating the process of embedding Wiki page content into the body of a Wiki layout page in accordance with an illustrative embodiment of the present invention. This process in FIG. 23 may be implemented by a Wiki engine, such as Wiki engine 402 in FIG. 4. Current page object 2302 is a Wiki page object, such as Wiki page 526 in FIG. 5. Body 2310 is the body field of the Wiki page, which is an object variable of the Wiki page object, such as object variable 528 in FIG. 5. Layout page object 2304 includes page components header 2322, menu 2324, right margin 2326, left margin 2328, footer 2330, and body 2320. The page components in layout page object 2304 are contained in the body field of layout page object 2304, which is an object variable of the layout page object, such as object variable 528 in FIG. 5. The content of the body field of current page object 2302, body 2310 is placed into the body component of layout page object 2304, body 2320. Then, the content of the body field of layout page object 2304, which includes page components header 2322, menu 2324, right margin 2326, left margin 2328, footer 2330, and body 2320, is placed into the body field of current page object 2302, body 2310.

Current page object 2302 is then rendered as combined page 2306. Combined page 2306 is the result of combining current page object 2302 and layout page object 2304. Combined page 2306 includes layout page components header 2322, menu 2324, right margin 2326, left margin 2328 and footer 2330, from layout page object 2304 as well as the content of the body field of current page object 2302, which is represented by body 2310.

In conventional Wiki applications, there currently exists no method to have a Wiki layout page be dynamically configurable in such a way that specific page components of the Wiki page layout can be conditionally shown or hidden. A Wiki page layout is a page that shows the assembly of page components used to compose a complete Wiki page with all components in place. A Wiki page is a page within the Wiki application.

Illustrative embodiments of the present invention provide for programmatically hiding and showing Wiki page layout components. The Wiki layout page is divided into a set of page components. The page components are called the header, menu, left, right, body, and footer components. FIG. 6 shows examples of page layout components, such as header 604, footer 606, left margin 608, right margin 610, menu 612, and body 614. The content of each component is generated by a Wiki command. A Wiki command is a command used to implement a function and/or process of a Wiki application. In an illustrative embodiment of the present invention, the Wiki commands have the same name as the page components for which they generate content. A Wiki page layout contains simple HTML markup with embedded Wiki command markup. When the page is rendered, the Wiki commands interrogate Wiki page settings that control whether or not the page components should display the content generated by the Wiki commands.

In an illustrative embodiment of the present invention, Wiki page settings are implemented as checkboxes that are editable by a user, when the user edits a Wiki page. By checking and un-checking the checkboxes, the user controls the visibility of the various page components, as well as, page comments, attachments and emails. The settings are saved in the Wiki_pages table, which is part of a database, such as database 524 in FIG. 5, in the "components" column as a bit-mask against which display logic can check. An entry within the page table comprises fields of an identity (ID), account, tag, time, body, owner identity (ownerID), modified_by, is Latest, layout, is Layout, is Editing, commentOn, sections, path, attributes (attrib), and errors. A bit mask is a binary number wherein each bit represents a yes or no value (1 or 0) for a distinct variable. By using fast bitwise operations, the value of a specific variable can be determined or changed. Thus, a bit mask is a compact and efficient means of storing such variables.

Figure 24:
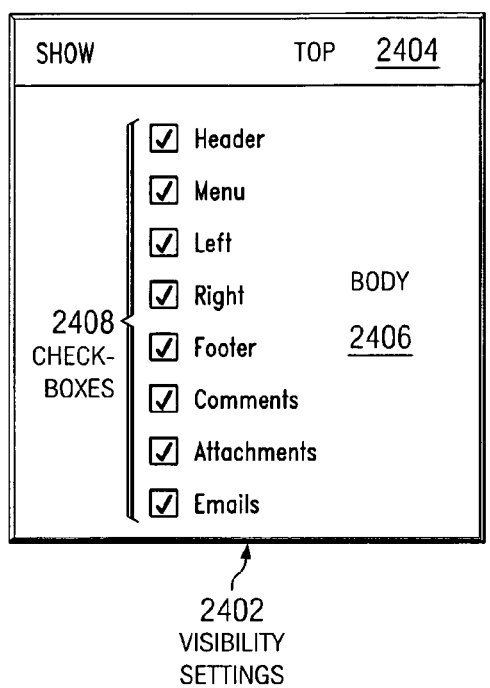
FIG. 24 is a block diagram depicting checkboxes for determining visibility of content of page components in accordance with an illustrative embodiment of the present invention.

Turning now to FIG. 24, a block diagram depicting checkboxes for determining visibility of content of page components is depicted in accordance with an illustrative embodiment of the present invention. Visibility settings 2402 is a display area through which a user can control the visibility of various page layout components. Visibility settings 2402 may be implemented as part, of the content of a Wiki page. In an alternative illustrative embodiment of the present invention, visibility settings 2402 is implemented as a menu option on a client browser. Body 2406 includes checkboxes 2408. Checkboxes 2408 include checkboxes for the header, menu, left, right, and footer layout page components, as well as checkboxes for comments, attachments, and e-mails. By checking or un-checking checkboxes 2408, a user can control the visibility of the content of the named layout page components as well as the page comments, attachments and e-mails. In an illustrative embodiment of the present invention, checking the boxes causes the content of the named layout page components as well as the page comments, attachments and e-mails to be displayed in the client browser. In such an implementation, the top portion of visibility settings 2402 would include the word show or visible, or some other term of equivalent meaning. In FIG. 24, top 2404 includes the word show, indicating that checking a checkbox would cause the content belonging to the layout page section to be shown in the client browser.

In an alternative illustrative embodiment of the present invention, checking a checkbox in visibility settings 2402 causes the content of the corresponding layout page component to be hidden in the client browser. In such an implementation, the top area, top 2404, would contain a term indicating this implementation, such as hide, for example.

In an illustrative embodiment of the present invention, the result of the checking and un-checking of checkboxes 2408 is stored in a database as a bit mask. During the process of rendering a page for display, the display logic checks the bit mask to determine which content is to be displayed in the client browser.

Figure 25:
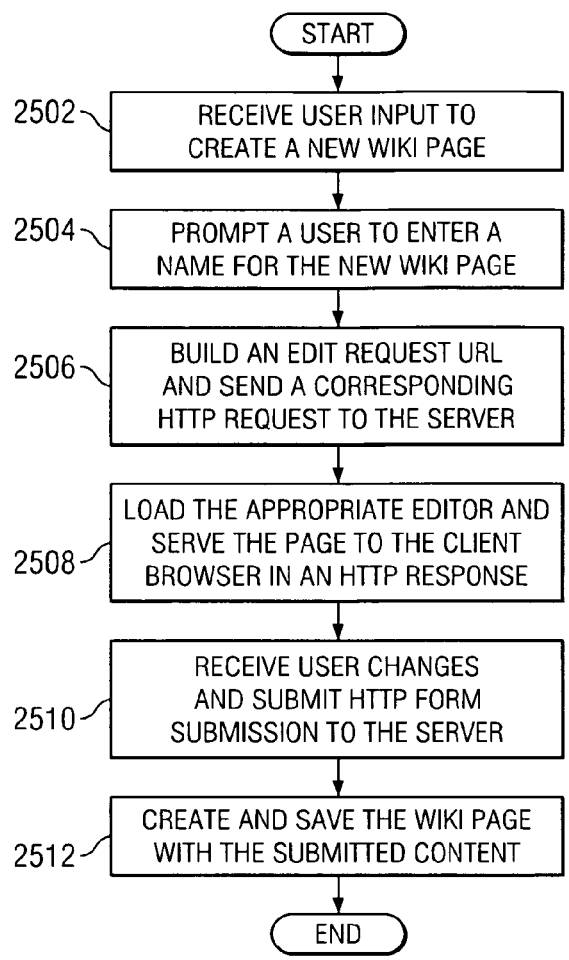
FIG. 25 is a flowchart of a process for creating a Wiki page in accordance with an illustrative embodiment of the present invention.

Turning now to FIG. 25, a flowchart of a process for creating a Wiki page is depicted in accordance with an illustrative embodiment of the present invention. The process in FIG. 25 is for creating a Wiki page, such as Wiki page 602 in FIG. 6. The process in FIG. 25 begins by receiving user input to create a new Wiki page (process block 2502). The user may use a client browser to select a new page command from a menu to provide the user input in process block 2502.

Next, the process prompts the user to enter a name for the new Wiki page (process block 2504). In one example, the page name may contain alphabetic and numeric characters which follows the CamelCase rules. The page name of the Wiki may also contain '/' characters indicating divisions or levels in the hierarchy. For example, the new Wiki page may be test 904 in FIG. 9.

Next, the process builds an edit request uniform resource locator (URL) and sends a corresponding hypertext transfer protocol (HTTP) request to the server (process block 2506). The edit request may be built by a JavaScript function on the client browser and may specify the new page action and the new page name.

Next, the process loads the appropriate editor and serves the page to the client browser in a hypertext transfer protocol response (process block 2508). Process block 2508 may be implemented by Wiki controller 500 in FIG. 5.

Next, the process receives user changes and submits a hypertext transfer protocol form submission to the server (process block 2510). Process block 2510 may occur in response to the user editing the Wiki page in the client browser and submitting the content to be saved.

Next, the process creates and saves the Wiki page with the submitted content (process block 2512) with the process terminating thereafter. In process block 2512, the Wiki controller handles the page hypertext transfer protocol request and may use a createPage and save method to instantiate the Wiki page object and then save the Wiki page object. The Wiki page object, such as Wiki object 508 in FIG. 5, creates a row in the Wiki pages database table, such as database 524 in FIG. 5 to represent the new Wiki page.

Figure 26:
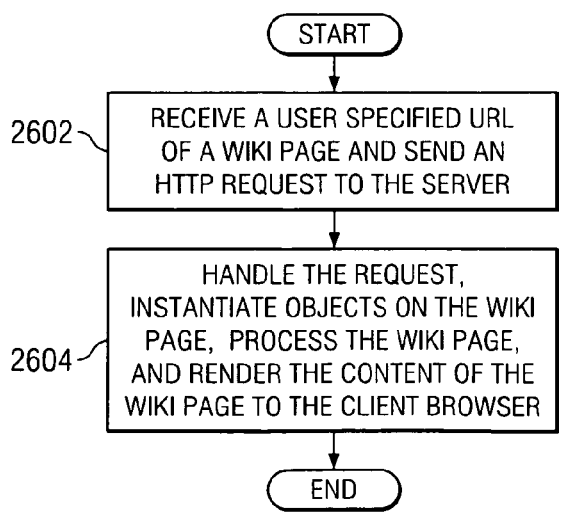
FIG. 26 is a flowchart of a process for displaying a page in accordance with an illustrative embodiment of the present invention.

Turning now to FIG. 26, a flowchart of process for displaying a page is depicted in accordance with an illustrative embodiment of the present invention. The process begins by receiving a user specified uniform resource locator (URL) of a Wiki page and sending a hypertext transfer protocol request to the server (process block 2602). Process block 2602 may be received by a client browser in client environment 300 in FIG. 3.

Next, the process handles the request, instantiates objects on the Wiki page, processes the Wiki page, and renders the content of the Wiki page to the client browser as a hypertext transfer protocol response (process block 2604) with the process terminating thereafter. Process block 2604 may be implemented by Wiki controller 500 in FIG. 5. The Wiki controller may call the showPage method on the Wiki object. The showPage method instantiates a Wiki page object that maintains the Wiki page contents of the specific row in the Wiki pages database table. The Wiki controller then calls the process method on the Wiki page object which processes the Wiki page and renders the content of the page to the client browser.

Figure 27:
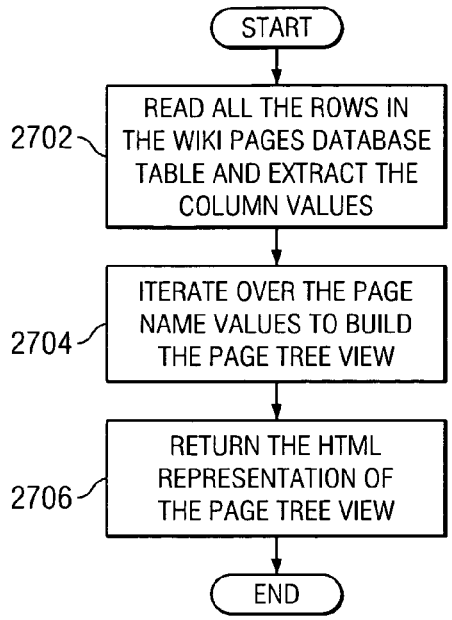
FIG. 27 is a flowchart of a process for generating a page tree view in accordance with an illustrative embodiment of the present invention.

Turning now to FIG. 27, a flowchart of a process for generating a page tree view is depicted in accordance with an illustrative embodiment of the present invention. The process in FIG. 27 may be used to create page tree view 900 in FIG. 9. The process in FIG. 27 may be implemented by a PageTreeCommand within command 550 in FIG. 5.

The process begins with the PageTreeCommand reading all the rows in the Wiki pages database table and extracting the page name column values (process block 2702). The page name may also be a tag. A tag is the page name or label that is used to categorize content of a Wiki page. The database may be a database, such as database 524 in FIG. 5.

Next, the PageTreeCommand iterates over the page name values to build the page tree view (process block 2704). During process block 2704, the hierarchy of pages is grouped into nodes and leaf nodes to form a visual tree structure. The nodes are both container and content providers, and the leaf nodes are solely content providers. For example, if a page name ends with a '/' character, the page is treated as a container and content provider and is represented with an appropriate icon representing containment, such as test 904 in FIG. 9. All Wiki page names begin with that name including the '/' are considered descendents of that page. If the remaining portion of the Wiki page name contains '/', the Wiki page is also considered a container and content provider. If the remaining portion of the Wiki page name does not contain a '/', the Wiki page is considered a leaf node and is represented with an appropriate icon such as helloworld 912 in FIG. 9. Any number of different page indicators, such as '/', may be used to specify that a page is a node or leaf node.

Next, the PageTreeCommand returns the hypertext markup language representation of the page tree view (process block 2706) with the process terminating thereafter. The hypertext markup language representation of the page tree view is displayed on the client browser for the user to use in navigating the Wiki pages.

Figure 28:
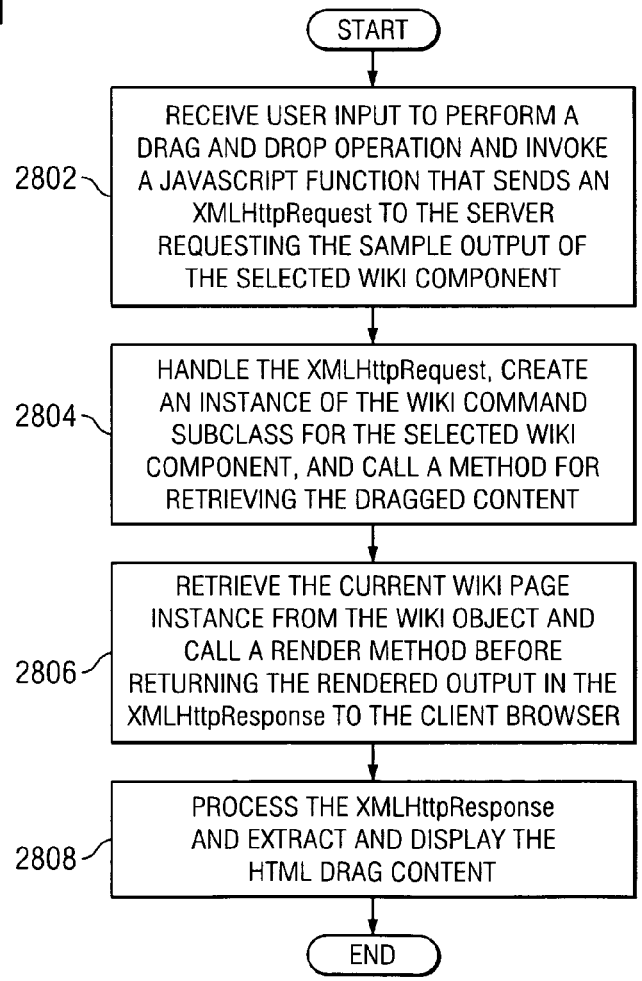
FIG. 28 is a flowchart of a process for dragging live content in accordance with an illustrative embodiment of the present invention.

Turning now to FIG. 28, a flowchart of a process for dragging live content is shown in accordance with an illustrative embodiment of the present invention. The illustrative embodiments of the present invention allows dynamic content to be dragged onto a Wiki page and provides a sample of the content as the dynamic content is dragged onto the page. Using an XMLHttpRequest, the Wiki component is remotely invoked and the content returned in an XMLHttpResponse as the drag visual. A request is data sent from a browser client to a Web server. A response is the data sent from a Web server to a browser client as a reaction (in response) to the received request data. The hypertext transfer protocol is an international standard defining specific format and content for requests and responses sent to and from a Web server. An XMLHttpRequest/Response is a further specialization of a hypertext transfer protocol request/response that supports extensible markup language data content and specific response formats. The process in FIG. 28 may be implemented using Wiki page 700 in FIG. 7.

The process begins by receiving user input to perform a drag and drop operation and invoking a JavaScript function that sends an XMLHttpRequest to the server requesting the sample output of the selected Wiki component (process block 2802). The user input of process block 2802 may be generated by a user dragging an icon, such as eye-catcher 708 from palette 702 onto body 704 of Wiki page 700, all in FIG. 7. The process of process block 2802 may be received by a client browser in client environment 300 in FIG. 3.

Next, the process handles the XMLHttpRequest, creates an instance of the Wiki command subclass for the selected Wiki component, and calls a method for retrieving the dragged content (process block 2804). During process block 2804, Wiki controller 500 in FIG. 5 may handle the XMLHttpRequest and route the request to an AJAX formatter which creates an instance of the Wiki command subclass before calling a method, such as getDragContent on the Wiki command object instance. The AJAX formatter is a part of a request handler, such as request handler 404 in FIG. 4 and is considered an extension of Wiki controller 500 in FIG. 5. As previously described, router 502 in FIG. 5 decodes incoming requests and routes the request to the correct request handler. The AJAX formatter is one of the request handlers.

Next, the process retrieves the current Wiki page instance from the Wiki object and calls a render method before returning the rendered output in the XMLHttpResponse to the client browser (process block 2806). The process of process block 2806 may be performed by the AJAX formatter and may pass the result of the getDragContent call to a method, such as renderFragment.

Next, the process processes the XMLHttpResponse and extracts and displays the hypertext markup language drag content (process block 2808) with the process terminating thereafter. The process of process block 2808 is performed by asynchronous JavaScript code on the client browser. The JavaScript code may use a cascading style sheet (CSS) style which makes the drag content appear semi-transparent. Once the response is processed, extracted, and displayed, control of the process may be handed to drag support.

The drag support consists of event-driven JavaScript code which responds to mouse move events. While the user has a mouse button depressed and moves the mouse, the browser JavaScript runtime fires a mouse move event. The drag support implements a mouse move event handler JavaScript function which gets invoked to handle the mouse move event. The drag support uses the JavaScript document object model (DOM) application programming interface (API) functions of the browser to determine the current position of the mouse cursor. The drag support then uses the document object model application programming interface functions to set the position of the drag content, such as a semi-transparent visual returned from the AJAX request to getDragContent. The process is then repeated as long as the user keeps the mouse button depressed and continues to move the mouse. When the user releases the mouse button, a mouse up event is fired by the browser's JavaScript runtime. The drop support implements a mouse up event handler JavaScript function which is invoked to handle the mouse up event. The drop support uses the JavaScript document object model application programming interface functions of the browser to determine the current position of the mouse cursor. The drop support then sends an XMLHttpRequest to the server to have the content inserted into the Wiki page.

Turning now to FIG. 29, a flowchart of a process for combining content of Wiki pages is shown in accordance with an illustrative embodiment of the present invention. The application Wiki of the illustrative embodiments of the present invention needs a powerful, consistent way to composite content created on various pages. Wiki components are included in Wiki page sources via a "markdown" syntax that consists of two '{' characters, followed immediately by a Wiki component name, followed by white space, followed by optional space separated arguments in 'name="value"' syntax. For example, {{ImportPage page="HomePage"/}} where 'ImportPage' is the name of a Wiki component. The contents of any Wiki page may be included within another page using the same Wiki "markdown" syntax as Wiki components. To include the contents of the Wiki page named "HomePage" into the current page, the Wiki user needs to only type {{HomePage/}} and the HomePage contents will be expanded in-line.

The process in FIG. 29 may be implemented on composite content, such as Wiki page 1000 in FIG. 10. The process begins by parsing the Wiki page source into parse fragment objects representing static textual content and Wiki components (process block 2902). The process of process block 2902 is implemented by a Wiki command context object, such as Wiki command context 544 in FIG. 5. During process block 2902, the page is parsed into parse fragments which are organized in a tree structure called an abstract syntax tree (AST), which is the internal representation in memory of the Wiki page content. Operations in future steps may now manipulate the page contents by traversing the tree and performing operations on tree nodes.

Next, the process calls a load plugin method which iterates over the list of Wiki components on the Wiki page (process block 2904). A method, such as loadPlugins, is called for each Wiki component to instantiate the appropriate Wiki command subclass which implements the functionality of each Wiki component. Process block 2904 is a further refinement of the creation of the in-memory representation of the page content and is a transitional process.

Next, the process calls a load command method of the Wiki object to perform the Wiki command class loading. If the load command method fails to find the appropriate Wiki command class, the method throws an exception (process block 2906). The load plugin method of process block 2906 may be loadPlugin. Process block 2906 completes the creation of the in-memory representation of the Wiki page by associating supporting command objects with the Wiki component parse fragments.

Next, the process catches the exception and calls a page exists method of the Wiki object to determine if the named Wiki component is actually a Wiki page. Valid page names are loaded into the import page component (process block 2908).

In process block 2908, if a method, such as pageExists, returns a valid page, the Wiki command context calls the loadPlugin method to load the import page component passing in the Wiki page name. The import page component functions to embed the content of a named page.

Next, the process adds the import page component to a list of the Wiki command context components (process block 2910). Next, the process expands the import page component to the contents of the named Wiki page during rendering (process block 2912) with the process terminating thereafter. In process block 2912, the process adds the importPage command instance to the list of components.

Turning now to FIG. 30, a flowchart of a process for editing a command is shown in accordance with an illustrative embodiment of the present invention. The process in FIG. 30 may be implemented on a page, such as Wiki page 800 in FIG. 8. The process begins by displaying a palette of Wiki components in response to receiving user input to edit a Wiki page (process block 3002). In process block 3002, the user may provide user input by selecting a quite easily done check box. The palette is a palette, such as palette 802 in FIG. 8. The page, such as Wiki page 800 may include any number of eye-catchers that give the user a visual cue that the component may be selected and edited. Process block 3002 may be received by a client browser in client environment 300 in FIG. 3.

Next, the process invokes a JavaScript function that sends an XMLHttpRequest to the server to retrieve the property editor for the selected Wiki component in response to the user selecting an eye-catcher (process block 3004). The eye-catcher may be a Google® maps icon, such as eye-catcher 708 in FIG. 7.

Next, the process handles the request and delegates processing to the AJAX formatter. The AJAX formatter creates a Wiki Command Context object and calls the associated load plugin method requesting that the property editor Wiki component be loaded (process block 3006). Process block 3006 is performed by Wiki controller 500 in FIG. 5.

Next, the process calls the draw method of the property editor component passing in the selected Wiki component name. The results of the draw method are returned to the client in an XMLHttpResponse (process block 3008).

Next, the process processes the XMLHttpResponse which contains the hypertext markup language and JavaScript of the property editor for the selected component and makes the property editor visible (process block 3010). The processing is done asynchronously and the property editor may be made visible using cascading style sheet (CSS). The process of process block 3010 may be implemented by the AJAX formatter in Wiki controller 500 in FIG. 5.

Next, the process receives user input in the property editor and issues an XMLHttpRequest to the server to update the properties of the selected Wiki component (process block 3012). Process block 3012 is performed by the property editor and corresponding client browser.

Next, the process handles the request and delegates processing to the AJAX formatter. The AJAX formatter creates a Wiki command context object and calls the associated load plugin method requesting that the update command Wiki component be loaded (process block 3014). Next, the process calls the draw method of the update command component passing in the selected Wiki component name. The update command component updates the Wiki component source "markdown" on the server and returns an XMLHttpResponse indicating success or failure (process block 3016) with the process terminating thereafter. The process of process block 3016 may be implemented by the AJAX formatter in Wiki controller 500 in FIG. 5.

Thus, illustrative embodiments of the present invention provide a computer implemented method, apparatus, and computer usable program code for an application Wiki. The illustrative embodiments of the present invention allow a user to easily create and manage Wiki pages. The user may edit a Wiki page by dragging and dropping live content. Wiki pages may be combined as requested by the user and may be edited using a property editor. Wiki pages are saved in a page tree view including nodes and leaf nodes for navigating the Wiki.

Turning now to FIG. 31, a flowchart of a process for rendering a Wiki command is depicted in accordance with an illustrative embodiment of the present invention. The process in FIG. 31 may be implemented in Wiki engine 404 in FIG. 4. The Wiki page may include several Wiki commands. Each Wiki command may contain other Wiki commands as well. The process in FIG. 31 begins with the Wiki engine invoking the render method on a Wiki command (process block 3102). The Wiki engine may be an engine, such as Wiki engine 402 in FIG. 4. The render method may be a page processing method, such as render 1226 in FIG. 12.

Next, the process calls the open method (process block 3104). The open method of process block 3104 provides a mechanism for the Wiki command to begin displaying rendered content. For example, a command may generate an 'opening' fragment of hypertext markup language, such as '<SPAN>Forecast Command. The closing fragment of the SPAN will be generated using the close method. Next, the process makes a determination as to whether the Wiki command permits editing (process block 3106). A Wiki command overrides the setting of allowEdit to determine if the command permits editing content of the command. A value of true indicates a command can be edited. If the Wiki command permits editing, the process generates an eye-catcher (process block 3108).

If the Wiki command does not permit editing, the process calls renderBody (process block 3110). renderBody provides the opportunity for the command to render or emit the corresponding hypertext markup language content. Next, renderBody displays the eye-catcher and then calls render on each of any existing children (process block 3112). For example, in process block 3112, the eye-catcher may be displayed using a draw method. The Wiki command may form a hierarchy, that is, Wiki commands may contain other Wiki commands. As a result, the Wiki commands form a tree of commands. Children are the first generation of contained or embedded Wiki commands. Next, the process invokes a close method (process block 3114) with the process terminating thereafter.

Turning now to FIG. 32, a flowchart of a preliminary process for property editing is depicted in accordance with an illustrative embodiment of the present invention. The process in FIG. 32 is for editing properties of Wiki commands. The process begins by rendering the command (process block 3202). The command is rendered in a rendering process, such as the process in FIG. 31. Next, the process generates the default property editor and hides the property editor on the generated page (process block 3204) with the process terminating thereafter. Most of the time, the user will not interact with the property editor, so the default state of the property editor is hidden until needed by the user. A default property editor is generated in process block 3204 if the command chooses not to implement itself. A command may implement a property editor by overriding a generatePropertyEditor protocol.

Turning now to FIG. 33, a flowchart of a process for property editing is depicted in accordance with an illustrative embodiment of the present invention. The process in FIG. 33 may occur after the process in FIG. 32. First, the process receives a signal from a user to trigger the property editor to be invoked on a selected command (process block 3302). For example, in process block 3302, the user may click on the eye-catcher of the Wiki command which triggers the property editor.

Next, the process identifies the selected command to the client-side property editor subsystem (process block 3304). The Wiki environment includes a JavaScript base subsystem that tracks the selected component by tracking mouse clicks on the eye-catchers generated. The action of clicking on an eye-catcher identifies the selected command. Process block 3304 may be performed by an eye-catcher, such as eye-catcher 1302 in FIG. 13.

Next, the process generates an AJAX invocation to ask the server side command representative to render the client-side property editor (process block 3306). Process block 3306 may be performed by a property editor, such as property editor 1304 in FIG. 13. During the execution of process block 3306, the AJAX call invokes the server uniform resource indicator of the Wiki command processor which loaded the pages into the server identified in the object variables of the request. The uniform resource indicator also contains a set of new object variables that represent the new values of the input values for the Wiki command. The engine then updates the input values of the Wiki commands and asks the Wiki command to update the corresponding visual representation based upon the new values. Process block 3306 may be initiated by a command, such as generatePropertyEditor 1222 in FIG. 12.

Next, the process selects a property editor (process block 3308). In process block 3308, the selected Wiki command may choose to provide a specialized property editor by overriding the generatePropertyEditor method or may inherit the default implementation. Alternatively, the Wiki command may provide its own property editor which consists of the hypertext markup language necessary to edit the parameters, properties, and attributes of the Wiki command. The property editor may be selected in process block 3308 based on the attributes of a selected command.

The property editor then receives user interactions and then submits an update to the parameters of the Wiki command (process block 3310). Next, the property editor generates an AJAX based request which instructs the server page processor to update the list of parameters for the selected Wiki command on a given page (process block 3312). Next, the command processor locates the command, instantiates the command, and sets the values of the command to the new values passed from the client (process block 3314). Next, the command processor asks the commands if the whole page should be updated by invoking the refreshOnUpdate method (process block 3316). Process block 3316 is implemented by command processor 406 in FIG. 4. If the commands indicate the whole page should be updated, the whole page is redisplayed on the client (process block 3318) with the process terminating thereafter. If the commands indicate the whole page does not need to be updated, the command renders itself and the new content is displayed in the getTargetDIV area on the client hypertext markup language document (process block 3320) with the process terminating thereafter.

As an example of process block 3320, the user may use the property editor to update a property value of a Forecast Wiki command which may implement the process as described in the following example. The user updates the zip code property using the property editor. The property editor generates an update command request and sends the command to the server. The server receives the requests, loads the page containing the Forecast command, places the new zip code into the page, saves the updated page, and asks the Forecast command if the command needs to refresh the page. The Forecast command answers no, so the server asks the Forecast command to render itself using the new values of the input values sent from the property editor. The hypertext markup language fragment that is generated is sent back to the client and placed in the hypertext markup language element identified by the getTargetDIV protocol. The command may render itself in a process, such as the process in FIG. 31.

Figure 34:
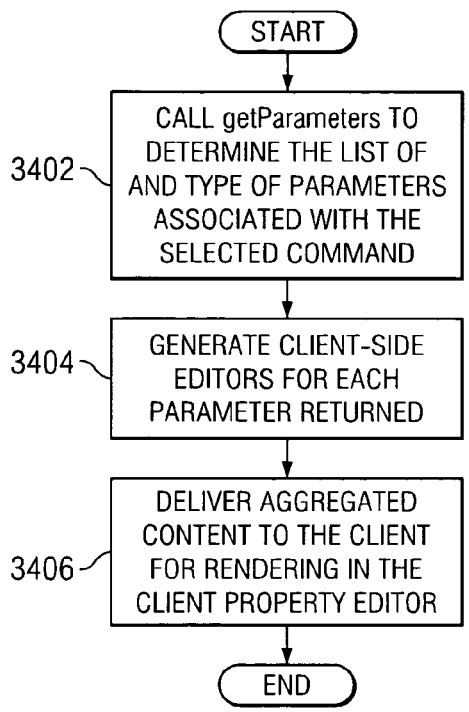
FIG. 34 is a flowchart of a process selecting a property editor in accordance with an illustrative embodiment of the present invention.

Turning now to FIG. 34, a flowchart of a process selecting a property editor is shown in accordance with an illustrative embodiment of the present invention. The process in FIG. 34 is a more detailed description of process block 3308 in FIG. 33. The process begins with the default property editor calling the getParameters to determine the list and type of parameters associated with the selected command (process block 3402). Next, the process generates the client-side editors for each parameter returned (process block 3404). The parameter lists provide names, help strings, and possible values for parameters returned.

Next, the process delivers the aggregated content to the client for rendering in the client property editor (process block 3406) with the process terminating thereafter. Aggregated content is information received from the property editor for the specific command. For example, the aggregated content includes each piece of metadata and parameters obtained in process blocks 3402 and 3404 for the command displayed to show the property editor. The aggregated content may be rendered in the client property editor defined during a step, such as process block 3306 in FIG. 33.

Figure 35:
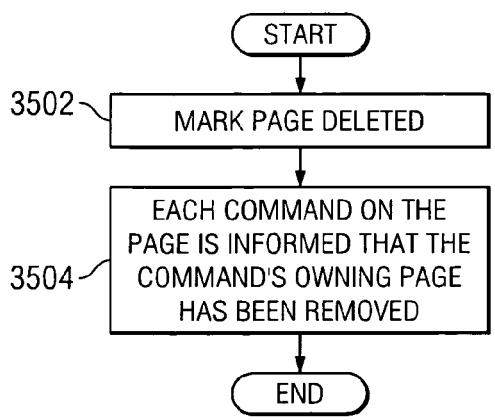
FIG. 35 is a flowchart of a process for deleting a page in accordance with an illustrative embodiment of the present invention.
Figure 36:
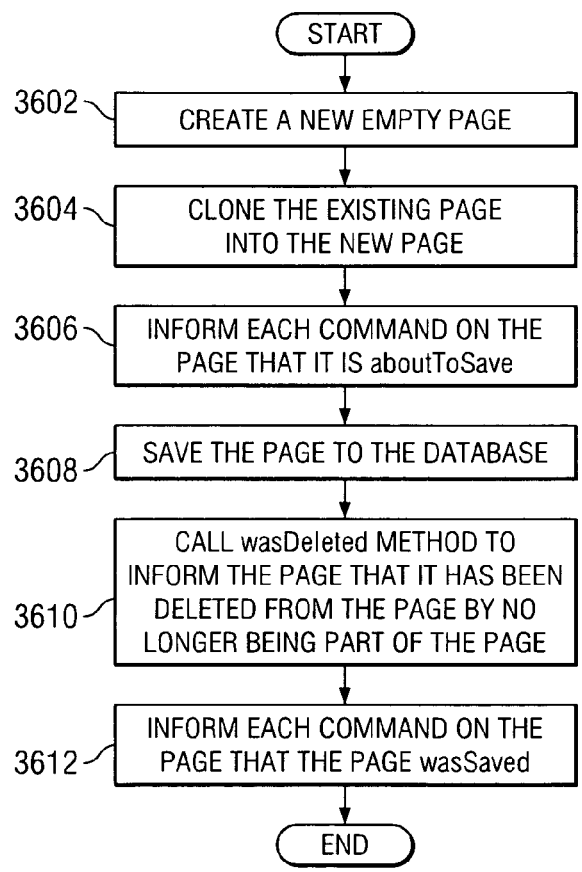
FIG. 36 is a flowchart of a process for revising a page in accordance with an illustrative embodiment of the present invention.

FIGS. 35-36 are page lifecycle processes used during the lifecycle of a Wiki page. Turning now to FIG. 35, a flowchart of a process for deleting a page is shown in accordance with an illustrative embodiment of the present invention. The process begins with the page being marked for deletion (process block 3502). A user may mark the page because of old content, irrelevance, or for any other reason. In process block 3502, the page is marked as deleted. The page is not actually removed from the database. Next, each command on the page is informed that the command's owning page has been removed (process block 3504) with the process terminating thereafter. Each command may be informed using a method, such as wasDeleted 1218 in FIG. 12. Process block 3504 is used to clean up persistent resources associated with the Wiki command on the given page.

Turning now to FIG. 36, a flowchart of a process for revising a page is depicted in accordance with an illustrative embodiment of the present invention. The process begins by creating a new empty page (process block 3602). Next, the process clones the existing page into the new page (process block 3604). Next, the process informs each command on the page that it is aboutToSave (process block 3606). aboutToSave may be a lifecycle command, such as lifecycle 1204 in FIG. 12.

Next, the page is saved to the database (process block 3608). Next, the process calls the wasDeleted method to inform the page that it has been deleted from the page by no longer being part of the page (process block 3610). Process block 3610 is performed for each command that is no longer part of the page. Next, the process informs each command on the page that the page wasSaved (process block 3612) with the process terminating thereafter. Process block 3612 may use a method, such as wasSaved 1216 in FIG. 12.

Figure 37:
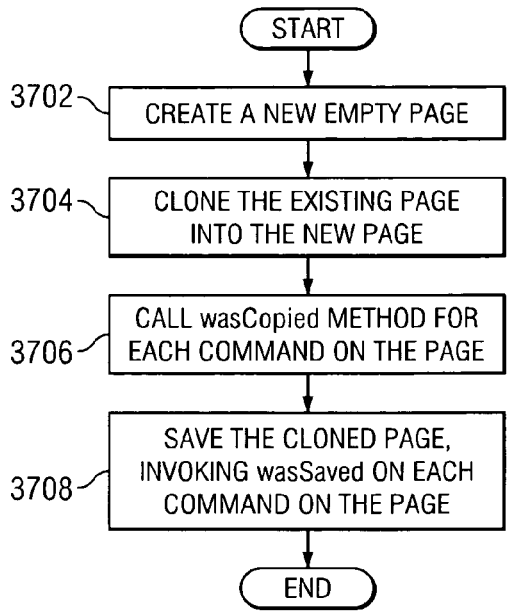
FIG. 37 is a flowchart of a process for copying a page in accordance with an illustrative embodiment of the present invention.

Turning now to FIG. 37, a flowchart of a process for copying a page is depicted in accordance with an illustrative embodiment of the present invention. The process may begin by creating a new empty page (process block 3702). Next, the process clones the existing page into the new page (process block 3704). Next, the process calls the wasCopied method for each command on the page (process block 3706). Process block 3706 may use a method, such as wasCopied 1220 in FIG. 12.

Next, the process saves the cloned page, invoking was-Saved on each command on the page (process block 3708) with the process terminating thereafter.

Figure 38:
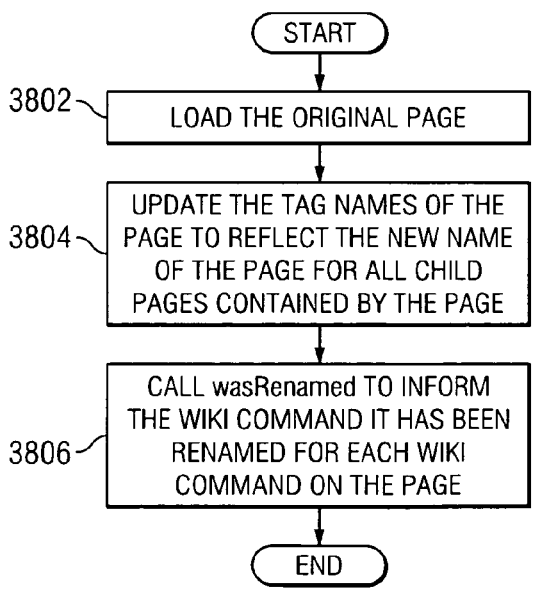
FIG. 38 is a flowchart of a process for renaming a page in accordance with an illustrative embodiment of the present invention.

Turning now to FIG. 38, a flowchart of a process for renaming a page is depicted in accordance with an illustrative embodiment of the present invention. The process in FIG. 38 begins by loading the original page (process block 3802). Next, the process updates the tag names of the page to reflect the new name of the page for all child pages contained by the page (process block 3804). Next, the process calls wasRenamed to inform the Wiki command it has been renamed for each Wiki command on the page (process block 3806) with the process terminating thereafter.

Figure 39:
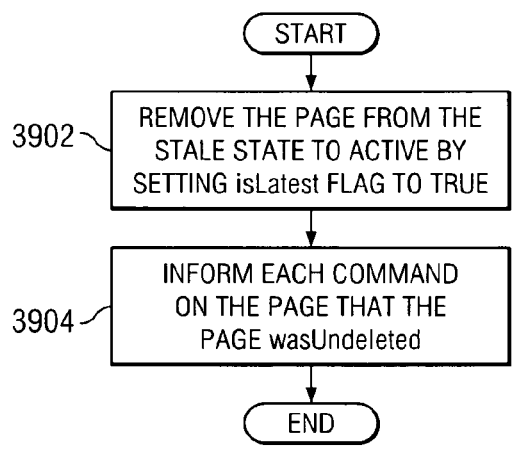
FIG. 39 is a flowchart of a process for undeleting a page in accordance with an illustrative embodiment of the present invention.

Turning now to FIG. 39, a flowchart of a process for undeleting a page is depicted in accordance with an illustrative embodiment of the present invention. The process in FIG. 39 begins by removing the page from the stale state to active by setting the is Latest flag to true (process block 3902). Next, the process informs each command on the page that the page wasUndeleted (process block 3904) with the process terminating thereafter. wasUndeleted is called when the command has been placed back on a given page after previously being deleted from the page.

Turning now to FIG. 40, a flowchart of a process for palette construction is shown in accordance with an illustrative embodiment of the present invention. The Wiki environment provides a palette of available commands installed in the Wiki. The palette provides a visible mechanism for displaying the Wiki command available within the Wiki environment. The palette is defined into categories which are defined by a getCategory protocol. The palette is generated for each command in the Wiki using the process in FIG. 40.

First, the process determines if the command supports editing (process block 4002). If the Wiki supports editing, the process invokes the getDropContent which returns the default Wiki markup to be inserted into the page associated with the given Wiki command (process block 4004) with the process terminating thereafter. Process block 4004 may be performed in response to a Wiki command being dragged out of the palette and placed onto the page.

If the process determines the command does not support editing in process block 4002, the process retrieves the category of the command (process block 4006). Categories are defined by the command within the Wiki environment. Some exemplary categories include 'Data Services', and 'Page Content.' Each command in the same category is displayed in the same tab on the palette view. Next, the process retrieves the name (process block 4008). The name may be retrieved using a method, such as getName 1212 in FIG. 12. Next, the process retrieves the description (process block 4010). The description may be retrieved using a method, such as getDescription 1214 in FIG. 12. Next, the process retrieves the icon (process block 4012). The icon may be retrieved using a method, such as getIcon. Next, the process retrieves the drag content and places the elements on the palette for each command (process block 4014). The drag content may be retrieved using a method, such as getDragContent.

Commands may display a unique icon or eye-catcher that conveys the use of the command. The getIcon protocol is used to retrieve the hypertext markup language fragment which displays the icon of the command when rendered. Many times, a command may want to provide the user with a different piece of hypertext markup language content to drag off the palette that is placed into the page when the component is first dropped onto the page for inserting a new command into the page. The content that is actually dragged from the palette may be specified by overriding the getDragContent method.

Next, the process returns to process block 4004 and invokes the getDropContent which returns the default Wiki markup to be inserted into the page associated with the given Wiki command with the process terminating thereafter.

Turning now to FIG. 41, a flowchart of a process for configuration in accordance with an illustrative embodiment of the present invention. Wiki commands that reside within the Wiki environment sometimes require configuration. For example, a GoogleMap command requires a key for use with the application program interface.

The process in FIG. 41 is used to enable commands to configure themselves and maintain a set of configuration data associated with a particular Wiki command. The process in FIG. 41 begins by displaying the general cataloging information (process block 4102). Next, the process invokes the configure method (process block 4104). The configure method allows commands to generate a hypertext markup language view for editing data associated with the Wiki command within the Wiki. Next, the process invokes the get/setPluginData methods (process block 4106) with the process terminating thereafter. The get/setPluginData method is used to retrieve and store Wiki command data that affects the Wiki site. For example, command data includes initialization data needed to invoke the command, such as a registration key.

Figure 42:
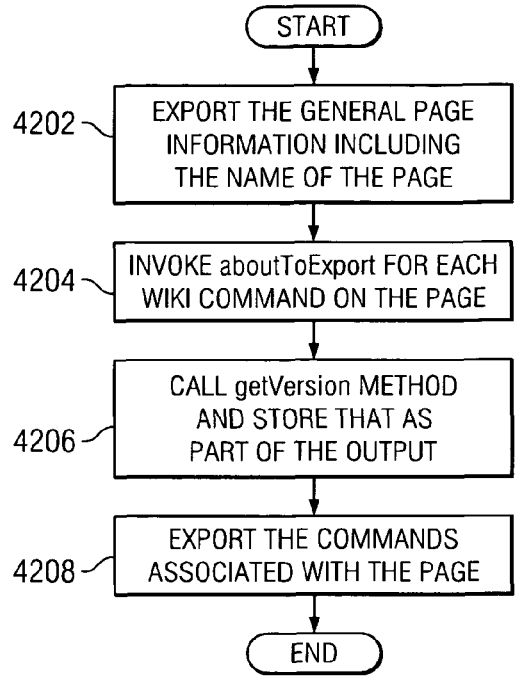
FIG. 42 is a flowchart of a process for export in accordance with an illustrative embodiment of the present invention.

Turning now to FIG. 42, a flowchart of a process for export is depicted in accordance with an illustrative embodiment of the present invention. The Wiki supports importing and exporting of the complete Wiki or a subset of the Wiki. The exports format contains the list of pages exported and the page contents, including commands and attachments. The Wiki engine invokes the process in FIG. 42 to assist in the export of a set of pages. A set of pages is one or more Wiki pages.

The process in FIG. 42 begins by exporting the general page information including the name of the page (process block 4202). Next, the process invokes aboutToExport for each Wiki command on the page (process block 4204). Next, the process calls getVersion method and stores that as part of the output (process block 4206). If the aboutToExport called in process block 4204 returns a datum, the data is saved as a serialized PHP object within the output stream in process block 4206.

Next, the process exports the commands associated with the page (process block 4208) with the process terminating thereafter. Comments may be attached to each Wiki page which represents user commentary for each page. The comments are used as a mechanism to collaborate within the Wiki. For example, a patent attorney may ask an inventor how comments are used on a Wiki page.

Figure 43:
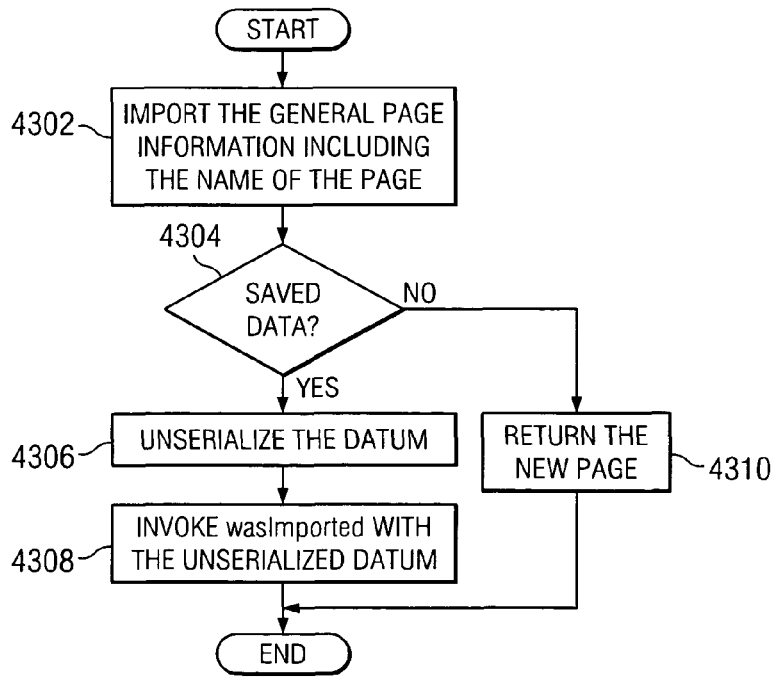
FIG. 43 is a flowchart of a process for import in accordance with an illustrative embodiment of the present invention.

Turning now to FIG. 43, a flowchart of a process for import is depicted in accordance with an illustrative embodiment of the present invention. The Wiki engine invokes the process in FIG. 43 to import each Wiki command on a page.

The process in FIG. 43 begins by importing the general page information including the name of the page (process block 4302). Next, the process determines if the command saved data (process block 4304). For example, the process determines if the command saved data in a step, such as process block 4206 in FIG. 42. If the command saved data, the process unserializes the datum (process block 4306). The default implementation ensures the saved version name matches that of the current installed Wiki command version. Next, the process invokes wasImported with the unserialized datum (process block 4308) with the process terminating thereafter. If the data was not saved in process block 4304, the process returns the new page (process block 4310) with the process terminating thereafter.

Thus, the illustrative embodiments of the present invention further provide a computer implemented method, apparatus, and computer usable program code for extending the capabilities of a Wiki environment. An object-oriented framework is used to define how objects are extended for easily creating collaborative environments. Wiki command classes are processed to effectively managed a deployed environment facilitating reusability, adaptability, and ease of use.

Figure 44:
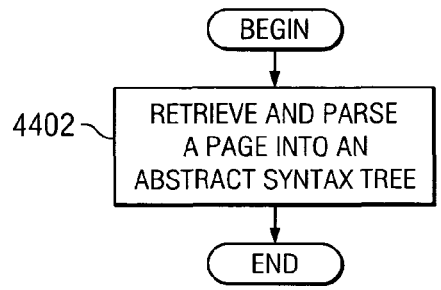
FIG. 44 is a flowchart of a process for retrieving and parsing a tree in accordance with an illustrative embodiment of the present invention.

Turning now to FIG. 44, a flowchart of a process for retrieving and parsing a tree is depicted in accordance with an illustrative embodiment of the present invention. The tree is the core process data structure used by the illustrative embodiments. The tree may be an abstract syntax tree, such as abstract syntax tree 1102 in FIG. 11. The process in FIG. 44 is implemented by a Wiki command context, such as Wiki command context 1104 in FIG. 11. The Wiki command context retrieves and parses a page into an abstract syntax tree (process block 4402) with the process terminating thereafter. A Wiki page is loaded by the Wiki. The Wiki page instantiates a Wiki command context that creates the tree.

Turning now to FIG. 45, a process for processing a web page for display in a Wiki is depicted in accordance with an illustrative embodiment of the present invention. The process in FIG. 45 may be implemented by a Wiki engine and more specifically a command processor, such as Wiki Engine 402 and command processor 406 in FIG. 4. The process in FIG. 45 begins with the process engine visiting each node in the abstract syntax tree invoking the initiation method on the commands present in the abstract syntax tree (process block 4502). The initiation method may be named init. Init finds commands within each node of the abstract syntax tree and makes the commands available to other commands. As a result, the commands may communicate with other commands including other identical commands. During process block 4502, the commands have the responsibility to initialize internal data structures of the commands, publish the topics provided, and subscribe to topics of interest on the data hub. Topics represent area of interest between publishers and subscribers. For example, one important topic in the publisher/subscriber environment is 'data/available'. Other examples of topics include 'address' and 'latlong.' During process block 4502, the commands may place events that will need to be processed after all commands have been invoked using the init method in a queue. Events communicate state changes from one state to another. The event stimulates the communication for implementing the state change.

Queuing events is performed so that events can be processed in an orderly sequential manner and are not lost in a single threaded execution environment, such as the JavaScript client. Queuing events enable the core execution environment to ensure all components are properly initialized and ready to process events before events are dispatched. The commands may perform every phase of the illustrative embodiments of the present invention and may override the default implementation.

Next, the command processor invokes processEvents on the data hub to deliver any queued events (process block 4504). The publish and subscribe model dictates that a subscriber registers with the data hub for events of interest in order to be received from the data hub. The publisher triggers events which are queued on the data hub. During the processEvents phase, the data hub processes each queued event and determines the interested subscriber and invokes the subscriber in order to deliver the event. The queued events are events that were placed in the queue in process block 4502. Next, the command processor visits each node in the abstract syntax tree invoking the discover method on the commands present in the abstract syntax tree (process block 4506).

The discover method locates command related information sources for more detailed interaction between commands. During process block 4506, the producer, consumer, or controller commands may locate each other using the data hub and establish a direct event connection to each other instead of the data hub. Commands may choose to interact indirectly through the data hub as described above or locate other commands during the discovery phase. During the discovery phase of processing, a command may interrogate the data hub for publishers, subscribers, and topics. Commands may also communicate directly if needed, bypassing the indirect communication method established above. This capability enables a more efficient process of events and eliminates the need for the data hub as a communication interface. Additionally, commands may remove themselves from the data hub. The commands may enqueue or place in queue, events that will need to be processed after all commands have been invoked using the initiation method.

Next, the command processor invokes processEvents on the data hub to deliver any queued events (process block 4508). The queued events are events that were enqueued in process block 4506. Next, the command processor visits each node in the abstract syntax tree invoking the render methods on the commands present in the abstract syntax tree (process block 4510) with the process terminating thereafter. During process block 4510, commands render both visual and non-visual content for the page. For example, visual content may include a table display of list data. Non-visual content may include the SearchList command which searches a list of data and has no visual content. The non-command nodes, such as text fragments of the page are also rendered during process block 4510. During any of the steps in FIG. 45, commands may additionally process other pieces of page source fragments by invoking the process in FIG. 45 recursively on the page source fragment. Page source fragments are all non-command content. Page source fragments capture all non-command content between commands on the page.

Turning now to FIG. 46, a flowchart of processing events is depicted in accordance with an illustrative embodiment of the present invention. The processing steps in FIG. 46 are performed by a data hub, such as data hub 1112 in FIG. 11. FIG. 46 is a more detailed explanation of process block 4504 in FIG. 45.

The process begins with the data hub removing the events from the queue (process block 4602). Next, the data hub delivers the events to registered subscribers (process block 4604). Registered subscribers are generally commands but may alternatively be stand-alone functional units. Registered subscribers are registered during initiation during which commands publish, subscribe, or register interests to all other commands. Next, the data hub places in queue any resulting events delivered to registered subscribers (process block 4606). The events of process block 4606 are those that were delivered to registered subscribers in process block 4604.

Next, the data hub triggers the invoke method on commands whose input values have been fulfilled by the data delivery mechanism of the data hub (process block 4608) with the process terminating thereafter. Commands provide a set of input values to execute their functions. Input values may be static or dynamic. When input values are dynamic, the Wiki engine tracks when data becomes available that is used as an input to the commands. When input becomes available, it is delivered to the command and has thus become 'fulfilled.'

Thus, the illustrative embodiments of the present invention further provide a computer implemented method, apparatus, and computer usable program code for processing a web page for display in a Wiki environment. Newly added components are able to interact with other components in the form of an abstract syntax tree before the final views are rendered. Components are enabled to discover new attribute and parameter settings from the page serve context in the form of nodes of the abstract syntax tree. A processing and validation mechanism is used for components to validate inputs and report errors before rendering final views. Targeted events are processed within the lifecycle of the page serve sequence. Multiple versions of the same component are managed on a single server.

Turning now to FIG. 47, a flowchart of an operation occurring when a server-side data hub object is instantiated is shown in accordance with an illustrative embodiment of the present invention. The process is implemented by Wiki Engine 402 in FIG. 4.

The process begins by receiving a request to load a new page from the client (process block 4702). When the request to load a new page is received by the server, the process creates an instance of a client-side data hub object (process block 4704) associated with the requested new page in accordance with attributes and methods specified by a server-side Wiki data hub class variables and methods. The process registers all components on the server with the server-side data hub object (process block 4706) with the process terminating thereafter.

Figure 48:
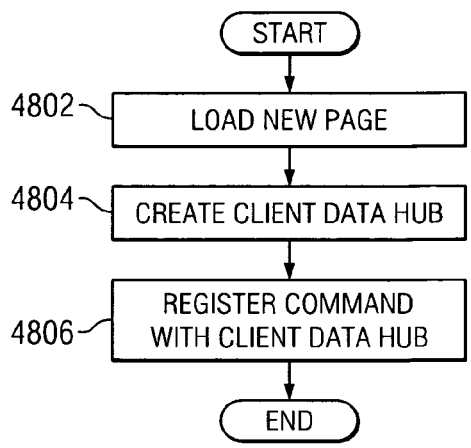
FIG. 48 is a flowchart of an operation occurring when a client-side data hub object is instantiated in accordance with an illustrative embodiment of the present invention.

Turning now to FIG. 48, a flowchart of an operation occurring when a client-side data hub object is instantiated is shown in accordance with an illustrative embodiment of the present invention. The process is implemented by a processing unit on a client, such as processing unit 206 in client 200 in FIG. 2.

The process begins by loading a new page received from the server (process block 4802). When the processing unit on the client loads the hypertext markup language or the JavaScript for the page, the process creates an instance of a client-side data hub object (process block 4804) associated with the requested new page in accordance with attributes and methods specified by a client-side Wiki data hub class variables and methods. The process registers all components on the client with the client-side data hub object (process block 4806) with the process terminating thereafter.

Figure 49:
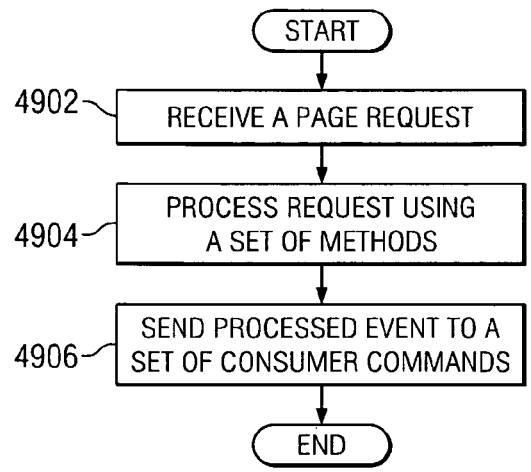
FIG. 49 is a flowchart of an operation occurring when a server-side data hub receives a request to process an event from a client-side data hub in accordance with an illustrative embodiment of the present invention.

Turning now to FIG. 49, a flowchart of an operation occurring when a server-side data hub receives a request to process an event from a client-side data hub is shown in accordance with an illustrative embodiment of the present invention. The data hub is implemented by a data hub on a server, such as data hub 558 in FIG. 5 and data hub 638 in FIG. 6.

The data hub object begins by receiving a page request and/or an event from a client-side data hub (process block 4902). The data hub object processes the request/event using a set of methods (process block 4904). The request/event is generated by a producer command associated with the client. The set of methods can be a set of methods of the data hub object, a set of methods of a data hub topic object, the data hub event object, or any combination of methods associated with the data hub object, the data hub topic object, and/or the data hub event object. The data hub object sends the processed event to a set of consumer commands (process block 4906) with the process terminating thereafter.

Figure 50:
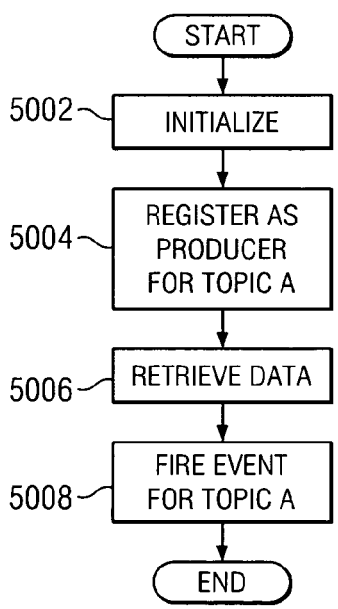
FIG. 50 is a flowchart of an operation occurring when a producer command processes an event in accordance with an illustrative embodiment of the present invention.

Turning now to FIG. 50, a flowchart of an operation occurring when a producer command processes an event is depicted is shown in accordance with an illustrative embodiment of the present invention. In this illustrative example, the process is implemented by a command object, such as Wiki command object 1404 and 1412 in FIG. 14.

The process beings when the command initializes as a result of a call on the init method on the command (process block 5002). The init method to initialize the command is called by the data hub. The command registers as a producer for a given event topic, such as Topic A, with the data hub (process block 5004). The command retrieves data (process block 5006). In this illustrative example, retrieving data can include receiving input from a user, as well as retrieving data from a database or other data storage device. The command fires an event object for Topic A (process block 5008) to the data hub with the process terminating thereafter.

Figure 51:
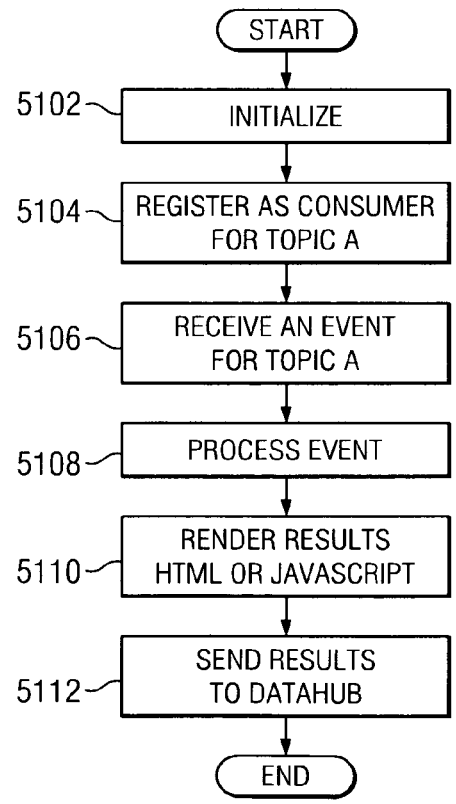
FIG. 51 is a flowchart outlining an operation occurring when a consumer command processes an event in accordance with an illustrative embodiment of the present invention.

Turning now to FIG. 51, a flowchart outlining an operation occurring when a consumer command processes an event is shown in accordance with an illustrative embodiment of the present invention. In this illustrative example, the process is implemented by a command object, such as Wiki command object 1404 and 1412 in FIG. 14.

The process begins with consumer command initializing in response to a data hub calling an initialize method on all commands (process block 5102). The command registers with the data hub as a consumer command for a given event topic, such as Topic A (process block 5104). The command receives an event for Topic A from the data hub (process block 5106) when the data hub calls a callback method on the consumer command. The command processes the event (process block 5108). The command renders the results of processing into hypertext markup language or JavaScript (process block 5110) in response to the data hub calling a render method on the command. Finally, the command sends the rendered results to the data hub (process block 5112) with the process terminating thereafter.

Figure 52:
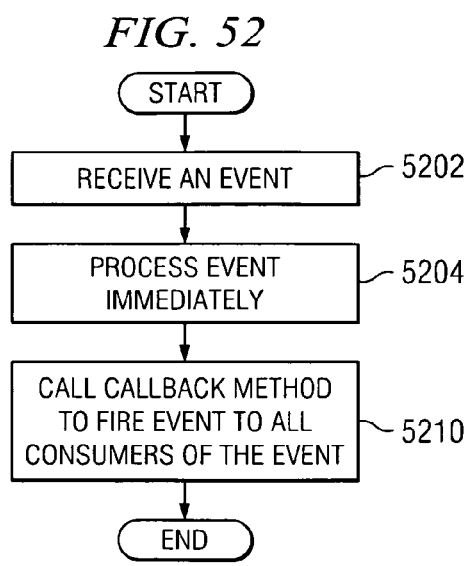
FIG. 52 is a flowchart of an operation occurring when a client-side data hub receives an event in accordance with an illustrative embodiment of the present invention.

Turning now to FIG. 52, a flowchart of an operation occurring when a client-side data hub receives an event is shown in accordance with an illustrative embodiment of the present invention. In this illustrative example, the process is implemented by a client-side data hub, such as data hub 634 in FIG. 6, data hub 1412 in FIG. 14, and data hub 1910 in FIG. 19A.

The process begins when the client-side data hub receives an event from a user and/or a component, such as a producer component (process block 5202). The client-side data hub processes the event immediately (process block 5204). In this step, the client-side data hub determines if one or more commands have registered as consumers for the given topic associated with the event object. If one or more commands have registered as consumers for the given topic, the client-side data hub calls a callback method on the set of registered consumers (process block 5212) to send the event to the registered consumers with the process terminating thereafter.

Figure 53:
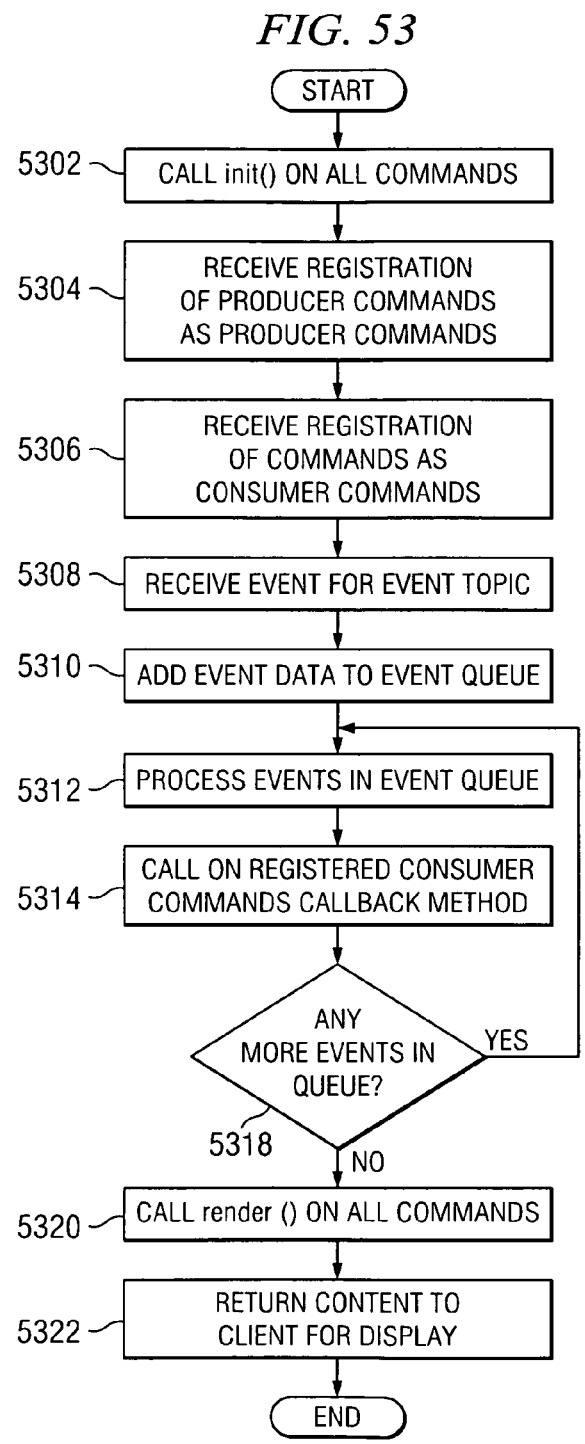
FIG. 53 is a flowchart of an operation occurring when a server-side data hub processes an event in accordance with an illustrative embodiment of the present invention.

Turning now to FIG. 53, a flowchart of an operation occurring when a server-side data hub processes an event is shown in accordance with an illustrative embodiment of the present invention. In this illustrative example, the process is implemented by a server-side data hub, such as data hub 638 in FIG. 6, data hub 1404 in FIG. 14, and data hub 1500 in FIG. 15. The process begins when server-side data hub calls an initialize "init( )" method on all commands associated with the server (process block 5302).

The server-side data hub receives registration of commands as consumers for given topic events (process block 5304). The server-side data hub receives an event for a given event topic (process block 5306). The event can include data. The event may be received from a user input or from another command (process block 5308). The server-side data hub adds the event to an event queue (process block 5310).

The server-side data hub processes events in the event queue during a processEvents method phase. The server-side data hub calls a callback method on all consumer commands registered for the given topic. The server-side data hub calls the callback method to send the event to registered consumers for the event topic associated with the event (process block 5316).

The server-side data hub makes a determination as to whether a new event is received for the given event topic being processed (process block 5318). If a new event is received, the server-side data hub adds the event to the event queue (process block 5310) for processing during the next processEvent phase. Returning to process block 5318, if no new event data is received, the server-side data hub calls a render method on all commands involved in processing the event (process block 5320). The server-side data hub collects the rendered results received from all commands involved in processing the event and sends the content to the client for display (process block 5322) with the process terminating thereafter. The content returned to the client is returned in hypertext markup language or JavaScript for display at the client browser.

Turning now to FIG. 54, a flowchart of an operation occurring when a client-side data hub determines whether to send an event to a server for processing is shown in accordance with an illustrative embodiment of the present invention. In this illustrative example, the process is implemented by a client-side data hub, such as data hub 634 in FIG. 6, data hub 1412 in FIG. 14, and data hub 1910 in FIG. 19A.

The process begins when a client-side data hub receives an event fired by a producer command (process block 5402). The client-side data hub sends the event to any command on the client registered with the data hub as a consumer of the event topic associated with the event (process block 5404). The client-side data hub makes a determination as to whether the event should be sent to a server-side data hub (process block 5406). If the client-side data hub determines that the event should not be sent to a server-side data hub, the client-side data hub processes the event on the client (process block 5408). If the client-side data hub determines that the event should be sent to the server, the client-side data hub calls a processClientEvent method to send the event to the server-side data hub for processing (process block 5410). The client-side data hub receives the results of the processClientEvent from the server-side data hub (process block 5412). The client-side data hub updates the displayed Wiki page on the client with the new Wiki page content received in the results of the processClientEvent from the server (process block 5414) with the process terminating thereafter.

Turning now to FIG. 55, a flowchart of an operation occurring when a server-side data hub receives an event from a client-side data hub as a result of a processClientEvent method call is shown in accordance with an illustrative embodiment of the present invention. In this illustrative example, the process is implemented by a server-side data hub, such as data hub 638 in FIG. 6, data hub 1404 in FIG. 14, and data hub 1500 in FIG. 15.

The process begins when a server-side data hub receives an event topic for a given event topic, such as Topic B, from a client-side data hub (process block 5502). The server-side data hub sends the event for Topic B to the event queue (process block 5504). The server-side data hub processes the event for Topic B in the event queue during the next processEvent phase (process block 5506). The server-side data hub sends the event for Topic B to a set of consumers on the server registered as listeners/consumers for Topic B (process block 5508). The server-side data hub receives new event data for Topic B from producers on the server (process block 5510). The producers firing the new event data were one or more of the consumers that received the event data in process block 5508. The server-side data hub adds the new event data to the event queue (process block 5512).

The server-side data hub processes the new event for Topic B during the next processEvent phase (process block 5514). The server-side data hub sends the new event to consumers on the server registered as listeners/consumers for Topic B (process block 5516). The server-side data hub calls render method on all commands involved in processing the event for Topic B (process block 5518). The server-side data hub receives the results of command processing of the event in the form of renderings in hypertext markup language or JavaScript (process block 5520). The server-side data hub bundles the renderings from all the commands and sends the renderings to the client data hub (process block 5522) with the process terminating thereafter.

The illustrative embodiments of the present invention also provide a computer implemented method, apparatus, and computer usable program code for argument detection for event firing. Event firing refers to the process of sending an event to a data hub for processing.

The process aggregates argument data from a set of sources to form an aggregate data set. The process generates a list of minimum sufficient arguments for firing an event to form a set of minimum arguments. The process compares the aggregate data set to the set of minimum arguments to determine whether the set of minimum arguments are available. The process triggers the command to fire the event, in response to determining that the set of minimum arguments are available.

Turning now to FIG. 56, a flowchart of an operation occurring when a Wiki argument object performs a minimum sufficient argument process is shown in accordance with an illustrative embodiment of the present invention. In this illustrative example, the process is implemented by a Wiki command object, such as Wiki command 1404 or Wiki command 1412 in FIG. 14.

The process begins when Wiki argument object aggregates argument data from a set of sources (process block 5602). The Wiki argument object generates a minimum sufficient argument set based on declared parameters criteria to form an argument set (process block 5604). The Wiki argument object compares aggregate argument data set to minimum argument set (process block 5606). The Wiki argument object makes a determination as to whether sufficient arguments are present (process block 5608). If the Wiki argument object determines that sufficient arguments are present, the Wiki argument object fires a dataAvailable event indicating that the required data is available to fire the event (process block 5610) with the process terminating thereafter.

If the Wiki argument object determines that sufficient arguments are not present, the Wiki argument object makes a determination as to whether new data has been received (process block 5612). If new data has been received, the process returns to process block 5604 where Wiki argument generates a new aggregate argument data set to determine if sufficient arguments are now present. If no new data has been received, the process terminates thereafter.

Turning now to FIG. 57, a flowchart of a process for an areArguments set method that occurs when a Wiki argument object determines if the minimum required arguments of a command are set is depicted in accordance with an illustrative embodiment of the present invention. In this illustrative example, the process is implemented by a Wiki command object, such as Wiki command 1404 or Wiki command 1412 in FIG. 14.

The process begins by receiving a call from an object to fire an event that requires a minimum sufficient set of argument values to be present prior to firing the argument (process block 5702). The process generates a list of the required arguments into an argument list (process block 5704). Next, the process makes a determination as to whether more arguments in the list of arguments are present (process block 5706) that have not yet been checked. In other words, the process identifies the next argument to be checked or processed by determining which argument in the argument list is the next argument in the list to be checked. The process checks the next argument in the list by making a determination as to whether the argument is available and valid, iteratively until all the arguments in the list have been checked for availability and validity. If the list does not contain any additional unprocessed or unchecked arguments, the process returns the Boolean value of "true" to the caller object (process block 5710) with the process terminating thereafter.

Returning to process block 5706, if the list does contain a next unprocessed or unchecked argument, the process makes a determination as to whether the next argument in the argument list is set (process block 5708). The process removes the next argument from the list of unprocessed arguments (process block 5706). If the process determines the argument is set at process block 5708, the process returns to process block 5706 to continue processing the list until all arguments in the list of arguments have been checked. If the process determines the argument is not set, the method returns the Boolean value of "false" to the caller (process block 5712), with the process terminating thereafter.

Turning now to FIG. 58, a flowchart of a process for a setCheckArguments method for detecting if the arguments/available event should be fired is shown in accordance with an illustrative embodiment of the present invention. In this illustrative example, the process is implemented by a Wiki command object, such as Wiki command 1404 or Wiki command 1412 in FIG. 14.

The process begins by making a determination as to whether an identifier argument is set (process block 5802). The identifier argument is a default argument belonging to the data hub command. The identifier argument is used to uniquely identify an event throughout its existence within the data hub. If the process determines that the identifier argument is not set, the process terminates thereafter.

Returning to process block 5802, if the identifier argument is set, the process makes a determination as to whether all arguments required to be present prior to firing an identified event are available (process block 5806). The process makes this determination by checking a flag that determines if all arguments in a previously defined set of required arguments are available. If the process makes a determination that the previously defined arguments in the set of required arguments are not available, the process calls the areArgumentsSet method (process block 5808). If the process receives a return value of "false" from the areArgumentsSet method, the process terminates thereafter.

Returning now to step 5808, if the arguments set process returns a value of true, the process creates a data available event object (process block 5810). The data available event object indicates that the all arguments required to be present prior to firing an identified event are present. The process fires the data available event object to trigger a command associated with the identified event to fire the identified event (process block 5812).

Returning to process block 5806, if the process determines that the areArgumentsSet method returns "true" as shown in process block 5708 in FIG. 57, the process creates a data available event object (process block 5810). Next, the process calls the fireEvent method on the data hub object with the data available event as an argument to the method to fire the event object (process block 5812). The fireEvent method relays the event to any listening processes. The process terminates thereafter.

Figure 59:
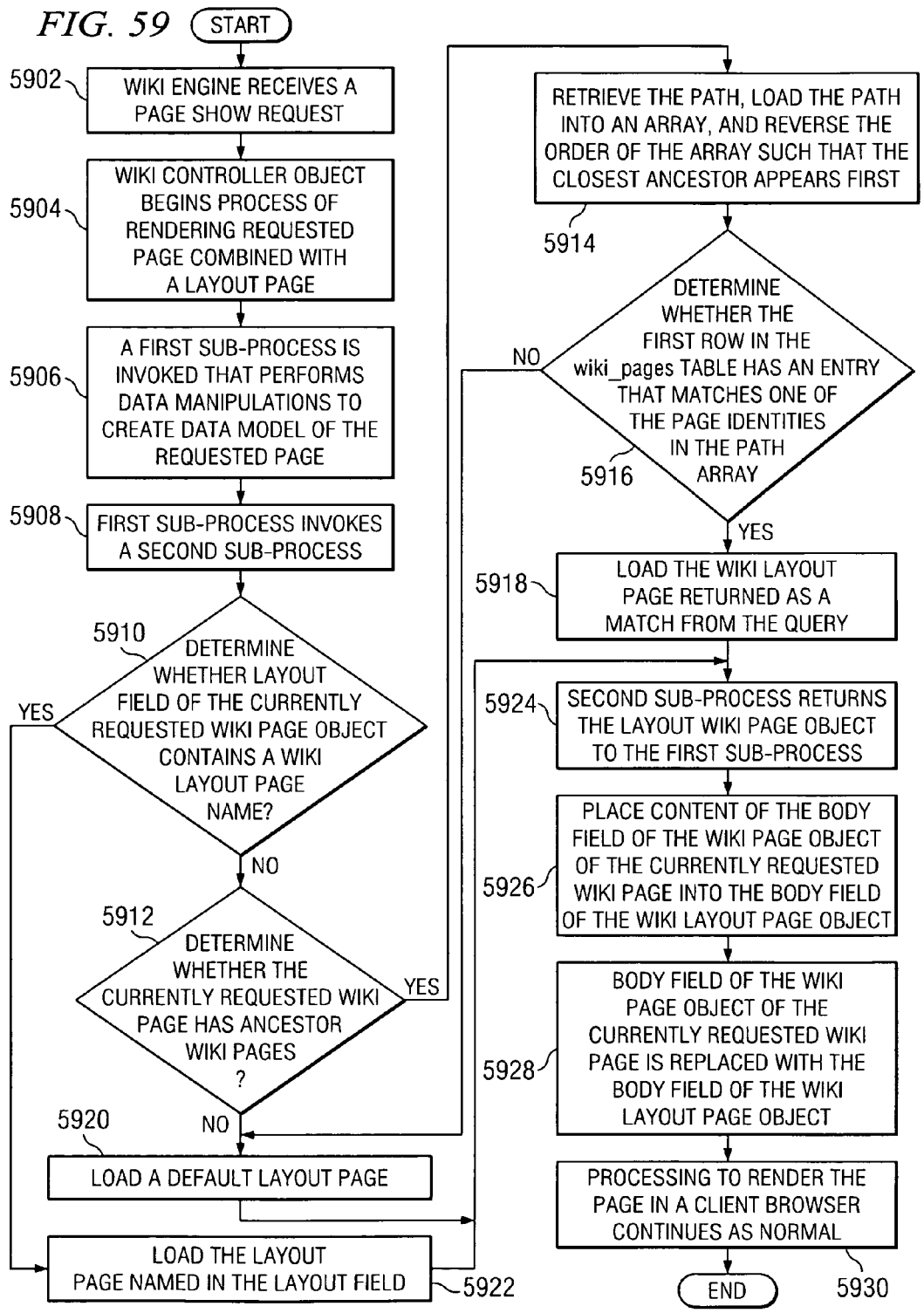
FIG. 59 is a flowchart illustrating the operation of defining a Wiki page layout with a Wiki page in accordance with an illustrative embodiment of the present invention.

FIG. 59 is a flowchart illustrating the operation of defining a Wiki page layout with a Wiki page in accordance with an illustrative embodiment of the present invention. The operation of inheriting a Wiki page layout for a Wiki page is particularly highlighted in process blocks 5912 through 5920. The operation in FIG. 59 may be implemented by a Wiki engine, such as Wiki engine 402 in FIG. 4, and more specifically by a Wiki controller, such as Wiki controller 500 in FIG. 5. The operation begins when a Wiki engine receives a request to show a page (process block 5902). The request is typically an HTTP request issued by a remote client browser. A Wiki controller object handles the request. The Wiki controller object begins the process of rendering the requested page combined with a layout page (process block 5904).

In an illustrative embodiment of the present invention the process of rendering the requested page is invoked by calling a showPage method of the Wiki object, such as Wiki object 508 in FIG. 5. The showPage method retrieves the requested Wiki page and renders an HTML version of the requested Wiki page, which can be displayed in a client browser. The Wiki object acts as a repository for all of the objects and fields used to generate content for the newly requested Wiki page. As part of the page rendering process, a first sub-process is invoked (process block 5906). The first sub-process performs the data manipulations necessary to create a data model of the requested page. In an illustrative embodiment of the present invention the data model of the requested Wiki page is a Wiki page object, such as Wiki page 526 in FIG. 5. In an illustrative embodiment of the present invention, the first sub-process is a processPage method, which is called by the showPage method.

The first sub-process invokes a second sub-process (process block 5908). The purpose of the second sub-process is to load the Wiki layout page associated with the Wiki page that is the subject of the current request. In an illustrative embodiment of the present invention, the second sub-process is a loadLayout method.

The second sub-process makes a determination as to whether the layout field of the data model of the requested Wiki page contains a Wiki layout page name (process block 5910). In an illustrative embodiment of the present invention, the layout field is an object variable of the Wiki page object, such as object variable 528 of page 526 in FIG. 5. If the second sub-process determines that the layout field does not contain a Wiki layout page name for the currently requested Wiki page (a no output to process block 5910), then the second sub-process makes a determination as to whether the currently requested Wiki page has ancestor Wiki pages (process block 5912). Ancestor Wiki pages are those Wiki pages that occur at a higher level in the page naming hierarchy. For example, if a Wiki page is named "LevelOne/LevelTwo" and a Wiki page named "LevelOne" exists, the Wiki page named "LevelOne" is considered an ancestor of the Wiki page "LevelOne/LevelTwo". In another illustrative embodiment of the present invention the second sub-process determines if the currently requested Wiki page has ancestor Wiki pages by checking the path field of the Wiki page object. The currently requested Wiki page is determined to have ancestor Wiki pages if the path field contains names of Wiki pages.

If the second sub-process determines that the currently requested Wiki page has ancestor Wiki pages (a yes output to process block 5912), the second sub-process retrieves the path, loads the path into an array, and reverses the order of the array such that the closest ancestor appears first (process block 5914). In a page name hierarchy, the closest ancestor page is the name segment that occurs immediately prior to the last segment. For example, if a page is named "LevelOne/LevelTwo/LevelThree", the closest ancestor page of the page is the page named "LevelTwo". The most remote ancestor page of the page is the page named "LevelOne". Next, the second sub-process makes a determination as to whether a row, or entry, in the Wiki_pages table matches one of the page identities in the path array (process block 5916). The Wiki_pages table is a table in the database that comprises the object variables of the Wiki page object. In an illustrative embodiment of the present invention, an entry, or row, in the page table comprises fields of an identity (ID), account, tag, time, body, owner identity (ownerID), modified_by, is Latest, layout, is Layout, is Editing, commentOn, path, attributes (attrib), and errors.

If a second sub-process determines that a match exists (a yes output to process block 5916), the second sub-process loads the Wiki layout page returned as a match (process block 5918). The ancestor page that is found to have a matching entry in the Wiki_page table is referred to as a matched ancestor page. In an illustrative embodiment of the present invention, the second sub-process loads the Wiki layout page returned as a match from the query by invoking a third sub-process which loads the Wiki layout page returned as a match from the query. In another illustrative embodiment of the present invention, the third sub-process is a loadPage method of the Wiki object. Then the operation goes to process block 5924.

If the second sub-process determines that a match does not exist (a no output to process block 5916), the second sub-process loads a default layout page (process block 5920). In an illustrative embodiment of the present invention a loadPage method of the Wiki object is called to load the default layout page. Then the operation goes to process block 5924.

If the second sub-process determines that the currently requested Wiki page does not have ancestor Wiki pages (a no output to process block 5912), the second sub-process loads a default layout page (process block 5920). In an illustrative embodiment of the present invention a loadPage method of the Wiki object is called to load the default layout page. Then the operation goes to process block 5924.

If the second sub-process determines that the layout field is set for the currently requested Wiki page (a yes output to process block 5910), then the second sub-process loads the layout page named in the layout field (process block 5922). In an illustrative embodiment of the present invention a loadPage method of the Wiki object is called to load the named layout page.

Next, the second sub-process returns the layout Wiki page object to the first sub-process (process block 5924). In an illustrative embodiment of the present invention, the second sub-process returns the layout Wiki page object to the first sub-process via the third sub-process. The first sub-process places the contents of the body field of the Wiki page object of the currently requested Wiki page into the page component "body," which is part of the body field of the Wiki layout page object (process block 5926). The body field is an object variable of the Wiki page object, such as object variable 528 of page 526 in FIG. 5. In an illustrative embodiment of the present invention the first sub-process places the content of the body field of the Wiki page object of the currently requested Wiki page into the body field of the Wiki layout page object by replacing a special template variable in the Wiki layout page object with the body field of the Wiki page object of the currently requested Wiki page. In an illustrative embodiment of the present invention the special template variable is a string variable. In another illustrative embodiment of the present invention the first sub-process replaces the special template variable with the body of the currently requested Wiki page through string substitution.

Next, the body field of the Wiki page object of the currently requested page is replaced with the body field of the Wiki layout page object (process block 5928). The body field of the Wiki layout page object includes page components header, menu, right margin, left margin, footer, and body. Processing to render the page in a client browser continues as normal (process block 5930), then the operation ends. Thus, when rendered in the client browser, the currently requested Wiki page comprises the original content of the currently requested Wiki page, wrapped in the associated Wiki layout page.

Thus, illustrative embodiments of the present invention provide for embedding Wiki page content into the body of a layout page. Additionally, a specific layout may be associated with a Wiki page. A user may create a new Wiki layout page by simply creating a new Wiki page and editing the content of the newly created Wiki page. The default content of each section of the newly created Wiki page is provided by Wiki commands that are named after the section for which the commands provide content. Users may include the content from these Wiki commands in any position on the page that a user wants by using HTML page flow. The user may include other static HTML content and other dynamic Wiki commands within the newly created Wiki page as the user sees fit.

Additionally, illustrative embodiments of the present invention provide for a Wiki page to inherit the layout of the Wiki page from ancestor pages. Each Wiki page has a list of pages associated with the Wiki page that are ancestor pages for the Wiki page. The list of ancestor pages is stored in a field in a Wiki object. In an illustrative embodiment of the present invention, the field is called a path field. A query is used which finds the first Wiki page in a reverse hierarchical order in the ancestor list that contains a Wiki page layout specifier. The specified layout page is then selected for the target page to inherit.

FIG. 60 is a flowchart of the operation of rendering a Wiki page in accordance with an illustrative embodiment of the present invention. The operation in FIG. 60 may be implemented by a Wiki engine, such as Wiki engine 402 in FIG. 4, and more specifically by a Wiki controller, such as Wiki controller 500 in FIG. 5. The operation begins when a Wiki engine receives a request to show a Wiki page (process block 6002). The request is typically an HTTP request issued by a remote client browser. A Wiki controller object handles the request. The Wiki controller object begins the process of rendering the requested Wiki page combined with a Wiki layout page (process block 6004).

In an illustrative embodiment of the present invention the process of rendering the requested Wiki page is invoked by calling a showPage method of the Wiki object, such as Wiki object 508 in FIG. 5. A showPage method retrieves the requested Wiki page and renders an HTML version of the requested Wiki page, which can be displayed in a client browser. The Wiki object acts as a repository for all of the objects and fields used to generate content for the newly requested Wiki page. Next, the Wiki engine tests the bit mask settings of a bit-mask stored in a field of the requested Wiki page, such as Wiki page 526 in FIG. 5, called the component field (process block 6006). The component field bit-mask includes a bit corresponding to each page component in the Wiki page, such as the header, menu, footer, and so forth. If the bit, or setting, for a given page component has the value of 1, the corresponding page component Wiki command in the layout page is allowed to contribute the content generated by the Wiki command to the Wiki page. If the bit, or setting, for a given page component has the value of 0, the corresponding page component Wiki command in the layout page is not allowed to contribute the content to the Wiki page that the Wiki command would generate.

Next, the operation combines the requested Wiki page with an associated Wiki layout page (process block 6008), forming a combined page. In an illustrative embodiment of the present invention, in order to determine the Wiki layout page associated with the requested Wiki page, a page table is checked to determine the specific Wiki layout page associated with the requested Wiki page. In an illustrative embodiment of the present invention, the page table is called a Wiki_page table. If the requested Wiki page does not have a specific Wiki layout page associated with the Wiki page in the page table, a default Wiki layout page is associated and combined with the requested Wiki page.

Thus, illustrative embodiments of the present invention provide for programmatically hiding and displaying Wiki page layout sections. Wiki page settings are implemented as checkboxes that are editable by a user, when the user edits a Wiki page. By checking and un-checking the checkboxes, the user controls the visibility of the various page components, as well as, page comments, attachments and emails.

Turning now to FIG. 61, an illustration of a class definition for a server-side data hub object class is depicted in accordance with an illustrative embodiment of the present invention. A server-side data hub object, such as server-side data hub object 2100 in FIG. 21, has attributes and object variables that are defined by a Wiki data hub class definition, such as the class variable in code 6102.

This illustrative Wiki data hub class definition provides an array of Wiki command objects 6104, an array of consumer identifiers 6106, and an array of producer identifiers 6108. Thus, each time a server-side data hub is instantiated for a given page instance, the data hub attributes for the server-side data hub instance are defined by a Wiki data hub class definition, such as the Wiki data hub class definition shown above.

Turning now to FIG. 62, an illustration of a set of method interfaces for a class of data hub management methods is depicted in accordance with an illustrative embodiment of the present invention. The set of data hub management methods 6200 are data hub management method interfaces associated with a server-side data hub, such as data hub management 1402 in FIG. 14. Code 6202 is an example of a method for restoring a data hub object saved in a file system or other data storage device, such as storage 108 in FIG. 1. Code 6204 is an example of a method for saving or caching an instance of a data hub object to a file system.

Turning now to FIG. 63A, an illustration of a set of method interfaces for a class of producer and consumer methods is shown in accordance with an illustrative embodiment of the present invention. The set of producer and consumer methods 6300 are data hub method interfaces associated with a server-side data hub, such as producers and consumers 2104 in FIG. 21. The set of data hub management methods 6200 are data hub management method interfaces, such as producers and consumers 2104 in FIG. 21.

Code 6302 is a method to add a command to the data hub. Code 6304 is a method to get commands that are members of the data hub. Code 6306 is a method to get a command. Code 6308 is a method that is called to add a producer command. Code 6310 is a method to add an editable producer command. An editable producer command provides data that can be edited for create, update, and delete operations.

Code 6312 is a method to remove a producer command, such as a regular or editable producer command. Code 6314 is a method to get a list of all producers. Code 6316 is a method to add a consumer command as a listener for a particular topic. Code 6318 is a method to remove a consumer command as a listener for a particular topic. Code 6320 is a method to get a list of consumer commands that are listening to a particular topic. Code 6322 is a method to add a client consumer command as a listener for a particular command.

Code 6324 is a command to add a client JavaScript handler. Code 6326 is a code to remove a consumer command as a listener for a particular topic. Code 6328 is a method to get a list of consumer commands that are listening to a particular topic. Code 6330 is a method to add a client consumer as a listener for a particular topic. Code 6332 is a method to generate JavaScript code on the client for commands that belong to the client-side data hub.

Turning now to FIG. 63B, an illustration of a set of method interfaces for a class of topic methods is shown in accordance with an illustrative embodiment of the present invention. The set of topic methods 6340 are method interfaces for topic methods on a server-side data hub, such as topics 2106 in FIG. 21. For example, code 6342 is an example of a method for adding an event topic. Code 6344 is a method for removing an event topic.

Turning now to FIG. 64, an illustration of a set of method interfaces for a class of event processing methods in accordance with an illustrative embodiment of the present invention. The set of event processing methods 6400 are method interfaces for event processing methods on a server-side data hub, such as event processing 2108 in FIG. 21. For example, code 6402 is a method to fire an event. Code 6404 is a method to process events on the server. Code 6406 is a method to process a client event destined for the server. Multiple events can be sent to the server as a batch.

Turning now to FIG. 65, an illustration of a set of method interfaces for a class of command management methods is shown in accordance with an illustrative embodiment of the present invention. The set of command management methods 6500 are method interfaces for command management methods on the server-side data hub, such as command management 2110 in FIG. 21. For example, code 6502 is a method to set arguments for command. This changes the arguments in the source. Code 6504 is a method to delete commands from page source.

Turning now to FIG. 66, an illustration of a class definition for a client-side data hub object class is depicted in accordance with an illustrative embodiment of the present invention. The data hub attributes and object variable are defined by a Wiki data hub class definition for a client-side data hub, as shown in code 6600. Code 6602 is an object variable for consumer identifiers. Code 6604 is an object variable for topics. Code 6606 is an object variable for events.

Turning now to FIG. 67, an illustration of a set of method interfaces for a class of producer and consumer methods is shown in accordance with an illustrative embodiment of the present invention. The set of producer and consumer methods 6700 are producer and consumer method interfaces on a client-side data hub, such as producers and consumers 2202 in FIG. 22. For example, code 6702 is a method for adding a consumer command. Code 6704 is a method for removing a consumer command.

Turning now to FIG. 68, an illustration of a set of method interfaces for a class of topic methods is depicted in accordance with an illustrative embodiment of the present invention. The set of topic methods 6800 are method interfaces for topic methods on a client-side data hub, such as topics 2204 in FIG. 22. For example, code 6802 is a method for adding a topic that is available for other consumer commands. Code 6804 is a method for getting a list of available topics.

Turning now to FIG. 69, an illustration of a set of method interfaces for a class of event processing methods is shown in accordance with an illustrative embodiment of the present invention. The set of event processing methods 6900 are method interfaces for event processing methods on a client-side data hub, such as event processing 2206 in FIG. 22. For example, code 6902 is a method for firing all queued up events. Code 6904 is a method for firing an event. Code 6906 is a method for sending an event to the server for execution.

Turning now to FIG. 70, an illustration of a set of method interfaces for a class of command management methods is shown in accordance with an illustrative embodiment of the present invention. The set of command management methods 7000 are method interfaces for command management methods on a client-side data hub, such as command management 2208 in FIG. 22. For example, code 7002 is a method for adding a Wiki command. Code 7004 is a method for deleting a command.

A data hub topic object defines a topic that a consumer can subscribe to, as well as a topic that a producer command can publish or fire. For example, a search component is a consumer that subscribes to a search topic. When a user interface receives a search term from a user, the user interface fires an event for the search topic. In other words, the user interface is a producer that publishes the topic subscribed to by the consumer search component.

Turning now to FIG. 71, an illustration of a set of object variables and method interfaces for a class of data hub topic objects is depicted in accordance with an illustrative embodiment of the present invention. The object variable 7100 define the attributes of the topic object. The set of methods are method interfaces for data hub topic objects on a client-side data hub or a server-side data hub, such as data hub topic objects 2112 in FIG. 21 and data hub topic object 2210 in FIG. 22. In this illustrative embodiment of the present invention, the data hub topic object associated with the server and the data hub topic object associated with the client have the same object variable and methods.

Turning now to FIG. 72, an illustration of class definitions and method interfaces for a class of data hub event objects is depicted in accordance with an illustrative embodiment of the present invention. The class definitions 7200 define the attributes of the event object. For example, code 7202 defines an object variable for a topic. All event objects have a topic value in the topic object variable. Code 7204 defines an object variable for a value. An event object may have data stored in the object variable value. However, not all event objects include data.

In this illustrative embodiment of the present invention, the set of methods are method interfaces for data hub event objects, such as data hub event objects 2114 in FIG. 21 and data hub event object 2212 in FIG. 22. The data hub event object associated with the server and the data hub event object associated with the client has the same object variable and methods.

A data hub object, data hub topic object, and/or data hub event object can include additional methods not shown in the illustrative embodiments without departing from the scope of the illustrative embodiments of the present invention. In addition, one or more of the methods associated with data hub object, data hub topic object, and/or data hub event object can be absent from the set of methods for the data hub object, data hub topic object, and/or data hub event object in accordance with the illustrative embodiments of the present invention.

In an event based Wiki component model, some Wiki components require a minimum sufficient set of argument values to be present before the component can respond or fire an event object. These minimum sufficient arguments can come from multiple, disparate sources. Therefore, the aspects of the illustrative embodiments of the present invention provide a minimum sufficient argument detection scheme that aggregates argument data from potentially multiple sources and matches the argument set against declared parameter criteria such that a "data available" event is only fired if the minimum sufficient arguments to satisfy the declared/defined parameter criteria are present.

A Wiki argument object is an object associated with a Wiki command, such as Wiki command 1404 and Wiki command 1412 in FIG. 14. The Wiki argument object has an "avail" property that indicates whether an argument required for a command to fire has been set and is valid.

FIG. 73 is an illustration of a class definition for a Wiki argument object in accordance with an illustrative embodiment of the present invention. An algorithm for detecting whether to fire an argument/available event is performed by Wiki argument object on a command object, such as Wiki command objects 1404 and 1412 in FIG. 14. Code 7302 is an object variable indicating whether the argument object is valid. Code 7304 is an argument object indicating whether the argument is set and available.

Turning now to FIG. 74, an illustration of a pseudocode for an algorithm detecting whether to fire an argument/available event is shown in accordance with an illustrative embodiment of the present invention.

In this example, code 7400 is for an algorithm that determines whether each argument in a minimum required argument set for firing a data hub event object is available. Each argument is checked at code 7402 to determine if the available variable is null. If the algorithm indicates that each argument in the set is available, code 7406 makes a determination as to whether the argument is available and set. If the argument is available and set, code 7408 fires a new data hub event object associated with the argument set.

Thus, the aspects of the illustrative embodiments provide a server-side data hub object and a corresponding client-side data hub object to propagate or route event objects between commands in a Wiki environment and a client environment. The utilization of data hub objects enables commands to interact with greater ease during processing of events associated with a given Wiki page.

It should be noted that although the illustrative embodiments of the present invention detailed above were described in terms of a Wiki application in a Wiki environment, the above described illustrative embodiments of the present invention are not limited to a Wiki application in a Wiki environment. The use of the Wiki application in a Wiki environment as an example in the descriptions was not intended to in anyway limit the scope of the present invention. It would be obvious to one of ordinary skill in the art that the above described illustrative embodiments of the present invention apply equally well to any shared environment that may be accessed through an interface by a group of users. Furthermore, while certain aspects of the illustrative embodiments described above were explained in terms of JavaScript language, the use of the JavaScript language as an example in the descriptions was not intended to in anyway limit the scope of the present invention. Those of ordinary skill in the art will realize that the illustrative embodiments described above may be implemented using any object oriented scripting language.

The flowchart and block diagrams in the figures illustrate the architecture, functionality, and operation of possible implementations of methods, apparatus, and computer program products according to various embodiments of the present invention. In this regard, each block in the flowchart or block diagrams may represent a module, segment, or portion of code, which comprise one or more executable instructions for implementing the specified logical function(s). It should also be noted that in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing a collaborative web page, the computer implemented method comprising:

displaying a plurality of graphical representations of commands for adding and modifying dynamic content of the collaborative web page;

responsive to a user selecting a command in the plurality of graphical representations of commands, presenting a property editor to modify properties of the dynamic content of the collaborative web page to form modifiable properties, wherein the modifiable properties in the property editor are selected from a group consisting of: a size of the dynamic content, an address for a map, a news aggregator for a data feed, a name of a data source a list of destinations for modifying the address for the map displayed on the collaborative web page and a combination thereof;

creating a page tree view of a plurality of collaborative web pages using a tree structure including a plurality of nodes and a plurality of leaf nodes, wherein creating the page tree view comprises reading all rows in a wiki page database table and extracting the page names column values, iterating over the page name values to build a page tree view, and grouping a hierarchy of pages into nodes and lead nodes to form a visual tree structure, wherein a node in the plurality of nodes includes content of a first collaborative web page in the plurality of collaborative web pages and functions as a folder that contains one or more leaf nodes in the plurality of leaf nodes that are organized beneath the node in the tree structure, wherein a leaf node in the plurality of leaf nodes corresponds to object variables and content for a portion of the second collaborative web page in un-rendered form, and wherein the page tree view allows the user to navigate directly to the plurality of collaborative web pages; and including the page tree view in the collaborative web page, wherein the collaborative web page is a wiki page.

2. The computer implemented method of claim 1, further comprising:

creating the collaborative web page in response to receiving a user input requesting creation of the collaborative web page.

3. The computer implemented method of claim 2, further comprising:

prompting a user to assign a page name for the collaborative web page as part of a page tree view.

4. The computer implemented method of claim 1, further comprising:

including a list of destinations in the dynamic content of the collaborative web page, wherein the address for the map includes a destination in the list of destinations, wherein the data feed in the collaborative web page includes information regarding a weather forecast for the destination and links to local events for the destination.

5. The computer implemented method of claim 1, further comprising:

loading the collaborative web page to a web server.

6. The computer implemented method of claim 1, wherein the creating the page tree view using the tree structure comprises:
- extracting page names from a database used to store page names for the plurality of collaborative web pages; and
- building the page tree view by assigning each of the page names to be nodes or leaf nodes.

7. The computer implemented method of claim 1, wherein the user provides user input via a browser.

8. The computer implemented method of claim 1, further comprising:
- inserting the dynamic content in the collaborative web page, wherein the modifiable properties specify the dynamic content displayed on the collaborative web page.

9. The computer implemented method of claim 1, further comprising:
- including contents of one collaborative web page in a second collaborative web page by using a page call.

10. A data processing system comprising:
- a bus system;
- a communications system connected to the bus system;
- a memory connected to the bus system, wherein the memory includes a set of instructions; and
- a processing unit connected to the bus system, wherein the processing unit executes the set of instructions to display a plurality of graphical representations of commands for adding and modifying dynamic content of a collaborative web page; and present a property editor to modify properties of the dynamic content of the collaborative web page to form modifiable properties in response to a user selecting a command in the plurality of graphical representations of commands, wherein the modifiable properties in the property editor are selected from a group consisting of: a size of the dynamic content, an address for a map, a news aggregator for a data feed, a name of a data source a list of destinations for modifying the address for the map displayed on the collaborative web page and a combination thereof;
- wherein the processing unit creates a page tree view of a plurality of collaborative web pages using a tree structure including a plurality of nodes and a plurality of leaf nodes, wherein creating the page tree view comprises reading all rows in a wiki page database table and extracting the page names column values, iterating over the page name values to build a page tree view, and grouping a hierarchy of pages into nodes and lead nodes to form a visual tree structure,
- wherein a node in the plurality of nodes includes content of a first collaborative web page in the plurality of collaborative web pages and functions as a folder that contains one or more leaf nodes in the plurality of leaf nodes that are organized beneath the node in the tree structure, wherein a leaf node in the plurality of leaf nodes corresponds to object variables and content for a portion of the for the second collaborative web page in un-rendered form, and wherein the page tree view allows the user to navigate directly to the plurality of collaborative web pages; and
- wherein the processing unit includes the page tree view in the collaborative web page, wherein the collaborative web page is a wiki page.

11. The system of claim 10, wherein the data processing system is a client, wherein a server is operably connected to the client and generates the collaborative web page, a palette, and property editor in response to a request from the client.

12. The system of claim 11, wherein the client communicates with the server using AJAX.

13. The system of claim 11, wherein the set of instructions are executed by a browser.

14. A computer program product for managing a collaborative web page, the computer program product comprising:
- a computer readable storage device storing computer usable program code;
- computer usable program code responsive to a user input requesting creation of the collaborative web page for creating the collaborative web page;
- computer usable program code for prompting a user to assign a page name for the collaborative web page as part of a page tree view;
- computer usable program code for displaying a plurality of graphical representations of commands for adding and modifying dynamic content of the collaborative web page; and
- computer usable program code, responsive to the user selecting a command in the plurality of graphical representations of commands, for presenting a property editor to modify properties of the dynamic content of the collaborative web page to form modifiable properties, wherein the modifiable properties in the property editor are selected from a group consisting of: a size of the dynamic content, an address for a map, a news aggregator for a data feed, a name of a data source a list of destinations for modifying the address for the map displayed on the collaborative web page and a combination thereof
- computer usable program code for creating a page tree view of a plurality of collaborative web pages using a tree structure including a plurality of nodes and a plurality of leaf nodes, wherein creating the page tree view comprises reading all rows in a wiki page database table and extracting the page names column values, iterating over the page name values to build a page tree view, and grouping a hierarchy of pages into nodes and lead nodes to form a visual tree structure,
- wherein a node in the plurality of nodes includes content of a first collaborative web page in the plurality of collaborative web pages and functions as a folder that contains one or more leaf nodes in the plurality of leaf nodes that are organized beneath the node in the tree structure, wherein a leaf node in the plurality of leaf nodes corresponds to object variables and content for a portion of the second collaborative web page in un-rendered form, and wherein the page tree view allows the user to navigate directly to the plurality of collaborative web pages; and
- computer usable program code for including the page tree view in the collaborative web page, wherein the collaborative web page is a wiki page.

15. The computer program product of claim 14, wherein the computer usable program code for creating a graphical representation of the page tree view comprises:
- computer usable program code for extract page names from a database used to store page names for the plurality of collaborative web pages; and
- computer usable program code for building the page tree view by assigning each of the page names to be nodes or leaf nodes.

16. The computer program product of claim 14, further comprising:
- computer usable program code for allowing a user to drag the dynamic content from a palette to the collaborative web page.

17. The computer program product of claim 14, further comprising:

computer usable program code for inserting the dynamic content in the collaborative web page; and computer usable program code for including contents of one collaborative web page in a second collaborative web page by using a page call.

\* \* \* \* \*